US010977631B2

(12) United States Patent
Kahn et al.

(10) Patent No.: US 10,977,631 B2
(45) Date of Patent: Apr. 13, 2021

(54) SECURE CONTENT TRANSFER SYSTEMS AND METHODS TO OPERATE THE SAME

(71) Applicant: The DIRECTV Group, Inc., El Segundo, CA (US)

(72) Inventors: Raynold M. Kahn, Los Angeles, CA (US); Peter M. Klauss, Torrance, CA (US); Stephen P. Dulac, Santa Clarita, CA (US); David N. Schlacht, Los Angeles, CA (US); Hanno Basse, Santa Monica, CA (US); Thomas H. James, Pacific Palisades, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 184 days.

(21) Appl. No.: 15/724,918

(22) Filed: Oct. 4, 2017

(65) Prior Publication Data

US 2018/0046949 A1    Feb. 15, 2018

Related U.S. Application Data

(63) Continuation of application No. 14/321,436, filed on Jul. 1, 2014, now Pat. No. 9,811,789, which is a
(Continued)

(51) Int. Cl.
    *G06Q 20/12*    (2012.01)
    *G06F 21/10*    (2013.01)
    (Continued)

(52) U.S. Cl.
    CPC ......... *G06Q 20/1235* (2013.01); *G06F 21/10* (2013.01); *G06Q 50/184* (2013.01);
    (Continued)

(58) Field of Classification Search
    None
    See application file for complete search history.

(56) References Cited

U.S. PATENT DOCUMENTS 3,794,922 A    2/1974    Osborn et al.
3,885,089 A    5/1975    Callais et al.
(Continued)

FOREIGN PATENT DOCUMENTS

EP    0677949    10/1995
EP    0710017    5/1996
(Continued)

OTHER PUBLICATIONS $1^{st}$ Report of EBU/SMPTE Task Force for Harmonized Standards for the Exchange of Teleision Program Material as Bit Streams, May 6, 1997, Version 1.30, pp. 1-73.
(Continued)

*Primary Examiner* — Jacob C. Coppola

(57) ABSTRACT

Secure content transfer systems and methods to operate the same are disclosed. Disclosed example systems include a client device for use at a physical location and a media server for use at the physical location. The example media server includes a security device to determine a first encryption secret based on a first encryption key and to determine a second encryption secret based on a second encryption key. The media server also includes a decrypter to decrypt received encrypted content for requested content based on the first encryption secret and an encrypter to re-encrypt the decrypted content data for the requested content based on the second encryption secret. In addition, the media server includes an interface to send the re-encrypted content data to the client device, wherein the client device is to decrypt the re-encrypted content data based on the second encryption secret to access the requested content.

7 Claims, 42 Drawing Sheets

Related U.S. Application Data continuation of application No. 11/434,404, filed on May 15, 2006, now Pat. No. 8,775,319.

(51) Int. Cl.
*G06Q 50/18* (2012.01)
*G06Q 30/04* (2012.01)
*G06Q 50/10* (2012.01)
*G07F 17/00* (2006.01)
*G06Q 10/06* (2012.01)

(52) U.S. Cl.
CPC .............. *G06Q 10/06* (2013.01); *G06Q 30/04* (2013.01); *G06Q 50/10* (2013.01); *G07F 17/0014* (2013.01)

(56) References Cited

U.S. PATENT DOCUMENTS

| | | |
|---|---|---|
| 4,241,237 A | 12/1980 | Paraskevakos et al. |
| 4,322,745 A | 3/1982 | Saeki et al. |
| 4,613,901 A | 9/1986 | Gilhousen et al. |
| 4,633,309 A | 12/1986 | Li et al. |
| 4,675,732 A | 6/1987 | Oleson |
| 4,694,490 A | 9/1987 | Harvey et al. |
| 4,866,769 A | 9/1989 | Karp |
| 4,866,787 A | 9/1989 | Olesen |
| 4,881,264 A | 11/1989 | Merkle |
| 4,941,176 A | 7/1990 | Matyas et al. |
| 5,012,510 A | 4/1991 | Schaubs et al. |
| 5,015,830 A | 5/1991 | Masuzawa et al. |
| 5,029,207 A | 7/1991 | Gammie |
| 5,033,084 A | 7/1991 | Beecher |
| 5,036,461 A | 7/1991 | Elliott et al. |
| 5,068,894 A | 11/1991 | Hoppe |
| 5,091,618 A | 2/1992 | Takehiro |
| 5,105,268 A | 4/1992 | Yamanouchi et al. |
| 5,111,504 A | 5/1992 | Esserman et al. |
| 5,115,467 A | 5/1992 | Esserman et al. |
| 5,132,992 A | 7/1992 | Yurt et al. |
| 5,168,353 A | 12/1992 | Walker et al. |
| 5,172,413 A | 12/1992 | Bradley et al. |
| 5,191,410 A | 3/1993 | McCalley et al. |
| 5,199,066 A | 3/1993 | Logan |
| 5,251,332 A | 10/1993 | Hansen |
| 5,260,778 A | 11/1993 | Kauffman et al. |
| 5,270,809 A | 12/1993 | Gammie et al. |
| 5,301,245 A | 4/1994 | Endoh |
| 5,301,352 A | 4/1994 | Nakagawa et al. |
| 5,319,707 A | 6/1994 | Wasilewski et al. |
| 5,331,139 A | 7/1994 | Lee |
| 5,335,277 A | 8/1994 | Harvey et al. |
| 5,341,425 A | 8/1994 | Wasilewski et al. |
| 5,345,594 A | 9/1994 | Tsuda |
| 5,357,276 A | 10/1994 | Banker et al. |
| 5,371,551 A | 12/1994 | Logan et al. |
| 5,381,481 A | 1/1995 | Gammie et al. |
| 5,386,587 A | 1/1995 | Yuzawa |
| 5,396,293 A | 3/1995 | Shellard |
| 5,420,866 A | 5/1995 | Wasilewski |
| 5,421,031 A | 5/1995 | De Bey |
| 5,438,423 A | 8/1995 | Lynch et al. |
| 5,440,336 A | 8/1995 | Buhro et al. |
| 5,442,389 A | 8/1995 | Blahut et al. |
| 5,446,919 A | 8/1995 | Wilkins |
| 5,473,609 A | 12/1995 | Chaney |
| 5,481,609 A | 1/1996 | Cohen et al. |
| 5,485,221 A | 1/1996 | Banker et al. |
| 5,488,413 A | 1/1996 | Elder et al. |
| 5,495,531 A | 2/1996 | Smiedt |
| 5,497,206 A | 3/1996 | Ji |
| 5,504,816 A | 4/1996 | Hamilton et al. |
| 5,505,901 A | 4/1996 | Harney et al. |
| 5,506,902 A | 4/1996 | Kubota |
| 5,511,986 A | 4/1996 | Casey et al. |
| 5,544,161 A | 8/1996 | Bigham et al. |
| 5,557,541 A | 9/1996 | Schulhof |
| 5,559,549 A | 9/1996 | Hendricks et al. |
| 5,565,805 A | 10/1996 | Nakagawa et al. |
| 5,566,353 A | 10/1996 | Cho et al. |
| 5,583,562 A | 12/1996 | Birch et al. |
| 5,583,937 A | 12/1996 | Ullrich et al. |
| 5,586,264 A | 12/1996 | Belknap et al. |
| 5,590,200 A | 12/1996 | Nachman et al. |
| 5,592,212 A | 1/1997 | Handelman |
| 5,592,491 A | 1/1997 | Dinkins |
| 5,592,551 A | 1/1997 | Lett et al. |
| 5,592,651 A | 1/1997 | Rackman |
| 5,594,491 A | 1/1997 | Hodge et al. |
| 5,603,077 A | 2/1997 | Muckle et al. |
| 5,619,247 A | 4/1997 | Russo |
| 5,625,693 A | 4/1997 | Rohatgi et al. |
| 5,630,204 A | 5/1997 | Hylton et al. |
| 5,631,903 A | 5/1997 | Dianda et al. |
| 5,640,453 A | 6/1997 | Schuchman et al. |
| 5,642,418 A | 6/1997 | Ferris et al. |
| 5,649,318 A | 7/1997 | Lusignan |
| 5,661,517 A | 8/1997 | Budow et al. |
| 5,663,896 A | 9/1997 | Aucsmith |
| 5,664,046 A | 9/1997 | Abecassis |
| 5,666,293 A | 9/1997 | Metz et al. |
| 5,666,645 A | 9/1997 | Thomas et al. |
| 5,675,390 A | 10/1997 | Schindler et al. |
| 5,677,895 A | 10/1997 | Mankovitz |
| 5,677,953 A | 10/1997 | Dolphin |
| 5,684,742 A | 11/1997 | Bublitz et al. |
| 5,699,429 A | 12/1997 | Tamer et al. |
| 5,701,383 A | 12/1997 | Russo et al. |
| 5,701,582 A | 12/1997 | De Bey |
| 5,708,963 A | 1/1998 | Mobley |
| 5,710,970 A | 1/1998 | Walters et al. |
| 5,715,315 A | 2/1998 | Handelman |
| 5,715,403 A | 2/1998 | Stefik |
| 5,721,829 A | 2/1998 | Dunn et al. |
| 5,724,646 A | 3/1998 | Ganek et al. |
| 5,729,000 A | 3/1998 | Sugimoto |
| 5,729,280 A | 3/1998 | Inoue et al. |
| 5,729,824 A | 3/1998 | O'Neill et al. |
| 5,734,589 A | 3/1998 | Kostreski et al. |
| 5,734,853 A | 3/1998 | Hendricks et al. |
| 5,742,680 A | 4/1998 | Wilson |
| 5,748,732 A | 5/1998 | Le Berre et al. |
| 5,760,820 A | 6/1998 | Eda et al. |
| 5,761,302 A | 6/1998 | Park |
| 5,764,762 A | 6/1998 | Kazmierczak et al. |
| 5,767,913 A | 6/1998 | Kassatly |
| 5,768,539 A | 6/1998 | Metz et al. |
| 5,784,095 A | 7/1998 | Robbins et al. |
| 5,787,172 A | 7/1998 | Arnold |
| 5,790,663 A | 8/1998 | Lee et al. |
| 5,790,783 A | 8/1998 | Lee et al. |
| 5,793,413 A | 8/1998 | Hylton et al. |
| 5,793,971 A | 8/1998 | Fujita et al. |
| 5,805,699 A | 9/1998 | Akiyama et al. |
| 5,818,934 A | 10/1998 | Cuccia |
| 5,826,165 A | 10/1998 | Echeita et al. |
| 5,831,664 A | 11/1998 | Wharton et al. |
| 5,845,240 A | 12/1998 | Fielder |
| 5,848,158 A | 12/1998 | Saito et al. |
| 5,850,218 A | 12/1998 | Lajoie et al. |
| 5,864,747 A | 1/1999 | Clark et al. |
| 5,864,757 A | 1/1999 | Parker |
| 5,867,207 A | 2/1999 | Chaney et al. |
| 5,867,579 A | 2/1999 | Saito |
| 5,870,474 A | 2/1999 | Wasilewski et al. |
| 5,872,353 A | 2/1999 | Reichardt et al. |
| 5,878,141 A | 3/1999 | Daly et al. |
| 5,886,995 A | 3/1999 | Arsenault et al. |
| 5,889,941 A | 3/1999 | Tushie et al. |
| 5,892,508 A | 4/1999 | Howe et al. |
| 5,892,535 A | 4/1999 | Allen et al. |
| 5,892,536 A | 4/1999 | Logan et al. |
| 5,894,320 A | 4/1999 | Vancelette |
| 5,898,159 A | 4/1999 | Huang |

(56) References Cited

U.S. PATENT DOCUMENTS

| | | |
|---|---|---|
| 5,899,919 A | 4/1999 | Yuen |
| 5,899,582 A | 5/1999 | Dulac |
| 5,912,969 A | 6/1999 | Sasamoto et al. |
| 5,914,941 A | 6/1999 | Janky |
| 5,917,481 A | 6/1999 | Rzeszewski et al. |
| 5,923,362 A | 7/1999 | Klosterman |
| 5,926,205 A | 7/1999 | Krause et al. |
| 5,930,215 A | 7/1999 | Fite et al. |
| 5,933,500 A | 8/1999 | Blatter et al. |
| 5,936,222 A | 8/1999 | Korsunsky et al. |
| 5,936,660 A | 8/1999 | Gurantz |
| 5,937,067 A | 8/1999 | Thatcher et al. |
| 5,940,737 A | 8/1999 | Eastman |
| 5,951,639 A | 9/1999 | MacInnis |
| 5,953,418 A | 9/1999 | Bock et al. |
| 5,966,186 A | 10/1999 | Shigihara et al. |
| 5,973,756 A | 10/1999 | Erlin |
| 5,978,037 A | 11/1999 | Hilpert et al. |
| 5,978,649 A | 11/1999 | Kahn et al. |
| 5,999,628 A | 12/1999 | Chan |
| 5,999,629 A | 12/1999 | Heer |
| 6,005,937 A | 12/1999 | Lee |
| 6,006,987 A | 12/1999 | Hoolhorst |
| 6,009,116 A | 12/1999 | Bednarek et al. |
| 6,009,307 A | 12/1999 | Granata et al. |
| 6,011,511 A | 1/2000 | Chuong et al. |
| 6,011,597 A | 1/2000 | Kubo |
| 6,025,868 A | 2/2000 | Russo |
| 6,035,038 A | 3/2000 | Campinos et al. |
| 6,038,319 A | 3/2000 | Chari |
| 6,041,056 A | 3/2000 | Bigham et al. |
| 6,052,554 A | 4/2000 | Hendricks et al. |
| 6,055,314 A | 4/2000 | Spies |
| 6,055,566 A | 4/2000 | Kikinis |
| 6,061,451 A | 5/2000 | Muratani et al. |
| 6,061,452 A | 5/2000 | Suzuki |
| 6,064,724 A | 5/2000 | Kelly |
| 6,067,107 A | 5/2000 | Travaille et al. |
| 6,067,440 A | 5/2000 | Diefes |
| 6,069,647 A | 5/2000 | Sullivan et al. |
| 6,072,873 A | 6/2000 | Bewick |
| 6,072,982 A | 6/2000 | Haddad |
| 6,075,330 A | 6/2000 | Terk |
| 6,091,883 A | 7/2000 | Artigalas et al. |
| 6,097,441 A | 8/2000 | Allport |
| 6,101,171 A | 8/2000 | Yoshida et al. |
| 6,105,134 A | 8/2000 | Pinder et al. |
| 6,105,868 A | 8/2000 | Reichardt |
| 6,115,074 A | 9/2000 | Ozkan et al. |
| 6,141,531 A | 10/2000 | Williams et al. |
| 6,144,400 A | 11/2000 | Ebisawa |
| 6,148,081 A | 11/2000 | Szymanski et al. |
| 6,148,400 A | 11/2000 | Arnold |
| 6,154,206 A | 11/2000 | Ludtke |
| 6,157,719 A | 12/2000 | Wasilewski et al. |
| 6,157,949 A | 12/2000 | Cheng et al. |
| 6,160,988 A | 12/2000 | Shroyer et al. |
| 6,163,284 A | 12/2000 | Manarata |
| 6,169,877 B1 | 1/2001 | Gulla |
| 6,169,879 B1 | 1/2001 | Perlman |
| 6,172,972 B1 | 1/2001 | Birdwell et al. |
| 6,175,362 B1 | 1/2001 | Harms et al. |
| 6,178,242 B1 | 1/2001 | Tsuria |
| 6,198,875 B1 | 3/2001 | Edenson et al. |
| 6,202,211 B1 | 3/2001 | Williams, Jr. |
| 6,208,636 B1 | 3/2001 | Tawil et al. |
| 6,212,682 B1 | 4/2001 | Kuno |
| 6,216,266 B1 | 4/2001 | Eastman et al. |
| 6,226,618 B1 | 5/2001 | Downs et al. |
| 6,229,895 B1 | 5/2001 | Son et al. |
| 6,240,401 B1 | 5/2001 | Oren et al. |
| 6,253,375 B1 | 6/2001 | Gordon et al. |
| 6,263,504 B1 | 7/2001 | Ebisawa |
| 6,263,506 B1 | 7/2001 | Ezaki et al. |
| 6,266,480 B1 | 7/2001 | Ezaki et al. |
| 6,266,481 B1 | 7/2001 | Lee et al. |
| 6,267,295 B1 | 7/2001 | Amagai et al. |
| 6,275,991 B1 | 8/2001 | Erlin |
| 6,286,142 B1 | 9/2001 | Ehreth |
| 6,288,716 B1 | 9/2001 | Humpleman et al. |
| 6,289,314 B1 | 9/2001 | Matsuzaki et al. |
| 6,289,455 B1 | 9/2001 | Kocher et al. |
| 6,292,568 B1 | 9/2001 | Akins, III et al. |
| 6,298,441 B1 | 10/2001 | Handelman et al. |
| 6,310,661 B1 | 10/2001 | Arsenault |
| 6,317,883 B2 | 11/2001 | Marics |
| 6,317,884 B1 | 11/2001 | Eames et al. |
| 6,331,979 B1 | 12/2001 | Dillon et al. |
| 6,363,525 B1 | 3/2002 | Dougherty et al. |
| 6,370,318 B1 | 4/2002 | Iwaki |
| 6,370,688 B1 | 4/2002 | Hejna |
| 6,381,747 B1 | 4/2002 | Wonfor et al. |
| 6,398,245 B1 | 6/2002 | Gruse et al. |
| 6,405,372 B1 | 6/2002 | Kim |
| 6,408,437 B1 | 6/2002 | Hendricks et al. |
| 6,415,031 B1 | 7/2002 | Colligan et al. |
| 6,418,421 B1 | 7/2002 | Hurtado et al. |
| 6,418,424 B1 | 7/2002 | Hoffberg et al. |
| 6,424,717 B1 | 7/2002 | Pinder et al. |
| 6,424,947 B1 | 7/2002 | Tsuria et al. |
| 6,430,165 B1 | 8/2002 | Arsenault |
| 6,437,836 B1 | 8/2002 | Huang et al. |
| 6,441,797 B1 | 8/2002 | Shah |
| 6,442,525 B1 | 8/2002 | Silverbrook et al. |
| 6,456,985 B1 | 9/2002 | Ohtsuka |
| 6,466,671 B1 | 10/2002 | Maillard et al. |
| 6,466,921 B1 | 10/2002 | Cordery et al. |
| 6,473,858 B1 | 10/2002 | Shimomura et al. |
| 6,476,825 B1 | 11/2002 | Croy et al. |
| 6,480,667 B1 | 11/2002 | O'Connor |
| 6,487,663 B1 | 11/2002 | Jaisimha et al. |
| 6,487,722 B1 | 11/2002 | Okura et al. |
| 6,496,980 B1 | 12/2002 | Tillman et al. |
| 6,502,139 B1 | 12/2002 | Birk et al. |
| 6,510,519 B2 | 1/2003 | Wasilewski et al. |
| 6,516,412 B2 | 2/2003 | Wasilewski et al. |
| 6,516,465 B1 | 2/2003 | Paskins |
| 6,519,693 B1 | 2/2003 | De Bey |
| 6,519,772 B1 | 2/2003 | Bopardikar |
| 6,529,680 B1 | 3/2003 | Broberg |
| 6,530,085 B1 | 3/2003 | Perlman |
| 6,539,548 B1 | 3/2003 | Hendricks et al. |
| 6,542,870 B1 | 4/2003 | Matsumoto |
| 6,543,053 B1 | 4/2003 | Li et al. |
| 6,550,011 B1 | 4/2003 | Sims |
| 6,560,340 B1 | 5/2003 | Akins et al. |
| 6,574,609 B1 | 6/2003 | Downs et al. |
| 6,574,795 B1 | 6/2003 | Carr |
| 6,588,017 B1 | 7/2003 | Calderone |
| 6,588,673 B1 | 7/2003 | Chan et al. |
| 6,591,419 B2 | 7/2003 | Barry et al. |
| 6,611,812 B2 | 8/2003 | Hurtado et al. |
| 6,622,307 B1 | 9/2003 | Ho |
| 6,636,966 B1 | 10/2003 | Lee et al. |
| 6,637,027 B1 | 10/2003 | Breslauer et al. |
| 6,654,547 B1 | 11/2003 | Maeda et al. |
| 6,655,580 B1 | 12/2003 | Ergo et al. |
| 6,668,377 B1 | 12/2003 | Dunn |
| 6,671,881 B1 | 12/2003 | Tamer et al. |
| 6,675,384 B1 | 1/2004 | Block et al. |
| 6,681,326 B2 | 1/2004 | Son et al. |
| 6,687,683 B1 | 2/2004 | Harada et al. |
| 6,697,489 B1 | 2/2004 | Candelore |
| 6,701,528 B1 | 3/2004 | Arsenault et al. |
| 6,714,650 B1 | 3/2004 | Maillard et al. |
| 6,741,574 B2 | 5/2004 | Arsenault |
| 6,741,834 B1 | 5/2004 | Godwin |
| 6,745,245 B1 | 6/2004 | Carpenter |
| 6,748,080 B2 | 6/2004 | Russ et al. |
| 6,754,827 B1 | 6/2004 | Cane et al. |
| 6,754,904 B1 | 6/2004 | Cooper et al. |
| 6,766,451 B1 | 7/2004 | Van Rijnsoever |
| 6,772,133 B1 | 8/2004 | Kambayashi et al. |
| 6,772,434 B1 | 8/2004 | Godwin |

(56) References Cited

U.S. PATENT DOCUMENTS

| | | |
|---|---|---|
| 6,792,618 B1 | 9/2004 | Bendinelli et al. |
| 6,804,357 B1 | 10/2004 | Ikonen et al. |
| 6,810,387 B1 | 10/2004 | Yim |
| 6,816,596 B1 | 11/2004 | Peinado et al. |
| 6,816,970 B2 | 11/2004 | Morgan et al. |
| 6,824,051 B2 | 11/2004 | Reddy et al. |
| 6,834,111 B1 | 12/2004 | Nishmura et al. |
| 6,853,728 B1 | 2/2005 | Kahn et al. |
| 6,862,582 B2 | 3/2005 | Harada et al. |
| 6,889,208 B1 | 5/2005 | Okabe et al. |
| 6,904,522 B1 | 6/2005 | Benardeau et al. |
| 6,912,513 B1 | 6/2005 | Candelore |
| 6,934,963 B1 | 8/2005 | Reynolds et al. |
| 6,961,858 B2 | 11/2005 | Fransdonk |
| 6,985,591 B2 | 1/2006 | Graunke |
| 6,987,854 B2 | 1/2006 | Maillard |
| 6,993,433 B2 | 1/2006 | Gagnon et al. |
| 6,993,499 B2 | 1/2006 | Gagnon et al. |
| 6,993,782 B1 | 1/2006 | Newberry et al. |
| 7,003,791 B2 | 2/2006 | Mizutani |
| 7,007,170 B2 | 2/2006 | Morten |
| 7,016,498 B2 | 3/2006 | Peinado et al. |
| 7,032,236 B1 | 4/2006 | Ozkan et al. |
| 7,035,827 B2 | 4/2006 | Ezaki |
| 7,036,011 B2 | 4/2006 | Grimes et al. |
| 7,039,615 B1 | 5/2006 | Gajjala |
| 7,058,802 B1 | 6/2006 | Epstein et al. |
| 7,072,865 B2 | 7/2006 | Akiyama |
| 7,073,073 B1 | 7/2006 | Nonaka et al. |
| 7,085,529 B1 | 8/2006 | Arsenault et al. |
| 7,093,295 B1 | 8/2006 | Saito |
| 7,099,946 B2 | 8/2006 | Lennon et al. |
| 7,124,938 B1 * | 10/2006 | Marsh ............... G06F 21/10 235/382 |
| 7,177,911 B2 | 2/2007 | deCarmo |
| 7,191,155 B2 | 3/2007 | Maruyama et al. |
| 7,191,335 B1 | 3/2007 | Maillard |
| 7,194,757 B1 | 3/2007 | Fish et al. |
| 7,203,311 B1 | 4/2007 | Kahn et al. |
| 7,203,314 B1 | 4/2007 | Kahn et al. |
| 7,228,439 B2 | 6/2007 | Sasselli |
| 7,231,450 B1 | 6/2007 | Clifford et al. |
| 7,277,928 B2 | 10/2007 | Lennon |
| 7,298,849 B2 | 11/2007 | Graunke |
| 7,327,931 B2 | 2/2008 | Frantz |
| 7,328,455 B2 | 2/2008 | Jutzi et al. |
| 7,369,660 B1 | 5/2008 | Kahn |
| 7,370,342 B2 | 5/2008 | Ismail et al. |
| 7,382,879 B1 | 6/2008 | Miller |
| 7,400,774 B2 | 7/2008 | Puri |
| 7,403,618 B2 | 7/2008 | Van Rijnsoever et al. |
| 7,457,414 B1 | 11/2008 | Kahn et al. |
| 7,461,249 B1 | 12/2008 | Pearson et al. |
| 7,492,897 B1 | 2/2009 | Eskicioglu et al. |
| 7,496,540 B2 | 2/2009 | Irwin et al. |
| 7,539,307 B2 | 5/2009 | Lotspiech et al. |
| 7,546,623 B2 | 6/2009 | Ramraz et al. |
| 7,590,243 B2 | 9/2009 | Kahn |
| 7,912,219 B1 | 3/2011 | Michener |
| 7,992,175 B2 | 8/2011 | Klauss et al. |
| 8,001,565 B2 | 8/2011 | Kahn et al. |
| 8,095,466 B2 | 1/2012 | Kahn et al. |
| 8,140,859 B1 | 3/2012 | Kahn et al. |
| 8,359,102 B2 | 1/2013 | Alataris |
| 8,532,293 B2 | 9/2013 | Kalm |
| 8,682,802 B1 | 3/2014 | Kannanari |
| 8,763,059 B1 | 6/2014 | James et al. |
| 8,775,319 B2 | 7/2014 | Kahn et al. |
| 8,996,421 B2 | 3/2015 | Kahn et al. |
| 9,485,469 B2 | 11/2016 | Kahn et al. |
| 2001/0001876 A1 | 5/2001 | Morgan et al. |
| 2001/0037452 A1 | 11/2001 | Go et al. |
| 2001/0046299 A1 | 11/2001 | Wasilewski et al. |
| 2001/0047516 A1 | 11/2001 | Swain et al. |
| 2001/0053979 A1 | 12/2001 | Kori |
| 2001/0056576 A1 | 12/2001 | Park |
| 2002/0001386 A1 | 1/2002 | Akiyama |
| 2002/0002674 A1 | 1/2002 | Grimes et al. |
| 2002/0010920 A1 | 1/2002 | Bertram |
| 2002/0013948 A1 | 1/2002 | Aguayo, Jr. et al. |
| 2002/0019984 A1 | 2/2002 | Rakib |
| 2002/0021805 A1 | 2/2002 | Schumann et al. |
| 2002/0023219 A1 | 2/2002 | Treffers et al. |
| 2002/0026640 A1 | 2/2002 | Graan |
| 2002/0040475 A1 | 4/2002 | Yap et al. |
| 2002/0046336 A1 | 4/2002 | Kon et al. |
| 2002/0048367 A1 | 4/2002 | Maillard |
| 2002/0051539 A1 | 5/2002 | Okimoto et al. |
| 2002/0054752 A1 | 5/2002 | Wood et al. |
| 2002/0056112 A1 | 5/2002 | Dureau et al. |
| 2002/0056118 A1 | 5/2002 | Hunter et al. |
| 2002/0064152 A1 | 5/2002 | Lemley et al. |
| 2002/0067914 A1 | 6/2002 | Schumann et al. |
| 2002/0071434 A1 | 6/2002 | Furukawa |
| 2002/0094084 A1 | 7/2002 | Wasilewski et al. |
| 2002/0095679 A1 | 7/2002 | Bonini |
| 2002/0100052 A1 | 7/2002 | Daniels |
| 2002/0101991 A1 | 8/2002 | Bacon et al. |
| 2002/0112235 A1 | 8/2002 | Balton et al. |
| 2002/0112243 A1 | 8/2002 | Hunter et al. |
| 2002/0114465 A1 | 8/2002 | Shen-Orr |
| 2002/0116705 A1 | 8/2002 | Perlman et al. |
| 2002/0124258 A1 | 9/2002 | Fritsch |
| 2002/0147979 A1 | 10/2002 | Corson |
| 2002/0154055 A1 | 10/2002 | Davis et al. |
| 2002/0161571 A1 * | 10/2002 | Matsushima ............ G06F 21/10 704/200 |
| 2002/0162104 A1 | 10/2002 | Raike et al. |
| 2002/0166121 A1 | 11/2002 | Rovira |
| 2002/0169971 A1 | 11/2002 | Asano et al. |
| 2002/0170054 A1 | 11/2002 | Kudelski et al. |
| 2002/0170072 A1 | 11/2002 | Lundbald et al. |
| 2002/0178454 A1 | 11/2002 | Antoine et al. |
| 2002/0196374 A1 | 12/2002 | Barry et al. |
| 2002/0196939 A1 | 12/2002 | Unger et al. |
| 2002/0198846 A1 | 12/2002 | Lao |
| 2003/0002679 A1 | 1/2003 | Akiyama et al. |
| 2003/0002680 A1 | 1/2003 | Akiyama et al. |
| 2003/0005285 A1 | 1/2003 | Graunke |
| 2003/0005429 A1 | 1/2003 | Colsey |
| 2003/0018968 A1 | 1/2003 | Avnet |
| 2003/0026428 A1 | 2/2003 | Loisel |
| 2003/0037006 A1 | 2/2003 | Maruyama et al. |
| 2003/0037331 A1 | 2/2003 | Lee |
| 2003/0040962 A1 | 2/2003 | Lewis et al. |
| 2003/0046702 A1 | 3/2003 | Sasaki |
| 2003/0061477 A1 | 3/2003 | Kahn et al. |
| 2003/0066884 A1 | 4/2003 | Reddy et al. |
| 2003/0084306 A1 | 5/2003 | Abburi |
| 2003/0088876 A1 | 5/2003 | Mao et al. |
| 2003/0097622 A1 | 5/2003 | Liu et al. |
| 2003/0105718 A1 | 6/2003 | Hurtado et al. |
| 2003/0110132 A1 | 6/2003 | Sako |
| 2003/0121047 A1 | 6/2003 | Watson et al. |
| 2003/0122966 A1 | 7/2003 | Markman et al. |
| 2003/0131349 A1 | 7/2003 | Kuczynski-Brown |
| 2003/0131353 A1 | 7/2003 | Blom et al. |
| 2003/0145183 A1 | 7/2003 | Muehring et al. |
| 2003/0156649 A1 | 8/2003 | Abrams, Jr. |
| 2003/0163684 A1 | 8/2003 | Franksdonk |
| 2003/0167392 A1 | 9/2003 | Fransdonk |
| 2003/0174844 A1 | 9/2003 | Candelore |
| 2003/0177365 A1 | 9/2003 | Buhan et al. |
| 2003/0188154 A1 | 10/2003 | Dallard |
| 2003/0188164 A1 | 10/2003 | Okimoto |
| 2003/0188316 A1 | 10/2003 | DePrez |
| 2003/0190149 A1 | 10/2003 | Chang et al. |
| 2003/0196113 A1 | 10/2003 | Brown et al. |
| 2003/0196204 A1 | 10/2003 | Thiagarajan et al. |
| 2003/0208771 A1 | 11/2003 | Mensgen et al. |
| 2003/0212997 A1 | 11/2003 | Hejna |
| 2003/0223468 A1 | 12/2003 | Koga |
| 2003/0228911 A1 | 12/2003 | Dernis et al. |
| 2003/0229898 A1 | 12/2003 | Babu et al. |

(56) References Cited

U.S. PATENT DOCUMENTS

| | | |
|---|---|---|
| 2003/0229900 A1 | 12/2003 | Reisman |
| 2003/0233561 A1* | 12/2003 | Ganesan ............... G06F 21/10 713/193 |
| 2004/0003079 A1 | 1/2004 | Alu et al. |
| 2004/0032950 A1 | 2/2004 | Graunke |
| 2004/0049796 A1 | 3/2004 | Briggs |
| 2004/0052377 A1 | 3/2004 | Mattox et al. |
| 2004/0054920 A1 | 3/2004 | Wilson |
| 2004/0060065 A1 | 3/2004 | James et al. |
| 2004/0068747 A1 | 4/2004 | Robertson et al. |
| 2004/0073954 A1 | 4/2004 | Bjordammen et al. |
| 2004/0078828 A1 | 4/2004 | Parchman et al. |
| 2004/0083487 A1 | 4/2004 | Collens et al. |
| 2004/0088558 A1 | 5/2004 | Candelore |
| 2004/0101138 A1 | 5/2004 | Revital et al. |
| 2004/0102154 A1 | 5/2004 | Klauss et al. |
| 2004/0126093 A1 | 7/2004 | Platt et al. |
| 2004/0133908 A1 | 7/2004 | Smith |
| 2004/0139480 A1 | 7/2004 | Delpuch et al. |
| 2004/0148634 A1 | 7/2004 | Arsenault et al. |
| 2004/0168063 A1 | 8/2004 | Revital |
| 2004/0168071 A1 | 8/2004 | Silverbrook |
| 2004/0177369 A1 | 9/2004 | Akins |
| 2004/0190721 A1 | 9/2004 | Barrett et al. |
| 2004/0193550 A1 | 9/2004 | Siegel |
| 2004/0205812 A1 | 10/2004 | Candelore |
| 2004/0221305 A1 | 11/2004 | Broussard et al. |
| 2004/0237100 A1 | 11/2004 | Pinder et al. |
| 2004/0249815 A1 | 12/2004 | Lee |
| 2004/0250293 A1 | 12/2004 | Ryal et al. |
| 2004/0260798 A1 | 12/2004 | Addington et al. |
| 2004/0261126 A1 | 12/2004 | Addington et al. |
| 2005/0005286 A1 | 1/2005 | Koskela et al. |
| 2005/0010531 A1 | 1/2005 | Kushalnagar |
| 2005/0039025 A1 | 2/2005 | Main et al. |
| 2005/0050333 A1 | 3/2005 | Yeap et al. |
| 2005/0055721 A1 | 3/2005 | Zigmond |
| 2005/0055724 A1 | 3/2005 | Atad et al. |
| 2005/0061884 A1 | 3/2005 | Stewart |
| 2005/0071280 A1 | 3/2005 | Irwin et al. |
| 2005/0068173 A1 | 4/2005 | Kalwit |
| 2005/0084102 A1 | 4/2005 | Hollar |
| 2005/0086696 A1 | 4/2005 | Daniels |
| 2005/0091681 A1 | 4/2005 | Borden et al. |
| 2005/0097596 A1 | 5/2005 | Pedlow, Jr. |
| 2005/0102506 A1 | 5/2005 | Pica et al. |
| 2005/0107157 A1 | 5/2005 | Wachtfogel et al. |
| 2005/0108519 A1 | 5/2005 | Barton et al. |
| 2005/0144248 A1 | 6/2005 | Doganowski et al. |
| 2005/0144468 A1 | 6/2005 | Northcutt et al. |
| 2005/0144478 A1 | 6/2005 | Yamanaka |
| 2005/0169468 A1 | 8/2005 | Fahrny et al. |
| 2005/0182931 A1 | 8/2005 | Robert et al. |
| 2005/0183112 A1 | 8/2005 | Duval |
| 2005/0195975 A1 | 9/2005 | Kawakita |
| 2005/0195978 A1 | 9/2005 | Babic |
| 2005/0204391 A1 | 9/2005 | Hunleth et al. |
| 2005/0216942 A1 | 9/2005 | Barton |
| 2005/0225857 A1 | 10/2005 | Inagaki |
| 2005/0235338 A1 | 10/2005 | AbiEzzi |
| 2005/0235361 A1 | 10/2005 | Akove et al. |
| 2005/0249350 A1 | 11/2005 | Kahn et al. |
| 2005/0262573 A1 | 11/2005 | Bo et al. |
| 2006/0015750 A1 | 1/2006 | Ashley et al. |
| 2006/0031873 A1 | 2/2006 | Fahrny et al. |
| 2006/0037037 A1 | 2/2006 | Miranz |
| 2006/0039560 A1 | 2/2006 | Wasilewski |
| 2006/0039565 A1 | 2/2006 | Kim et al. |
| 2006/0041905 A1 | 2/2006 | Wasilewski |
| 2006/0085835 A1 | 4/2006 | Istvan et al. |
| 2006/0107285 A1 | 5/2006 | Medvinsky |
| 2006/0120309 A1 | 6/2006 | Bigras et al. |
| 2006/0164544 A1 | 7/2006 | Lecomte |
| 2006/0167817 A1 | 7/2006 | Gajjala |
| 2006/0168663 A1 | 7/2006 | Viljoen et al. |
| 2006/0179489 A1 | 8/2006 | Mas Ribes |
| 2006/0195881 A1 | 8/2006 | Segev et al. |
| 2006/0218620 A1 | 9/2006 | Nadarajah et al. |
| 2006/0242069 A1* | 10/2006 | Peterka ................ G06F 21/10 705/50 |
| 2007/0021053 A1 | 1/2007 | Marrah |
| 2007/0092077 A1 | 4/2007 | Yoshida et al. |
| 2007/0092078 A1 | 4/2007 | Yoshida et al. |
| 2007/0100701 A1 | 5/2007 | Boccon-Gibod et al. |
| 2007/0124602 A1 | 5/2007 | Wald et al. |
| 2007/0160142 A1 | 7/2007 | Abrams, Jr. |
| 2007/0160198 A1 | 7/2007 | Orsini et al. |
| 2007/0198414 A1 | 8/2007 | Derrenberger |
| 2007/0240193 A1 | 10/2007 | Sie et al. |
| 2007/0265966 A1 | 11/2007 | Kahn et al. |
| 2007/0265967 A1 | 11/2007 | Kahn et al. |
| 2007/0265973 A1 | 11/2007 | Kahn et al. |
| 2007/0266414 A1 | 11/2007 | Kahn |
| 2008/0098450 A1 | 4/2008 | Wu et al. |
| 2009/0216623 A1 | 8/2009 | Hendricks et al. |
| 2010/0031059 A1 | 2/2010 | Laackmann |
| 2010/0175092 A1 | 7/2010 | Kikinis et al. |
| 2011/0271306 A1 | 11/2011 | Klauss et al. |
| 2012/0328800 A1 | 12/2012 | Yoon et al. |

FOREIGN PATENT DOCUMENTS

| | | |
|---|---|---|
| EP | 0817485 | 1/1998 |
| EP | 0912052 | 4/1999 |
| EP | 0936812 | 8/1999 |
| EP | 0975165 | 1/2000 |
| EP | 0989557 | 3/2000 |
| EP | 1030463 | 8/2000 |
| EP | 1122910 | 8/2001 |
| EP | 1156676 | 11/2001 |
| EP | 1158790 | 11/2001 |
| EP | 1176826 | 1/2002 |
| EP | 1176827 | 1/2002 |
| EP | 0002703 | 8/2002 |
| EP | 0008703 | 8/2002 |
| EP | 1304871 | 4/2003 |
| EP | 1353511 | 10/2003 |
| EP | 1369152 | 12/2003 |
| EP | 1418701 | 5/2004 |
| GB | 2272822 | 5/1994 |
| GB | 2354392 | 3/2001 |
| JP | 04175025 | 6/1992 |
| JP | 04288743 | 10/1992 |
| JP | 05284499 | 10/1993 |
| JP | 06351023 | 12/1994 |
| JP | 08125651 | 5/1996 |
| JP | 08287014 | 11/1996 |
| JP | 10013784 | 1/1998 |
| JP | 11136708 | 5/1999 |
| JP | 11220444 | 8/1999 |
| JP | 11232776 | 8/1999 |
| JP | 11284584 | 10/1999 |
| JP | 2000122539 | 4/2000 |
| JP | 2000122933 | 4/2000 |
| JP | 2001203686 | 7/2001 |
| JP | 2003448274 | 2/2005 |
| JP | 2005505989 | 2/2005 |
| WO | 8910670 | 11/1989 |
| WO | 9111884 | 8/1991 |
| WO | 9211713 | 7/1992 |
| WO | 9856180 | 12/1998 |
| WO | 9907150 | 2/1999 |
| WO | 9909743 | 2/1999 |
| WO | 9918729 | 4/1999 |
| WO | 9927666 | 8/1999 |
| WO | 9941907 | 8/1999 |
| WO | 9943120 | 8/1999 |
| WO | 0008909 | 2/2000 |
| WO | 0013412 | 3/2000 |
| WO | 0014967 | 3/2000 |
| WO | 0019294 | 4/2000 |
| WO | 0030354 | 5/2000 |
| WO | 0056068 | 9/2000 |
| WO | 0117159 | 3/2001 |

(56) References Cited

FOREIGN PATENT DOCUMENTS

| WO | 0122724 | 3/2001 |
|---|---|---|
| WO | 0137546 | 5/2001 |
| WO | 0143444 | 6/2001 |
| WO | 0165762 | 9/2001 |
| WO | 0177783 | 10/2001 |
| WO | 0182600 | 11/2001 |
| WO | 0198903 | 12/2001 |
| WO | 0199422 | 12/2001 |
| WO | 0215184 | 2/2002 |
| WO | 02063879 | 8/2002 |
| WO | 02065750 | 8/2002 |
| WO | 03101105 | 12/2003 |
| WO | 04014075 | 2/2004 |
| WO | 04017637 | 2/2004 |
| WO | 2004/049715 | 6/2004 |
| WO | 04057871 | 7/2004 |
| WO | 04082286 | 9/2004 |

OTHER PUBLICATIONS

Advisory Action dated Jun. 22, 2006 in U.S. Appl. No. 09/960,824, filed Sep. 21, 2001 by Raynold M. Kahn et al.
Advisory Action dated Jan. 7, 2008 in U.S. Appl. No. 10/790,466, filed Mar. 1, 2004 by Dulac, Stephen P.
Anerousis,N., "*Skycast: The Satellite Digital Broadcast Relay Service,*" ATT&T Labs Research, unpublished manuscript, 1999, pp. 1-4.
Bruce Schneier, Applied Cryptography—Protocols, Algorithms, and Source Code in C, $2^{nd}$ Edition, pp. 216-222, 357-362.
Carsten Griwodz, Oliver Merkel, Jana Dittman, Ralf Steinmetz, "Protecting VoD the Easier Way," International Multimedia Conference Proceedings of the $6^{th}$ ACM International Conference on Multimedia, pp. 21-28, ACM Press, New York, NY, 2002 ISBN: 0-201-30990-4.
Derfler, "How Networks Work," Bestseller Edition, 1996, Ziff-Davis Press, Emeryville, CA, all pages.
"Download PocketTV (beta) for WinCE" [online], Nov. 3, 1999 MPEG TV, LLC [retrieved on Mar. 26, 2004]. Retrieved from the Internet <URL: http://web.archive.org/web/19991127093158/www.mpegtv.com/wince/pockettylindex.html>.
EBU Project Group B/CA; "Functional model of a Conditional Access System"; EBU Technical Review; Jun. 10, 1995; pp. 64-77.
Notice of Allowance dated Nov. 8, 2005 in U.S. Appl. No. 09/620,833, filed Jul. 21, 2000 by Raynold M. Kahn et al. (2 pages).
EPO Communication dated Sep. 14, 2004 in European counterpart Application No. 01 117 554.4 of U.S. Appl. No. 09/621,476, filed Jul. 21, 2000 by Raynold M. Kahn et al., now Apr. 10, 2007 as U.S. Pat. No. 7,203,311.
EPO Communication dated Sep. 14, 2004 in European counterpart Application No. 01 117 556.9 of U.S. Appl. No. 09/620,833, filed Jul. 21, 2000 by Raynold M. Kahn et al.
EPO Communication dated Sep. 17, 2004 in European counterpart Application No. 01 177 555.1 of U.S. Appl. No. 09/620,772, filed Jul. 21, 2000 by Raynold M. Kahn et al.
EPO Communication dated Mar. 5, 2007 in European counterpart Application No. 01 117 556.9 of U.S. Appl. No. 09/620,833, filed Jul. 21, 2000 by Raynold M. Kahn et al.
EPO Communication dated Apr. 25, 2007 in European counterpart Application No. 01 117 554.4 of U.S. Appl. No. 09/621,476, filed Jul. 21, 2002 by Raynold M. Kahn et al., now Apr. 10, 2007 as U.S. Pat. No. 7,203,311.
Notice of Allowance dated Feb. 11, 2005 in U.S. Appl. No. 09/620,833, filed Jul. 21, 2000 by Raynold M. Kahn et al. (3 pages).
Non-final Office Action dated Apr. 23, 2004 in U.S. Appl. No. 09/620,833, filed Jul. 21, 2000 by Raynold M. Kahn et al. (5 pages).
EPO Communication dated May 10, 2010 in European Patent Application No. 02789167.7 filed Sep. 20, 2002 by Raynold M. Kahn et al.

EPO Communication dated Sep. 14, 2004 in European counterpart Application No. 01 117 553.6 of U.S. Appl. No. 09/620,832, filed Jul. 21, 2000 by Raynold M. kahn et al., now issued Feb. 8, 2005 as U.S. Pat. No. 6,853,728.
EPO Decision of Refusal dated Mar. 8, 2007 in European counterpart Application No. 01 117 553.6 of U.S. Appl. No. 09/620,832, filed Jul. 21, 2000 by Raynold M. Kahn et al., now Feb. 8, 2005 as U.S. Pat. No. 6,853,728.
EPO Minutes of the Oral Proceedings dated Nov. 16, 2007 in European counterpart Application No. 01 117 555.1 of U.S. Appl. No. 09/620,772, filed Jul. 21, 2000 by Raynold M. Kahn et al.
EPO Notice of Allowance dated Nov. 22, 2007 in European counterpart Application No. 01 117 555.1 of U.S. Appl. No. 09/620,772, filed Jul. 21, 2000 by Raynold M. Kahn et al.
EPO Notice of Allowance dated Oct. 29, 2007 in European counterpart Application No. 01 117 556.9 of U.S. Appl. No. 09/620,833, filed Jul. 21, 2000 by Raynold M. Kahn et al.
EPO Sumons to Attend Oral Proceedings dated Mar. 26, 2007 in European counterpart Application No. 01 117 555.1 of U.S. Appl. No. 09/620,772, filed Jul. 21, 2000 by Raynold M. Kahn et al.
Final Office Action dated Jan. 23, 2008 in U.S. Appl. No. 09/620,772, filed Jul. 21, 2000 by Kahn et al. (25 pages).
Final Rejection dated Apr. 14, 2006 in U.S. Appl. No. 09/960,824, filed Sep. 21, 2001 by Raynold M. Kahn et al.
Final Rejection dated Aug. 20, 2007 in U.S. Appl. No. 10/758,818, filed Jan. 16, 2004 by Raynold M. Kahn et al. (36 pages).
Final Rejection dated Sep. 25, 2007 in U.S. Appl. No. 10/758,865, filed Jan. 16, 2004 by Raynold M. Kahn et al.
Final Rejection dated Oct. 10, 2007 in U.S. Appl. No. 10/790,466, filed Mar. 1, 2004 by Raynold M. Kahn et al. (30 pages).
Final Rejection dated Mar. 25, 2009 in U.S. Appl. No. 11/434,538, filed May 15, 2006 by Raynold M. Kahn et al. (10 pages).
Final Rejection dated May 12, 2009 in U.S. Appl. No. 11/433,969, filed May 15, 2006 by Raynold M. Kahn et al. (18 pages).
Final Rejection dated Oct. 27, 2009 in U.S. Appl. No. 11/433,969, filed May 15, 2006 by Raynold M. Kahn et al. (18 pages).
Final Rejection dated Jun. 9, 2010 in U.S. Appl. No. 11/433,969, filed May 15, 2006 by Raynold M. Kahn et al. (23 pages).
Final Rejection dated Jun. 10, 2010 in U.S. Appl. No. 12/172,901, filed Jul. 14, 2008 by Raynold M. Kahn et al.
Final Rejection dated Nov. 12, 2010 in U.S. Appl. No. 11/433,926, filed May 15, 2006 by Peter M. Klauss et al.
Final Rejection dated Mar. 25, 2011 in U.S. Appl. No. 12/684,076, filed Jan. 7, 2010 by Raynold M. Kahn et al. (21 pages).
Final Rejection dated Oct. 26, 2011 in U.S. Appl. No. 11/434,528, filed May 15, 2006 by Raynold M. Kahn et al. (20 pages).
Final Rejection dated Nov. 1, 2012 in U.S. Appl. No. 12/684,076, filed Jan. 7, 2010 by Raynold M. Kahn et al.
Final Rejection dated May 9, 2013 in U.S. Appl. No. 13/179,433, filed Jul. 8, 2011 by Raynold M. Kahn et al. (24 pages).
Final Rejection dated Apr. 28, 2016 in U.S. Appl. No. 11/433,926, filed May 15, 2006 by Raynold M. Kahn et al. (21 pages).
Fink, Dan, "*ReadyTo Take the Dive? It's fast-forward as new DVDE and Divx formats hit market (includes graphic: Home video: the next generation plus: Some selections that swhow off the system)*", York Daily Record, Dec. 21, 1998, pp. 1-3.
Gralla, "How the Internet Works," Millennium Edition, 1999, Que Corporation, Indianapolis, IN, all pages.
Hewlett Packard "HP Jornada 430/430se Palm-size PC: User's Guide", 1999, (pp. 7-9).
Hewlett Packard "HP Jornada 430/430se Palm-size PC: User's Guide-Chapter 6", 1999, (pp. 43-54).
Huadong Ma, Kang G. Shin; "Multicast Video on Demand Services"; ACM SIGCOMM Computer Communication Review: vol. 32, Issue 1; Jan. 2002; pp. 31-43; ACM Press; New York NY.
"*Introduction to Encryption Theory*", published by Kyoritsu Shuppan Co., Feb. 25, 1993.
United States Patent and Trademark Office, "Non-Final Office Action," issued in connection with U.S. Appl. No. 11/433,926, dated Dec. 10, 2015 (19 pages).
United States Patent and Trademark Office, "Non-Final Office Action," issued in connection with U.S. Appl. No. 11/433,926, dated Dec. 24, 2009 (16 pages).

(56) References Cited

OTHER PUBLICATIONS

United States Patent and Trademark Office, "Final Rejection," issued in connection with U.S. Appl. No. 11/434,082, dated Aug. 7, 2009. (21 pages).
United States Patent and Trademark Office, "Final Rejection," issued in connection with U.S. Appl. No. 11/434,404, dated Nov. 10, 2009 (16 pages).
United States Patent and Trademark Office, "Final Rejection," issued in connection with U.S. Appl. No. 11/433,926, dated Apr. 4, 2017. (21 pages).
United States Patent and Trademark Office, "Final Office Action," issued in connection with U.S. Appl. No. 14/321,436, dated Oct. 3, 2016 (10 pages).
United States Patent and Trademark Office, "Final Office Action," issued in connection with U.S. Appl. No. 14/321,436, dated Jan. 13, 2017 (6 pages).
United States Patent and Trademark Office, "Notice of Allowance and Fee(s) Due," issued in connection with U.S. Appl. No. 14/321,436, dated Jul. 3, 2017 (5 pages).
United States Patent and Trademark Office, "Notice of Allowance and Fee(s) Due," issued in connection with U.S. Appl. No. 11/434,404, dated Feb. 18, 2014 (11 pages).
Wanjiun Liao, et al., *The Split and merge Protocol for Interactive Video-On-Demand*, IEEE MultiMedia, Oct.-Dec. 1997, vol. 4, No. 4, index and pp. 51-62.
White, "How Computers Work," Millennium Edition, 1999, Que Corporation, Indianapolis, IN, all pages.
Notice of Allowance dated Jun. 6, 2007 in U.S. Appl. No. 09/620,833, filed Jul. 21, 2000 by Raynold M. Kahn et al. (4 pages).
Notice of Allowance dated Sep. 27, 2007 in U.S. Appl. No. 09/620,833, filed Jul. 21, 2000 by Raynold M. Kahn et al. (4 pages).
Notice of Allowance dated Feb. 7, 2007 in U.S. Appl. No. 09/620,833, filed Jul. 21, 2000 by Raynold M. Kahn et al. (4 pages).
Notice of Allowance dated Nov. 7, 2006 in U.S. Appl. No. 09/620,833, filed Jul. 21, 2000 by Raynold M. Kahn et al. (2 pages).
Notice of Allowance dated Sep. 20, 2006 in U.S. Appl. No. 09/620,833, filed Jul. 21, 2000 by Raynold M. Kahn et al. (4 pages).
Notice of Allowance dated Apr. 24, 2006 in U.S. Appl. No. 09/620,833, filed Jul. 21, 2000 by Raynold M. Kahn et al. (4 pages).
Michael Robin, et al., *Digital Television Fundamentals—Design and Installation of Video and Audio Systems*, McGraw-Hill, Chapter 8, title page(s) and pp. 345-425.
Mounir A. Tantaoui, Kien A. Hua, Simon Sheu; "Interaction with Broadcast Video," International Multimedia Conference Proceedings of the 10$^{th}$ ACM International Conference on Multimedia, pp. 29-38, ACM Press, New York, NY, 2002 ISBN: 1-58113-620-X.
Muller, "Desktop Encyclopedia of the Internet," 1999, Artech House Inc., Norwood, MA, all pages.
Non-final Office Action dated Sep. 11, 2003 in U.S. Appl. No. 09/620,832, filed Jul. 21, 2000 by Kahn et al., now issued Feb. 8, 2005 as U.S. Pat. No. 6,853,728.
Non-final Office Action dated Feb. 26, 2004 in U.S. Appl. No. 09/620,773, filed Jul. 21, 2000 Kalm et al.
Non-final Office Action dated Mar. 1, 2004 in U.S. Appl. No. 09/620,772, filed Jul. 21, 2000by Raynold M. Kahn et al.
Non-final Office Action dated May 24, 2004 in U.S. Appl. No. 09/621,476, filed Jul. 21, 2000 by Kahn et al., now issued Apr. 10, 2007 as U.S. Pat. No. 7,203,311.
Non-final Office Action dated Aug. 25, 2004 in U.S. Appl. No. 09/620,773, filed Jul. 21, 2000 Kahn et al.
Non-final Office Action dated Oct. 20, 2004 in U.S. Appl. No. 09/620,772, filed Jul. 21, 2000by Raynold M. Kahn et al.
Non-final Office Action dated Jan. 27, 2005 in U.S. Appl. No. 09/621,476, filed Jul. 21, 2000 by Kahn et al., now issued Apr. 10, 2007 as U.S. Pat. No. 7,203,311.
Non-final Office Action dated Jul. 14, 2005 in U.S. Appl. No. 09/621,476 filed Jul. 21, 2000 by Kahn et al., now issued Apr. 10, 2007 as U.S. Pat. No. 7,203,311.
Non-final Office Action dated Oct. 31, 2005 in U.S. Appl. No. 09/960,824, filed Sep. 21, 2001 by Raynold M. Kahn et al.

Non-final Office Action dated Jul. 19, 2006 in U.S. Appl. No. 09/620,773, filed Jul. 21, 2000 Kahn et al.
Non-final Office Action dated Aug. 15, 2006 in U.S. Appl. No. 09/620,772, filed Jul. 21, 2000by Raynold M. Kahn et al.
Non-final Office Action dated Jan. 22, 2007 in U.S. Appl. No. 09/620,772, filed Jul. 21, 2000by Raynold M. Kahn et al.
Non-final Office Action dated Jul. 26, 2007 in U.S. Appl. No. 09/620,772, filed Jul. 21, 2000by Raynold M. Kahn et al.
Final Office Action dated Sep. 25, 2007 in U.S. Appl. No. 10/758,865, filed Jan. 16, 2004 by Raynold M. Kahn et al.
Non-final Office Action dated Dec. 4, 2007 in U.S. Appl. No. 10/758,811, filed Jan. 16, 2004 Kahn et at (30 pages).
Non-final Office Action dated Jan. 18, 2008 in U.S. Appl. No. 10/759,679, filed Jan. 19, 2004 by Arsenault et al. (15 pages).
Non-final Office Action dated Mar. 17, 2008 in U.S. Appl. No. 11/701,800, filed Feb. 2, 2007 by Raynold M. Kahn et al.
Non-final Office Action dated Apr. 11, 2008 in U.S. Appl. No. 11/434,437, filed May 15, 2006 by Raynold M. Kahn et al. (7 pages).
Non-final Office Action dated Apr. 14, 2008 in U.S. Appl. No. 11/434,538, filed May 15, 2006 by Raynold M. Kahn et al. (7 pages).
Non-final Office Action dated Oct. 16, 2008 in U.S. Appl. No. 11/434,437, filed May 15, 2006 by Raynold M. Kahn et al. (9 pages).
Non-final Office Action dated Oct. 20, 2008 in U.S. Appl. No. 11/434,538, filed May 15, 2006 by Raynold M. Kahn et al. (9 pages).
Non-final Office Action dated Nov. 14, 2008 in U.S. Appl. No. 11/433,969, filed May 15, 2006 by Raynold M. Kahn et al.
Non-final Office Action dated Oct. 27, 2009 in U.S. Appl. No. 11/433,969, filed May 15, 2006 by Raynold M. Kahn et al.
Non-final Office Action dated Jan. 21, 2009 in U.S. Appl. No. 11/434,082, filed May 15, 2006 by Raynold M. Kahn et al. (34 pages).
Non-final Office Action dated Oct. 7, 2009 in U.S. Appl. No. 11/434,528, filed May 15, 2006 by Raynold M. Kahn et al. (13 pages).
Non-final Office Action dated Oct. 28, 2009 in U.S. Appl. No. 11/434,437, filed May 15, 2006 by Raynold M. Kahn et al. (7 pages).
Non-final Office Action dated Oct. 29, 2009 in U.S. Appl. No. 11/434,538, filed May 15, 2006 by Raynold M. Kahn et al. (8 pages).
Non-final Office Action dated Nov. 6, 2009 in U.S. Appl. No. 12/184,957, filed Aug. 1, 2008 by Raynold M. Kahn et al.
Non-final Office Action dated Dec. 1, 2009 in U.S. Appl. No. 12/172,901, filed Jul. 14, 2008 by Raynold M. Kahn et al.
Yongchen Li, et al., *Security Enhanced MPEG Player*, IEEE, 1996, pp. 169-175.
Non-final Office Action dated Feb. 3, 2010 in U.S. Appl. No. 11/434,437, filed May 15, 2006 by Raynold M. Kahn et al.
Non-final Office Action dated Apr. 14, 2010 in U.S. Appl. No. 11/434,528, filed May 15, 2006 by Raynold M. Kahn et al. (14 pages).
Non-final Office Action dated Apr. 15, 2010 in U.S. Appl. No. 11/433,926, filed May 15, 2006 by Raynold M. Kahn et al. (17 pages).
Non-final Office Action dated May 13, 2010 in U.S. Appl. No. 11/434,538, filed May 15, 2006 by Raynold M. Kahn et al. (6 pages).
Non-final Office Action dated Sep. 17, 2010 in U.S. Appl. No. 12/684,076, filed Jan. 7, 2010 by Raynold M. Kahn et al. (18 pages).
Non-final Office Action dated Sep. 30, 2010 in U.S. Appl. No. 11/434,437, filed May 15, 2006 by Raynold M. Kahn et al. (9 pages).
Non-final Office Action dated Nov. 16, 2010 in U.S. Appl. No. 11/434,538, filed May 15, 2006 by Raynold M. Kahn et al. (8 pages).
Non-final Office Action dated May 2, 2011 in U.S. Appl. No. 11/434,528, filed May 15, 2006 by Raynold M. Kahn et al. (19 pages).

(56) References Cited

OTHER PUBLICATIONS

Non-final Office Action dated Mar. 29, 2012 in U.S. Appl. No. 12/684,076, filed Jan. 7, 2010 by Raynold M. Kahn et al. (22 pages).
Non-final Office Action dated Aug. 29, 2012 in U.S. Appl. No. 13/179,433, filed Jul. 8, 2011 by Raynold M. Kahn et al. (20 pages).
Non-final Office Action dated May 6, 2013 in U.S. Appl. No. 12/684,076, filed Jan. 7, 2010 by Raynold M. Kahn et al.
Non-final Office Action dated Aug. 21, 2014 in U.S. Appl. No. 11/434,528, filed May 15, 2006 by Raynold M. Kahn et al. (9 pages).
Notice of Allowance dated Sep. 22, 2004 in U.S. Appl. No. 09/620,832, filed Jul. 21, 2000 by Kahn et al., now issued Feb. 8, 2005 as U.S. Pat. No. 6,853,728.
Notice of Allowance dated Mar. 11, 2005 in U.S. Appl. No. 09/620,773, filed Jul. 21, 2000 by Kahn et al.
Notice of Allowance dated May 10, 2005 in U.S. Appl. No. 09/620,772, filed Jul. 21, 2000by Raynold M. Kahn et al.
Notice of Allowance dated Dec. 5, 2006 in U.S. Appl. No. 09/620,773, filed Jul. 21, 2000 by Kahn et al.
Notice of Allowance dated Oct. 19, 2006 in U.S. Appl. No. 09/621,476, filed Jul. 21, 2000 by Kahn et al., now issued Apr. 10, 2007 as U.S. Pat. No. 7,203,311.
Notice of Allowance dated Apr. 18, 2007 in U.S. Appl. No. 09/960,824, filed Sep. 21, 2001 by Kahn et al.
Notice of Allowance dated Dec. 5, 2007 in U.S. Appl. No. 09/620,833, filed Jul. 21, 2000 by Kahn et al. (9 pages).
Notice of Allowance dated Dec. 10, 2007 in U.S. Appl. No. 09/960,824, filed Sep. 21, 2001 by Kahn et al.
Notice of Allowance dated Apr. 21, 2008 in U.S. Appl. No. 09/620,772, filed Jul. 21, 2000 by Raynold M. Kahn et al.
Notice of Allowance dated Sep. 12, 2008 in U.S. Appl. No. 11/701,800, filed Feb. 2, 2007 by Raynold M. Kahn et al.
Notice of Allowance dated May 12, 2010 in U.S. Appl. No. 12/184,957, filed Aug. 1, 2008 by Raynold M. Kahn et al.
Notice of Allowance dated Mar. 9, 2011 in U.S. Appl. No. 11/433,969, filed May 15, 2006 by Raynold M. Kahn et al. (9 pages).
Notice of Allowance dated Apr. 7, 2011 in U.S. Appl. No. 11/434,437, filed May 15, 2006 by Raynold M. Kahn et al. (9 pages).
Notice of Allowance dated Sep. 6, 2011 in U.S. Appl. No. 11/434,538, filed May 15, 2006 by Raynold M. Kahn et al. (9 pages).
Notice of Allowance dated Jan. 2, 2014 in U.S. Appl. No. 12/684,076, filed Jan. 7, 2010 by Raynold M. Kahn et al.
Notice of Allowance dated Nov. 19, 2014 in U.S. Appl. No. 11/434,528, filed May 15, 2006 by Raynold M. Kahn et al. (5 pages).
Notice of Allowance dated Jun. 15, 2016 in U.S. Appl. No. 13/179,433, filed Jul. 8, 2011 by Raynold M. Kahn et al. (21 pages).
P. Venkat Rangan, et al., *Designing an On-Demand Multimedia Service*, IEEE Communications magazine, Jul. 1992, vol. 30, No. 7, title page and pp. 56-64.
United States Patent and Trademark Office, "Non-Final Office Action," issued in connection with U.S. Appl. No. 11/433,926, dated Sep. 21, 2016 (23 pages).
"PKCS #1 v2.1: RSA Cryptography Standard"; Jun. 14, 2002, RSA Laboratories, (61 pages).
"PocketTV-MPEG movie player for Pocket PC and WinCE" [online], May 17, 2000 MPEG TV, LLC [retrieved on Mar. 26, 2004]. Retrieved from the Intrnet <URL: http://web.archive.org/web/200006210123803/www.mpegtv.com/wince/pocketty/index.html>.
United States Patent and Trademark Office, "Non-Final Office Action," issued in connection with U.S. Appl. No. 11/434,404, dated May 26, 2009 (19 pages).
*Proposed SMPTE Standard for Television—Splice Points for MPEG-2 Transport Streams*, SMPTE Journal, Oct. 1998, SMPTE 312M, pp. 916-925.
Robert Johnston, et al., *A Digital television Sequence Store*, IEEE Transactions on Communications, May 1978, vol. Com-26, No. 5, index and pp. 594-600.
Sin-J00 Lee, et al., *A Survey of Watermarking Techniques Applied to Multimedia*, IEEE, 2001, pp. 272-277.
Tsubakiyama, Hideki and Koga, Keiichiro; "Security for Information Data Broadcasting System with conditional-Access Control"; IEEE; 1993; pp. 164-170.
United States Patent and Trademark Office, "Non-Final Office Action," issued in connection with U.S. Appl. No. 14/671,778, dated Jan. 29, 2016 (14 pages).
United States Patent and Trademark Office, "Non-Final Office Action," issued in connection with U.S. Appl. No. 14/321,436, dated May 17, 2016 (14 pages).

* cited by examiner

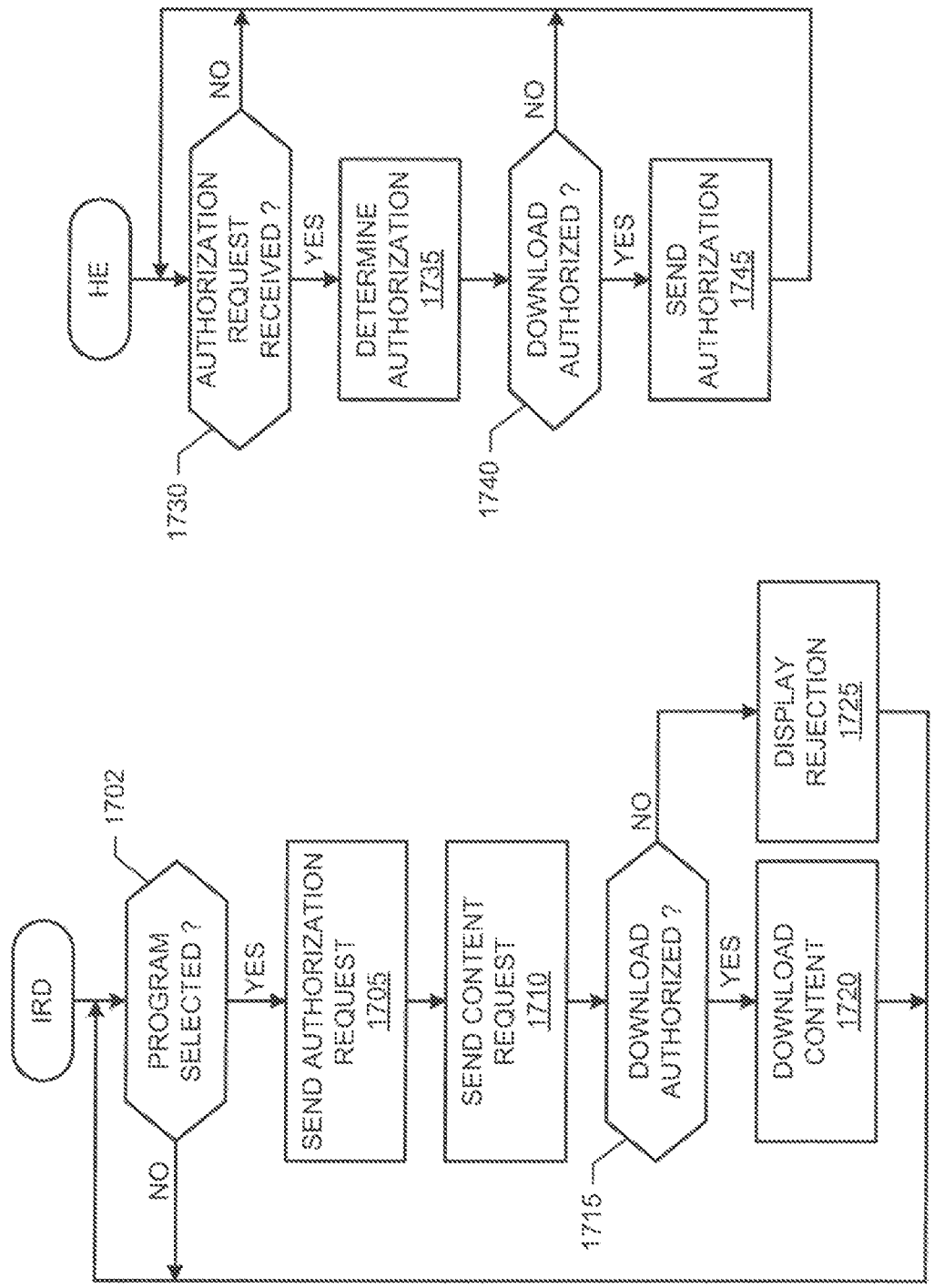

SECURE CONTENT TRANSFER SYSTEMS AND METHODS TO OPERATE THE SAME

RELATED APPLICATIONS

This patent arises from a continuation of U.S. patent application Ser. No. 14/321,436, filed on Jul. 1, 2014, which is a continuation of U.S. patent application Ser. No. 11/434,404, filed May 15, 2006, now U.S. Pat. No. 8,775,319, both of which are hereby incorporated herein by reference in their entireties.

FIELD OF THE DISCLOSURE

This disclosure relates generally to content transfer and, more particularly, to secure content transfer systems and methods to operate the same.

BACKGROUND

The ever increasing proliferation and/or availability of media players (e.g., personal computers, digital video recorders (DVRs), home media centers, game playing system, etc.) creates a strong demand for systems, devices and/or methods to download video, audio and/or multimedia data, files and/or assets. Today, most media devices are customized for operation with a single content delivery medium, for example, satellite, digital cable, Internet. Additionally, present media devices rely on often incompatible media file formats and transmission protocols. As such, a device that can record, for example, a movie delivered via satellite may be incapable of receiving a movie, even the same movie, via the Internet. Additionally, to reduce piracy, broadcast and/or delivery systems and media players require methods to ensure secure authorization, secure content delivery and secure content storage.

BRIEF DESCRIPTION OF THE DRAWINGS

FIGS. 17A-C are flowcharts representative of example processes that may be carried out to implement the example exchange of FIG. 16.

DETAILED DESCRIPTION

Figure 1:
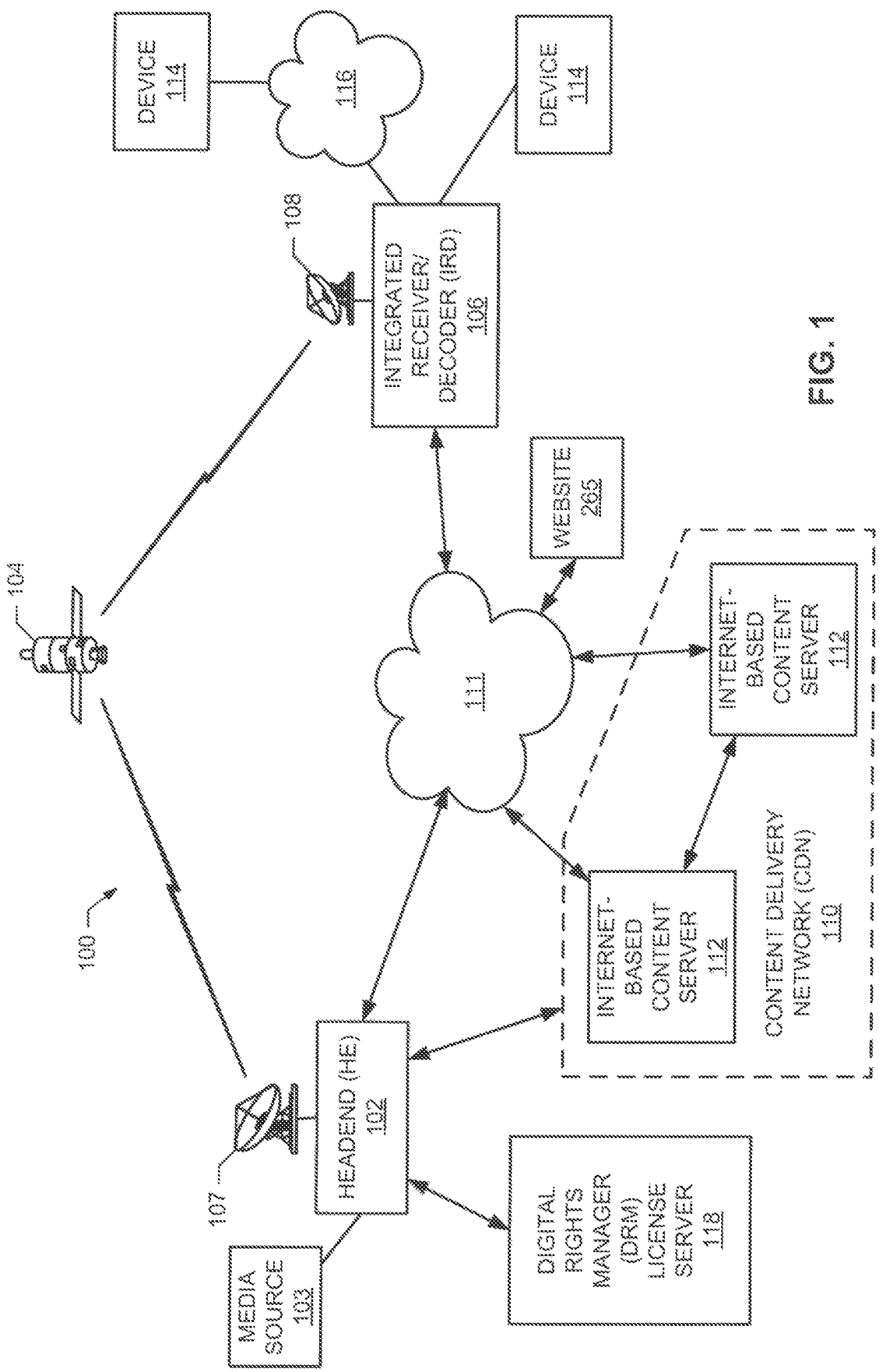
FIG. 1 is a schematic illustration of an example disclosed content delivery system.

To facilitate review and understanding of the content delivery systems and methods to operate the same disclosed herein, the present patent has been organized in accordance with the following headings:

I. Content Delivery System
II. Flexible Content Delivery
III. Conditional Access of Broadband Content
IV. Signed Conditional Access of Broadband Content
V. Encrypted Conditional Access of Broadband Content
VI. Additionally Encrypted Content Delivery
VII. Secure Content Sharing in a Home Network
VIII. Secure Content Transfer
IX. Example Processor Platform Secure content transfer systems and methods and methods to operate the same are disclosed. A disclosed example system includes a content server to encrypt content according to an encryption key, and to transfer the encrypted content, the encryption key and a license to a client that supports a digital rights management technology. The example system further includes a broadcast system headend to determine the encryption key, wherein the broadcast system headend is physically separate from the content server, and a digital rights management license server to provide the license.

A disclosed example method includes detecting a content transfer initiation, determining an encryption secret for the initiated content transfer at the content server, wherein the encryption secret is known to a geographically-separate broadcast system headend, and encrypting transferred content based on the encryption secret. The disclosed example method may further include receiving a content transfer license and forwarding the content transfer license. Another disclosed example method includes receiving a content transfer authorization request, determining an encryption secret for the content transfer authorization request, sending the encryption secret to a geographically-separate content server and sending a content transfer license request to a digital rights management license server. The disclosed example method may further include receiving a content transfer license and forwarding the content transfer license. Yet another disclosed example method includes receiving a license renewal request for previously transferred content, determining an encryption secret used to encrypt the previously transferred content, and renewing a content transfer license based on the determined encryption secret.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a headend (HE), integrated receiver/decoders (IRDs) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

I. Content Delivery System

As illustrated in FIG. 1, an example direct-to-home (DTH) system 100 includes a transmission source 102 (e.g., a headend (HE) 102), a plurality of media sources, one of which is shown at reference numeral 103, a satellite and/or satellite relay 104 (i.e., satellite/relay 104) and a plurality of receiver stations (e.g., integrated receiver/decoders (IRDs)), one of which is shown at reference numeral 106 (i.e., IRD 106), between which wireless communications are exchanged. The wireless communications may take place at any suitable frequency, such as, for example, Ku-band frequencies. As described in detail below with respect to each portion of the example DTH system 100, information provided to the HE 102 from the media source 103 may be transmitted, for example, via an uplink antenna 107 to the satellite/relay 104, which may be at least one geosynchronous or geo-stationary satellite or satellite relay that, in turn, rebroadcasts the information over broad geographical areas on the earth that include the IRDs 106. Among other things, the example HE 102 of FIG. 1 provides program material to the IRDs 106 and coordinates with the IRDs 106 to offer subscribers pay-per-view (PPV) program services, including billing and associated decryption of video programs, as well as non-PPV programming. To receive the information rebroadcast by the satellite/relay 104, each IRD 106 is communicatively coupled to any variety of receive (i.e., downlink) antenna 108.

Security of assets broadcast via the satellite/relay 104 may be established by applying encryption to assets during content processing and/or during broadcast (i.e., broadcast encryption). For example, an asset can be encrypted based upon a codeword (CW) known to the HE 102 and known to the IRDs 106 authorized to view and/or playback the asset. In the illustrated example DTH system 100, for each asset the HE 102 generates a code word packet (CWP) that includes, among other things, a time stamp, and then determines the codeword (CW) for the asset by computing a cryptographic hash of the contents of the CWP. The CWP is also broadcast to the IRDs 106 via the satellite/relay 104. IRDs 106 authorized to view and/or playback the broadcast encrypted asset will be able to correctly determine the CW by computing a cryptographic hash of the contents the received CWP. If an IRD 106 is not authorized, the IRD 106 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

In the illustrated example pay content delivery system 100, programs/information from the media source 103 may also be transmitted from the HE 102 to the IRDs 106 via a content delivery network (CDN) 110. In the example of FIG. 1, the CDN 110 receives programs/information (e.g., an asset file containing a movie) from the HE 102 and makes the programs/information available for download to the IRDs 106 via a terrestrial communication link and/or network, such as, for example, an Internet connection and/or an Internet based network such as, for example, the Internet 111.

While the Internet 111 is a multipoint to multipoint communication network(s), persons of ordinary skill in the art will readily appreciate that point-to-point communications via any variety of point-to-point communication signals may be made via the Internet 111. For instance, in the example system of FIG. 1, an IRD 106 downloads an asset file from the CDN 110 using any variety of file transfer and/or file transfer protocol. Such file transfers and/or file transfer protocols are widely recognized as point-to-point communications, point-to-point communication signals and/or create point-to-point communication paths, even if transported via a multipoint to multipoint communication network such as the Internet 111. It will be further recognized that the Internet 111 may be used to implement any variety of broadcast system wherein a broadcast transmitter may transmit any variety of data and/or data packets to any number and/or variety of clients and/or receiver simultaneously. Moreover, the Internet 111 may be used to simultaneously provide broadcast and point-to-point communications and/or point-to-point communication signals from any number of broadcast transmitters and/or CDNs 110. Throughout the following discussions, downloading and/or transferring of asset files to an IRD 106 from a CDN 110 are assumed to be performed using point-to-point communications, point-to-point communication signals and/or point-to-point techniques. As discussed above, the Internet 111 is only an example communications network and/or communication media by which such point-to-point communications may be made.

The example CDN 110 of FIG. 1 may be implemented using any of a variety of techniques and/or devices, for instance, a plurality of Linux based servers (e.g., content servers 112) connected via wide bandwidth (i.e., high speed) fiber optic interconnections. Each of the content servers 112 are connected to the Internet 111 thereby making it possible for the IRDs 106 to download information (e.g., a movie) from the Internet-based content servers 112. In the illustrated example of FIG. 1, the Internet-based content servers 112 locally cache the information provided by the HE 102, and an IRD 106 requesting to download information from the CDN 110 and/or the HE 102 may be re-directed to a specific Internet-based content server 112 for processing and/or communication load balancing purposes. For example, an Internet uniform resource locator (URL) assigned to a movie may connect an IRD 106 to particular Internet-based content server 112. If the particular server 112 currently has a high communication load, the server 112 may re-direct the IRD 106 to another Internet-based content server 112 from which the movie should be downloaded. In the interest of clarity and ease of understanding, throughout this disclosure reference will be made to delivering, downloading, transferring and/or receiving information, video, data, etc. via the CDN 110. However, persons of ordinary skill in the art will readily appreciate that information is actually delivered, downloaded, transferred and/or received via one of the Internet-based content servers 112 included in or associated with the CDN 110.

In the example content delivery system 100 (i.e., the example DTH system 100), the CDN 110 may be operated by an external vendor (i.e., the CDN 110 need not be operated by the operator of the HE 102). To download files from the CDN 110, the IRDs 106 implement, for instance, an Internet protocol (IP) stack with a defined application layer and possibly a download application provided by the CDN vendor. In the illustrated example, file transfers are implemented using standard Internet protocols (e.g., file transfer protocol (FTP), hypertext transfer protocol (HTTP), etc.). Each file received by an IRD 106 is checked for completeness and integrity and, if a file is not intact, missing and/or damaged portion(s) of the file are delivered and/or downloaded again. Alternatively, the entire file is purged from the IRD 106 and/or is delivered and/or downloaded again. As described below, downloads in the illustrated example system 100 may be interrupted (e.g., paused) and then resumed, at a later time, from the point where the interruption occurred. In fact, as described below in Section II and in connection with FIGS. 13-15, downloads via a first medium (e.g., satellite) may be interrupted and resumed using a second medium (e.g., Internet).

Security of assets available via the CDN 110 may be established by the broadcast encryption applied to an asset before the asset is provided to the CDN 110 and, thus, the CDN 110 is not necessarily required to apply encryption and/or encoding to an asset. For example, the HE 102 may provide to the CDN 110 the CWP(s) for each broadcast encrypted asset provided to the CDN 110. The CDN 110 then downloads the CWP(s) for the asset to an IRD 106 such that, if the IRD 106 is authorized to view and/or playback the asset, the IRD 106 may correctly determine the CW(s) used to broadcast encrypt the asset. In this way, the authorization to view assets downloaded via the CDN 110 is performed in substantially the same fashion as that performed for live and non-live assets broadcast via the satellite/relay 104. If the security of an asset at the CDN 110 is known by the CDN 110 and/or the HE 102 to be compromised, the HE 102 and/or the CDN 110 make the compromised version of the file unavailable (e.g., by purging the file at the CDN 110) for download by other IRDs 106 until the compromised asset is replaced by the HE 102.

In another example, the CDN 110 first verifies that an IRD 106 is authorized to download a file before the CDN 110 allows the IRD 106 to download the file (i.e., the CDN 110 implements a conditional access scheme). Authorization verification may be performed using any of a variety of techniques. Example authorization methods are discussed below in Section III-VI and in connection with FIGS. 16-26C. In a preferred embodiment, all authorized IRDs 106 utilize a shared secret or password that allows access to the CDN 110. In particular, the CDN 110 can utilize the shared secret or password to verify that an IRD 106 is authorized to download assets by, for example, comparing the value of or a value representing the shared secret sent by the IRD 106 to the CDN 110 with the current shared secret or password. If the two match, then the IRD 106 is authorized to download the asset. The shared secret or password is neither asset nor IRD 106 specific and is, thus, preferably updated and/or changed frequently (e.g., every minute) and broadcast via the satellite/relay 104 to all authorized IRDs 106. Further, a security function (e.g., a cryptographic hash) could be applied to all or a portion of an asset's URL based on the changing shared secret or password. Preferably, to enhance security, an asset's scrambled URL is at least partially not human readable.

As discussed below in Section VI and in connection with FIGS. 24A-B, 25 and 26A-C, the CDN 110 may, of course, alternatively or additionally, apply encryption to an asset. For example, an asset may be additionally encrypted (i.e., super-encrypted) by the CDN 110 such that only one of the IRDs 106 is able to decrypt the asset. Further, the additionally applied encryption may implement the additional copy protection encryption that may have been applied by an IRD 106 prior to storage of an asset within the IRD 106.

Furthermore, the CDN 110 may determine an IRD's 106 general geographic location based on, for example, an IP address thereby allowing downloads to be restricted to certain geographic areas (e.g., only domestically, only North America, etc.). Additionally or alternatively, the location of an IRD 106 relative to the CDN 110 may be determined by measuring the round trip travel time of a ping transmitted to the IRD 106. The CDN 110 may also limit the number of downloads by any IRD 106 to, for example, a maximum number of downloads per month, and may provide regular reports on download activity to the HE 102.

To facilitate backchannel communications between the IRDs 106 and the HE 102, the IRDs 106 may be communicatively coupled (e.g., via an Ethernet circuit or modem) to the HE 102 via, for example, a terrestrial communication link, such as a telephone line or, preferably, the Internet 111.

Such communication could also be carried out via any variety of wireless and/or cellular return path from the IRD 106 to the HE 102 such as, for example a satellite return path via the satellite/relay 104, a cellular communication network, etc. In general, backchannel communications and/or information sent from the HE 102 to an IRD 106 may be secured using any of a variety of techniques such as, for example, encryption. As discussed in more detail below in Sections III-VI and in connection with FIGS. 16-26C, backchannel communications may be used to conditionally authorize an IRD 106 to receive, decode and/or playback content (e.g., video data) and for communicating with websites (e.g., websites 265 of FIGS. 1 and 2) to obtain information therefrom.

Example devices 114 coupled to the IRD 106 include a personal computer (PC), a portable media player, a media extender, a game playing system, a media client, etc. As illustrated in FIG. 1, the devices 114 may connect directly to an IRD 106 via any parallel or serial communication system, such as, for example, universal serial bus (USB) connectivity, Institute of Electrical and Electronics Engineers (IEEE) 1394 (a.k.a., Firewire), or via a home network 116. To support import and/or export of secure program material between devices 114 that support any variety of Digital Rights Management (DRM) system and an IRD 106, the example HE 102 of the illustrated example of FIG. 1 is communicatively coupled to a DRM license server 118. An example DRM system is implemented in accordance with the Microsoft® Windows Media®—DRM specification. Methods and apparatus for secure program transfer between an IRD 106 and the devices 114 (including DRM) are discussed in more detail below in Sections VIII and IX and in connection with FIGS. 27-34.

The example DTH system 100 of FIG. 1 may include a plurality of satellite/relays 104 to provide wide terrestrial coverage, to provide additional channels and/or to provide additional bandwidth per channel. For example, each satellite/relay 104 may include 16 transponders to receive program material and/or other control data from the HE 102 and to rebroadcast the program material and/or other control data the IRDs 106. However, using data compression and multiplexing techniques, multiple satellites/relays 104 working together can receive and rebroadcast hundreds of audio and/or video channels.

In addition to the delivery of live content (e.g., a TV program) and/or information, the example HE 102 of FIG. 1 is capable of delivering, among other things, a file via the uplink antenna 107, which broadcasts the information via the satellite/relay 104 to the IRDs 106. The file may contain any of a variety of media content types, for instance, audio or video program data (e.g., a movie, a previously recorded TV show, a music video, etc.), control data (e.g., software updates), data service information or web pages, software applications, or program guide information. In the example system 100 the delivery of a file generally includes: (a) binding network addresses to hardware locations, (b) announcing the file and (c) delivering the file. The binding of network addresses to hardware locations allows for files to be sent and received via ubiquitous network addresses, for example, an IP address and IP port number. Announcing the delivery of the file, allows the IRDs 106 to rendezvous with a file broadcast via the satellite/relay 104 at a pre-determined time at the network address to download the file. In particular, announcements describe, in advance, when and how individual files will be delivered. They contain sufficient information about these files to allow the IRDs 106 to determine whether or not to download one or more of the files. To download a file, an IRD 106 joins an IP multicast group at an IP address and pre-determined time specified in an announcement. The IRD 106 re-assembles the data file from the data transmitted to the IP multicast group as received via the receive (i.e., downlink) antenna 108.

As illustrated in FIG. 1, the example pay content delivery system 100 has two primary data and/or information delivery mechanisms: (a) wireless via the satellite/relay 104 and (b) via the CDN 110 (e.g., Internet-based delivery). Content delivery may be implemented using a wireless broadband connection (e.g., Institute of Electrical and Electronics Engineers (IEEE) 802.16 (a.k.a. WiMAX), 802.11b, 802.11g, etc.), a broadband wired connection (e.g., Asymmetric Digital Subscriber Line (ADSL), cable modems, etc.) or, albeit at potentially a slower speed, using a modem connected to a conventional public switched telephone network (PSTN).

In the illustrated example of FIG. 1, wireless delivery via the satellite/relay 104 may simultaneously include both files (e.g., movies, pre-recorded TV shows, software updates, asset files, etc.) and/or live content, data, programs and/or information. Wireless delivery via the satellite/relay 104 offers the opportunity to deliver, for example, a number of titles (e.g., movies, pre-recorded TV shows, etc.) to virtually any number of customers with a single broadcast. However, because of the limited channel capacity of the satellite/relay 104, the number of titles (i.e., assets) that can be provided during a particular time period is restricted.

In contrast, Internet-based delivery via the CDN 110 can support a large number of titles, each of which may have a narrower target audience. Further, Internet-based delivery is point-to-point (e.g., from an Internet-based content server 112 to an IRD 106) thereby allowing each user of an IRD 106 to individually select titles. In the illustrated example of FIG. 1, allocation of a title to satellite and/or Internet-based delivery depends upon a target audience size and may be adjusted over time. For instance, a title having high demand (i.e., large initial audience) may initially be broadcast via the satellite/relay 104, then, over time, the title may be made available for download via the CDN 110 when the size of the target audience or the demand for the title is smaller. As discussed below in Section II and in connection with FIGS. 12-15, a title may simultaneously be broadcast via the satellite/relay 104 and be made available for download from the CDN 110 via the Internet 111.

In the example DTH system 100, each asset (e.g., program, title, TV program, etc.) is pre-packetized and, optionally, pre-encrypted and then stored as a data file (i.e., an asset file). Subsequently, the asset file may be broadcast via the satellite/relay 104 and/or sent to the CDN 110 for download via the CDN 110 (i.e., Internet-based delivery). In particular, if the data file is broadcast via the satellite/relay 104, the data file forms at least one payload of a resultant satellite signal. Likewise, if the data file is available for download via the CDN 110, the data file forms at least one payload of a resultant Internet signal.

It will be readily apparent to persons of ordinary skill in the art that even though the least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol (TCP)/IP, user datagram protocol (UDP), encapsulation, etc.) and/or modulation techniques (e.g., quadrature amplitude modulation (QAM), forward error correction (FEC) employed, etc.) used to transmit a file via Internet signals (e.g., over the Internet 111) may differ from those used via satellite (e.g., the satellite/relay 104). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

In the illustrated example of FIG. 1, the same pre-packetized and, optionally, pre-encrypted, content data file that is broadcast via satellite may be available for download via Internet, and how the asset is stored, decoded and/or played back by the IRD 106 is independent of whether the program was received by the IRD 106 via satellite or Internet. Further, because the example HE 102 of FIG. 1 broadcasts a live program and a non-live program (e.g., a movie) by applying the same encoding, packetization, encryption, etc., how a program (live or non-live) is stored, decoded and/or played back by the IRD 106 is also independent of whether the program is live or not. Thus, an IRD 106 may handle the processing of content, programs and/or titles independent of the source(s) and/or type(s) of the content, programs and/or titles. In particular, example delivery configurations and signal processing for the example content delivery system of FIG. 1 are discussed in detail below in connection with FIG. 12.

As described below in conjunction with FIGS. 4, 5 and 6, the IRD 106 may be one of any variety of devices, for example, a set-top box, a home media server, a home media center (HMC), a personal computer (PC) having a receiver card installed therein, etc. A display device (e.g., the display 420 of FIG. 4), such as, for example, a television set or a computer monitor, is coupled to the IRD 106 for displaying and/or playback of received programming. Additionally, an IRD 106 may include a recorder (e.g., the recorder 415 of FIG. 4) and/or any variety of circuits, modules and/or devices collectively implementing recorder functionality used to record content received by the IRD 106. The recorder 415 may be, for example, a device capable of recording information on, for instance, analog media such as videotape or computer readable digital media such as a hard disk drive (HDD) (e.g., HDD 425 of FIGS. 4-6), a digital versatile disc (DVD), a compact disc (CD) and/or any other suitable media. Further, an IRD 106 may connect to the Internet 111 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level 1 circuit (a.k.a. a DS1), a fractional-DS1, etc.), etc.

Figure 2:
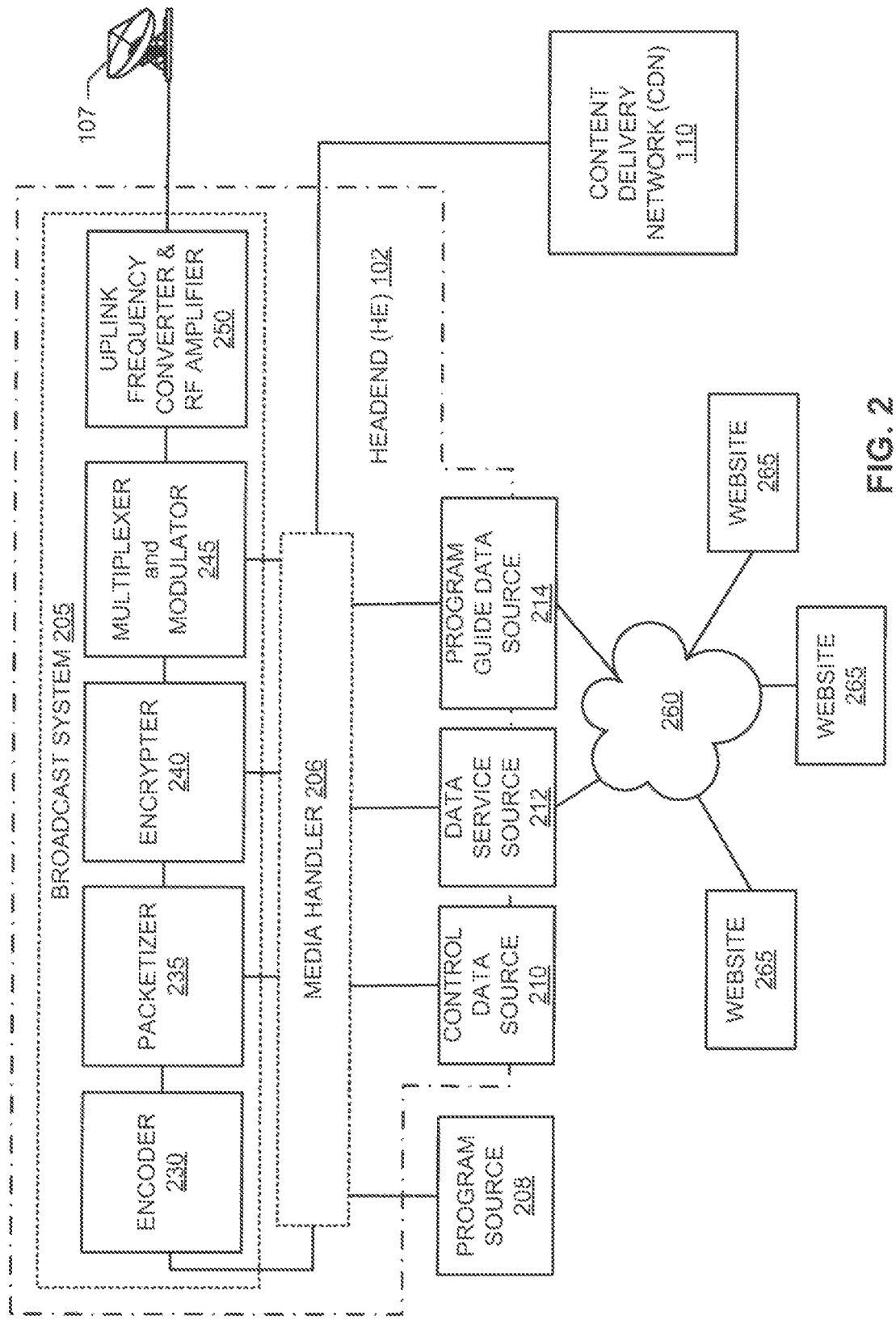
FIGS. 2 and 3 illustrate example manners of implementing the example headend (HE) of FIG. 1.

FIG. 2 illustrates an example manner of implementing the HE 102 of FIG. 1. The example HE 102 of FIG. 2 includes a broadcast system 205, a media handler 206 and a plurality of media sources that provide content, data and/or information (e.g., program sources 208, a control data source 210, a data service source 212, and one or more program guide data sources 214). As illustrated in FIG. 2, the data sources 210, 212 and/or 214 may be implemented partially or wholly by the HE 102 depending upon an implementation of the HE 102. The example broadcast system 205 and the uplink antenna 107 form a satellite broadcast transmitter. An example media handler 206 is discussed in more detail below in connection with FIG. 3. In one example, information (e.g., files, bitstreams, etc.) from one or more of the sources 208-214 is passed by the media handler 206 to an encoder 230. In the illustrated example of FIG. 2, the encoder 230 encodes the data according to the CableLabs® Video-on-Demand (VoD) encoding specification MD-SP-VOD-CEP-I01-040107 (i.e., performs asset encoding). The encoded data is then packetized into a stream of data packets by a packetizer 235 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by an encrypter 240 using, for example, the well-known Advanced Encryption Standard (AES) or the well-known Data Encryption Standard (DES). In an example, only the payload portion of the data packets are encrypted thereby allowing an IRD 106 to filter, route and/or sort received broadcast encrypted data packets without having to first decrypt the encrypted data packets. To facilitate broadcast of the encrypted bitstream, the encrypted bitstream passes from the encrypter 240 to a multiplexer and modulator 245 that, using any of a variety of techniques, multiplexes any number of encrypted bitstreams together and then modulates a carrier wave with the multiplexed encrypted bitstreams. The modulated carrier wave is then passed to any variety of uplink frequency converter and radio frequency (RF) amplifier 250, which, using any of a variety of techniques, converts the modulated carrier wave to a frequency band suitable for reception by the satellite/relay 104 and applies appropriate RF amplification. The up-converted and amplified signal is then routed from the uplink frequency converter 250 to the uplink (i.e., transmit) antenna 107 where it is transmitted towards the satellite/relay 104.

While a particular broadcast system 205 is illustrated in FIG. 2, persons of ordinary skill in the art will readily appreciated that broadcast systems may be implemented using any of a variety of other and/or additional devices, components, circuits, modules, etc. Further, the devices, components, circuits, modules, elements, etc. illustrated in FIG. 2 may be combined, re-arranged, eliminated and/or implemented in any of a variety of ways. For example, multiplexing of the packetized data may be performed prior to encryption of the data packets by the example encrypter 240. In such an example configuration, the encrypter 240 is configurable to selectively encrypt data packets based upon which data packet stream (e.g., media source) they are associated with.

As discussed above, content, data and/or information provided by the sources 208-214 may be live, real time and/or non-real time. For example, a first program source 208 may provide a live TV program while a second program source 208 provides a previously recorded title (e.g., a movie, a music video, etc.). In the illustrated example of FIG. 2, if a movie provided by the second program source 208 is pre-encoded, pre-packetized and pre-encrypted, the movie may be provided by the media handler 206 directly to the example multiplexer/modulator 245. In particular, the example broadcast system 205 of FIG. 2 may be implemented and/or operated to broadcast both live and/or real time data and/or information and non-real time data and/or information. In the illustrated example of FIG. 2, the operation and/or implementation of the multiplexer/modulator 245 and the uplink frequency converter/RF amplifier 250 are agnostic to whether the broadcast represents real time or non-real time data and/or information. Further, the format and/or structure of the payload of the signal being broadcast toward the satellite/relay 104 by the broadcast system 205 and the transmit (i.e., uplink) antenna 107 and the received by the IRD 106 does not depend on whether the data and/or information is real time or non-real time. Moreover, an output of, for example, the example packetizer 235 and/or the example encrypter 240 of FIG. 2 may be captured and/or recorded by the media handler 206 to, for example, an asset file. Like other asset files created by the media handler 206, the example media handler 206 may provide such asset files to the CDN 110 for transfer to an IRD 106 via the Internet 111 and/or broadcast the asset file via the satellite/relay 104. In this way, the broadcast system 205 may implement functionality similar and/or identical to the example video transport processing system (VTPS) 320 discussed below in connection with FIG. 3.

As discussed above in connection with FIG. 1, the example HE 102 may provide programs (e.g., movies, pre-recorded TV shows, etc.) to the CDN 110 for delivery to an IRD 106. In particular, the example media handler 206 of FIG. 2 may provide a pre-encoded, pre-packetized and, optionally, pre-encrypted bitstream to the CDN 110. Further, in the illustrated example HE 102 of FIG. 2 and/or, more generally, the example DTH system 100 of FIG. 1, how a title is pre-encoded, pre-packetized and, optionally, pre-encrypted does not depend upon whether the title will be broadcast via a satellite/relay 104 or made available for download via the CDN 110.

The program sources 208 receive video and audio programming from a number of sources, including satellites, terrestrial fiber optics, cable, or tape. The video and audio programming may include, but is not limited to, television programming, movies, sporting events, news, music or any other desirable content. The program sources 208 may provide the video and audio programming in the form of, for example, a bitstream or a file.

The control data source 210 passes control data to the media handler 206 such as, for example, data representative of a list of SCIDs to be used during the encoding process, or any other suitable information.

The data service source 212 receives data service information and web pages made up of data files, text files, graphics, audio, video, software, etc. Such information may be provided via a network 260. In practice, the network 260 may be the Internet 111, a local area network (LAN), a wide area network (WAN) or a PSTN. The information received from various sources is compiled by the data service source 212 and provided to the media handler 206. For example, the data service source 212 may request and receive information from one or more websites 265. The information from the websites 265 may be related to the program information provided to the media handler 206 by the program sources 208, thereby providing additional data related to programming content that may be displayed to a user at an IRD 106.

The program guide data source 214 provides information that the IRDs 106 use to generate and display a program guide to a user, wherein the program guide may be a grid guide that informs the user of particular programs that are available on particular channels at particular times. The program guide also includes information that an IRD 106 uses to assemble programming for display to a user. For example, if the user desires to watch a baseball game on his or her IRD 106, the user will tune to a channel on which the game is offered. The program guide contains information required by an IRD 106 to tune, demodulate, demultiplex, decrypt, depacketize and/or decode selected programs.

Figure 3:
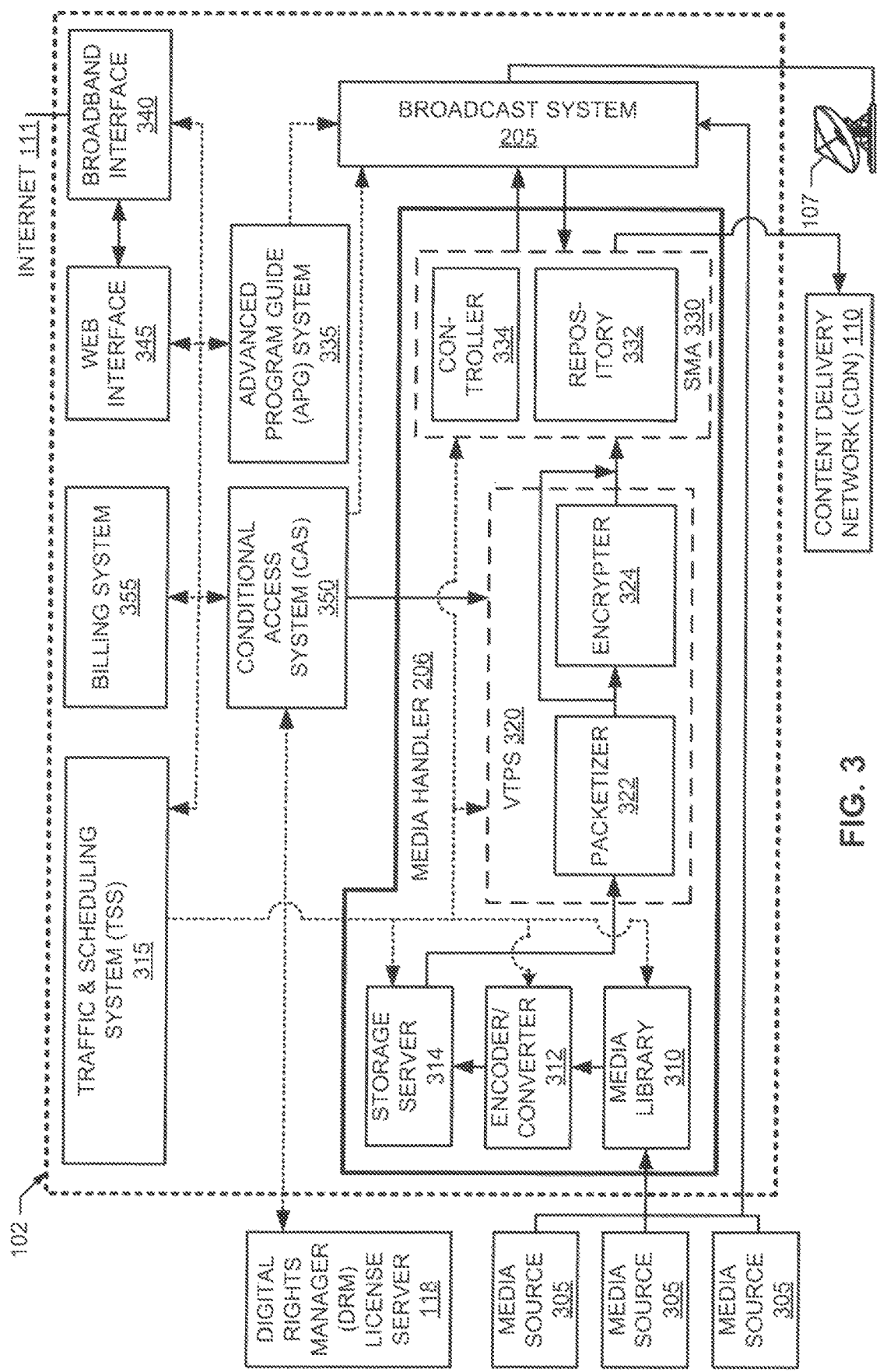

FIG. 3 illustrates another example manner of implementing the HE 102 of FIG. 1 and, in particular, an example manner of implementing the media handler 206 of FIG. 2. While a particular HE 102 and media handler 206 are illustrated in FIG. 3, persons of ordinary skill in the art will readily appreciated that head ends and/or media handlers may be implemented using any of a variety of other and/or additional devices, components, circuits, modules, etc. Further, the devices, components, circuits, modules, elements, etc. illustrated in FIG. 3 may be combined, re-arranged, eliminated and/or implemented in any of a variety of ways. The example HE 102 of FIG. 3 receives live or non-live video content (e.g., movies, TV shows, sporting events, etc.) from a plurality of media sources 305. The media sources 305 may be, for example, any of the sources 208-214 discussed above in connection with FIG. 2. The media sources 305 deliver content to the HE 102 via any of a variety of techniques, for example, satellite, tape, CD, DVD, file transfer, etc. For instance, a media source 305 first performs encoding and packaging of an asset and then transmits the packaged asset via satellite to the HE 102. The HE 102 receives the packaged asset and checks to ensure the asset was delivered in its entirety without corruption. If the asset was not correctly received, the HE 102 can request re-transmission. To store the received assets (packaged or not), the example media handler 206 of FIG. 3 includes a media library 310. As illustrated in FIG. 3, live assets (e.g., a live TV program) can be routed directly from a media source 305 to the broadcast system 205 for broadcast via the satellite/relay 104 to the IRDs 106. Live assets may, alternatively or additionally, be recorded in a media library 310 and then converted to a pre-encoded, pre-packetized and, optionally, pre-encrypted distribution files as discussed below.

In the illustrated example HE 102 of FIG. 3 and the example pay content delivery system 100 of FIG. 1, video content (i.e., video assets) are encoded and packaged according to the CableLabs specification for VoD content. To pre-encode and pre-package received video assets that are not received pre-encoded and pre-packaged according to the CableLabs specification for VoD content, the example media handler 206 of FIG. 3 includes an encoder/converter 312. The example encoder/converter 312 of FIG. 3 either pre-encodes an un-encoded received asset or converts/re-encodes an asset that is encoded based on another specification and/or standard. For example, an asset received via tape will require pre-encoding and pre-packaging. To store the properly pre-encoded and pre-packaged assets, the illustrated example media handler 206 includes a storage server 314.

To pre-packetize the pre-encoded asset to one of any variety of formats suitable for distribution (e.g., an asset file) and, optionally, to pre-encrypt the asset file, the example media handler 206 of FIG. 3 includes a content transport processing system such as, for example, for video content the VTPS 320 comprising a packetizer 322 and an encrypter 324. Of course, other types of content transport processing systems may be included for other types of content data. Additionally or alternatively, a single content transport processing system capable to process multiple types of content data may be implemented. Among other things, the example packetizer 322 of FIG. 3 pre-packetizes the pre-encoded asset. The example encrypter 324 of FIG. 3 pre-encrypts the pre-packetized stream according to, for example, either the AES or the DES standard. The codeword (CW) used to broadcast encrypt the pre-packetized asset is determined, as described above, by a conditional access system (CAS) 350. In the illustrated example HE 102 of FIGS. 1 and 3, an asset file contains pre-encoded pre-packetized and, optionally, pre-encrypted video data. Additionally or alternatively, as discussed above in connection with FIG. 2, outputs of the broadcast system 205 (e.g., an output of the packetizer 235 and/or the encrypter 240) may be used to create pre-packetized and/or pre-encoded assets. For example, such outputs of the broadcast system 205 may be used to, for example, create asset files for live programs currently being broadcast by the HE 102. That is, the broadcast system 205 may be used, in addition to broadcast live and non-live programs, to implement a VTPS, VTPS functionality and/or functionality similar to the VTPS 320. The example media handler 206 can handle asset files created by the VTPS 320 identically to those created from outputs of the broadcast system 205. To store asset files, the example media handler 206 of FIG. 3 includes a service management and authoring system (SMA) 330.

It will be readily apparent to persons of ordinary skill in the art that content processing, that is, the processes of pre-encoding, pre-packetizing and, optionally, pre-encrypting assets to form asset files may be performed in non-real time. Preferably, content processing is implemented as an automated workflow controlled by a traffic and scheduling system (TSS) 315. In particular, the TSS 315 can schedule content processing for a plurality of received assets based upon a desired program lineup to be offered by the example DTH system 100 of FIG. 1. For example, a live TV program for which a high demand for reruns might be expected could be assigned a high priority for content processing.

In the illustrated example of FIG. 3, the SMA 330 implements a store and forward system. That is the SMA 330 stores all asset files (i.e., distribution files) until they are scheduled to be broadcast via satellite and/or scheduled to be transferred to the CDN 110. In the example HE 102 of FIGS. 1-3, an asset is stored using the same distribution file format regardless of how the asset is to be delivered to the IRDs 106. This enables the same assets to be forwarded to the IRDs 106 via the satellite/relay 104 or via the CDN 110. To control the SMA 330 and to store the distribution files, the example SMA 330 includes a controller 334 and a repository 332, respectively. In the illustrated example of FIG. 3, the SMA 330 is controlled by a traffic schedule determined by the TSS 315, that is, the controller 334 operates responsive to commands received from the TSS 315.

For satellite distribution, the SMA 330, as instructed by the TSS 315, sends an asset file to the broadcast system 205 at a scheduled broadcast time. As described above in connection with FIG. 2, the broadcast system 205 transmits the asset file via the transmit (i.e., uplink) antenna 107 and the satellite/relay 104. In particular, since the asset file is already pre-encoded, pre-packetized and, optionally, pre-encrypted, the asset file is only passed through the multiplexer/modulator 245 and the uplink frequency converter/RF amplifier 250 of the example broadcast system 205 of FIG. 2. As also described above, live assets may be encoded, packetized and broadcast encrypted by the broadcast system 205 and will be multiplexed, modulated, up-converted and amplified using the same techniques as that applied to an asset file. In particular, a live program that is broadcast live via the broadcast system 205 results in a satellite signal that is substantially similar to a satellite signal resulting from broadcast of an asset file created from the live program.

In the illustrated example of FIG. 3, video asset files are sent to the broadcast system 205 as a pre-encoded, pre-packetized and, optionally, pre-encrypted bitstream containing video as well as all audio and conditional access (CA) data in a single file. Video and audio are assigned default SCIDs/PIDs during content processing. The broadcast system 205 may, thus, override the default SCID/PID assignments and may re-stamp SCID/PID data packet header entries with the correct values based on the particular satellite transponder allocated to the asset.

For Internet distribution, the SMA 330, as instructed by the TSS 315, sends an asset file to the CDN 110 at a scheduled time via a dedicated private access line (e.g., a digital signal level 3 (DS-3) communication link, a optical carrier level 3 (OC-3) fiber optic link, etc.) or a secure virtual private network (VPN) link. In the illustrated examples of FIGS. 1-3, the HE 102 sends each asset file to the CDN 110 once and all subsequent copying and distribution of the asset via the Internet 111 is performed by the CDN 110. Asset files received by the CDN 110 are verified to ensure they are received in their entirety and with full integrity. The link between the HE 102 and the CDN 110 has a finite bandwidth and, thus, the TSS 315 schedules delivery of assets to the CDN 110 to ensure that assets are available via the CDN 110 as advertised, for example, in program guide information.

To provide program guide information to the IRDs 106, the example HE 102 of FIG. 3 includes the advanced program guide (APG) system 335. The APG system 335 creates and/or updates APG data that is broadcast to the IRDs 106 via the broadcast system 205 (i.e., via the satellite/relay 104). Example APG data lists which assets are being broadcast by the HE 102 and are, thus, available for recording by the IRDs 106. For the listed assets, the APG data specifies a starting time, a duration, a network address, a satellite transponder identifier and a SCID/PID set. For assets available for download via the CDN 110, the APG, additionally or alternatively, includes an Internet URL from which an IRD 106 may download the asset.

To schedule content processing, APG data updates as well as content delivery via the broadcast system 205 and/or the CDN 110, the example HE 102 of FIG. 3 includes the TSS 315. For each asset the following dates (i.e., date and time) may be controlled and/or determined by the TSS 315: (a) expected arrival date, (b) start of content processing, (c) end of content processing, (d) APG announcement date (i.e., from which date the asset will be visible to a customer in the APG), (e) broadcast date, (e) CDN publish date, (0 SMA purge date (i.e., date asset is removed from repository 332), (g) end of availability of purchase, (h) end of viewing (i.e., date of purge from an IRD 106), and (i) CDN 110 purge date. The TSS 315 may control other dates as well.

In the example HE 102 of FIG. 3, each live asset is assigned to a broadcast operations control (BOC) channel by the TSS 315 that denotes the physical location of a program (e.g., a satellite transponder). Likewise, delivery of asset files (i.e., distribution files) via the satellite/relay 104 are also organized by BOC channel. In the illustrated examples of FIGS. 1 and 3, the link between the HE 102 and the CDN 110 is broken up into sub-channels each of which is assigned a BOC channel number. By using BOC channels for both live and non-live assets (even those being broadcast via the CDN 110), the TSS 315 can schedule broadcast and/or delivery of all assets in the same fashion. In particular, the delivery of assets to the CDN 110 is scheduled by the TSS 315 like the broadcast of an asset via the satellite/relay 104 (i.e., by selecting a BOC channel and time). If an example system includes more than one CDN 110, then the CDNs 110 could be assigned distinct BOC channel numbers making the implementation of the TSS 315 easily extendable.

To facilitate backchannel communications between the IRDs 106 and the HE 102, the illustrated example HE 102 includes any of a variety of broadband interfaces 340 that communicatively couples the HE 102 to the IRDs 106 via the Internet 111. As described above, the broadband interface 340 using any of a variety of techniques may realize secure communications between the HE 102 and the IRDs 106. Alternatively, the broadband interface 340 provides any of a variety of modem interfaces to a PSTN. The broadband interface 340 also facilitates interaction of the IRDs 106 with a web interface 345 and/or the conditional access system (CAS) 350. To allow users of the IRDs 106 to subscribe to services, purchase titles, change preferences, etc., the example HE 102 of FIG. 3 includes the web interface 345. In the illustrated example, the web interface 345 using any of a variety of techniques presents one or more web based interfaces via the Internet 111 and/or any variety of wireless link such as, for example, via the satellite/relay 104 and receives user selections.

In the example DTH system 100 of FIG. 1, users of the IRDs 106 may be restricted from downloading assets from the CDN 110 and/or from decoding or playing back assets received (either via the satellite/relay 104 or the CDN 110) and/or stored by an IRD 106 (i.e., conditional access to content). To authorize an IRD 106 for downloading, decoding and/or playback of an asset, the example HE 102 of FIG. 3 includes the CAS 350. In an example, the CAS 350 generates and broadcasts CWP(s) and determines the CW(s) used to broadcast encrypt each asset. In another example, the CAS 350 receives an authorization request from an IRD 106 via the Internet 111 and the broadband interface 340, and provides an authorization response to the IRD 106 via the broadcast system 205 and the satellite/relay 104. Example interactions between the HE 102, the CAS 350, the IRDs 106 and the CDN 110 and/or methods to conditionally authorize downloading, decoding and/or playback of assets are discussed in more detail in Sections III-VI and in connection with FIGS. 16-26C.

In the illustrated example of FIG. 1, users of the IRDs 106 are charged for subscription services and/or asset downloads (e.g., PPV TV) and, thus, the example HE 102 of FIG. 3 includes a billing system 355 to track and/or bill subscribers for services provided by the example pay content delivery system 100. For example, the billing system 355 records that a user has been authorized to download a movie and once the movie has been successfully downloaded the user is billed for the movie. Alternatively, the user may not be billed unless the movie has been viewed.

Figure 4:
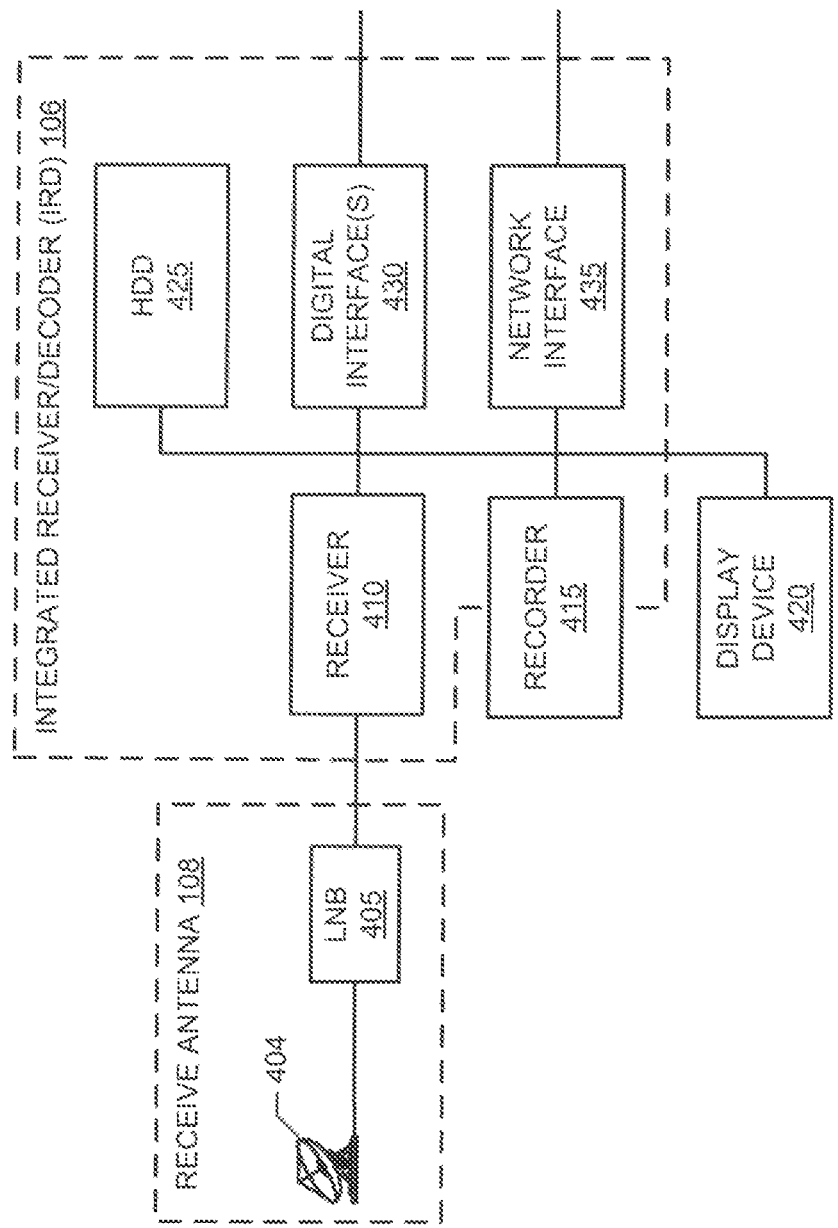
FIGS. 4, 5 and 6 illustrate example manners of implementing the example integrated receiver/decoder (IRD) of FIG. 1.

FIG. 4 illustrates an example manner of implementing the receive antenna 108 and the IRD 106 of FIG. 1. In operation, the receive antenna 108 (i.e., downlink antenna 108) receives signals conveying a modulated multiplexed bitstream from the satellite/relay 104. Within the receive antenna 108, the signals are coupled from a reflector and feed 404 to a low-noise block (LNB) 405, which amplifies and frequency downconverts the received signals. The LNB output is then provided to a receiver 410, which receives, demodulates, de-packetizes, de-multiplexes, decrypts and decodes the received signal to provide audio and video signals to a display device 420 and/or a recorder 415. As illustrated in FIG. 4, the recorder 415 may be implemented separately from and/or within the IRD 106. The receiver 410 is responsive to user inputs to, for example, tune to a particular program.

To store received and/or recorded programs and/or assets, the example IRD 106 of FIG. 4 includes any of a variety of storage device 425 (e.g., a HDD 425). The HDD 425 is used to store the packetized assets and/or programs received via the satellite/relay 104 and/or the CDN 110. In particular, as discussed below in connection with FIG. 12, the packets stored on the HDD 425 are the same encoded and, optionally, encrypted packets created by the HE 102 and transmitted via the satellite/relay 104 and/or made available for download via the CDN 110. To communicate with any of a variety of clients, media players, etc., the illustrated example IRD 106 includes one or more digital interfaces 430 (e.g., USB, serial port, Firewire, etc.). To communicatively couple the example IRD 106 to, for instance, the Internet 111 and/or the home network 116, the example IRD 106 includes a network interface 435 that implements, for example, an Ethernet interface.

Figure 5:
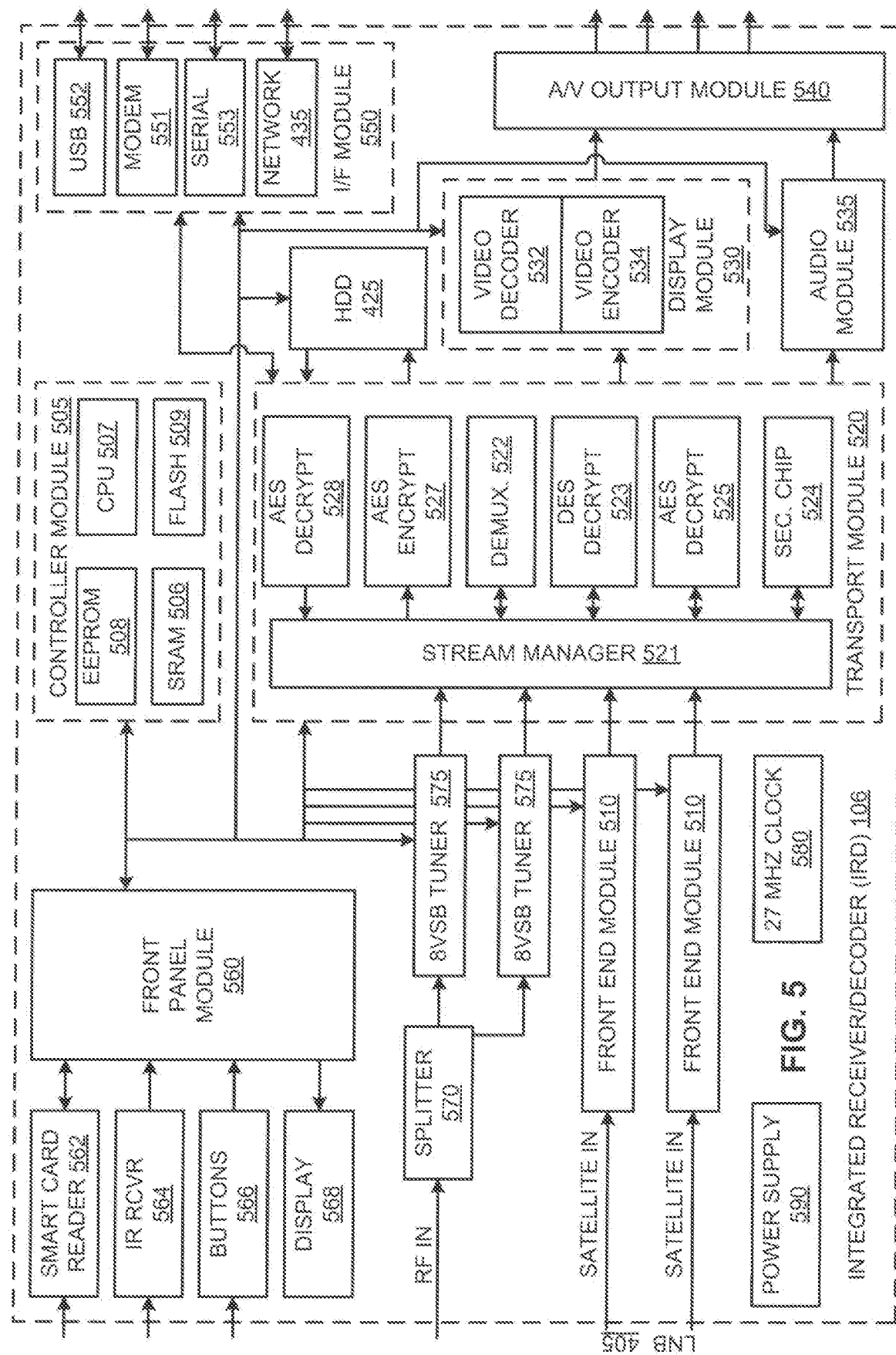

FIG. 5 is an illustration of another example manner of implementing the IRD 106 of FIG. 1. In general, circuitry, modules and/or components inside the IRD 106 receive the L-band RF signals received from the satellite/relay 104 via the LNB 405 (FIG. 4) and convert the signals back into an original digital bitstream. Decoding circuitry, modules and/or components receive the original bitstream and perform video/audio processing operations such as de-multiplexing and decompression (i.e., decoding). One or more processor(s), microprocessor(s) or central processing unit(s) (CPU) 507 of a controller module 505 controls the overall operation of the example IRD 106, including the selection of parameters, the set-up and control of components, channel selection, and many other functions of the example IRD 106 of FIG. 5.

Specifically, the example IRD 106 of FIG. 5 includes the controller module 505, front end modules 510, a transport module 520, a display module 530, an audio module 535, and an audio/video (A/V) output module 540, an interface (I/F) module 550, a front panel module 560, a splitter 570, 8VSB tuners 575, a power supply 590 and the HDD 425. As further shown in FIG. 5, a 27 megahertz (MHz) clock signal generator 580 is also provided. The clock generator 580 generates a clock signal that is coupled to various components of the IRD 106 and may be frequency-calibrated by a signal received from the transport module 520.

The example front end modules 510 of FIG. 5 receive the L-band RF signals received from the satellite/relay 104 via the LNB 405 (FIG. 4) and converts the signals back into the original digital bitstream (i.e., stream of encoded and, optionally, encrypted data packets). Among other things, the front end modules 510 implement a tuner, a demodulator and an FEC decoder. Likewise, the splitter 570 of the illustrated example may be coupled to an antenna or a cable or terrestrial broadcast system such as, for example, an analog or digital cable television broadcast system (not shown) to receive information content. Signals from the splitter 570 are coupled to the tuners 575 that implement an Advanced Television Systems Committee (ATSC)/National Television System Committee (NTSC) tuner, an NTSC decoder and a vestigial side band (VSB) demodulator to convert received information into a digital bitstream. The front end modules 510, the splitter 570, and the 8VSB tuners 575 are controlled by the controller module 505 and may be implemented using any of a variety of well known techniques, devices, circuits and/or components.

The transport module 520 receives the transport stream of digitized data packets containing video, audio, data, scheduling information, data files, and other information. As described above, the data packets contain identifying headers. To route and/or connect data packets and/or bitstreams between various components and/or devices of the transport module 520, the example transport module 520 includes a stream manager 521. In one example, a channel de-multiplexer 522, under control of the controller module 505, filters out packets that are not currently of interest, and the stream manager 521 routes the data packets of interest through a DES decryption circuit 523. In the example DTH system 100 of FIG. 1, access control is implemented by any of a variety of techniques. For example, access control may be achieved by broadcast encrypting an asset at the HE 102 based on a CW determined and/or selected by the CAS 350 (FIG. 3), and sending information (e.g., a CWP) containing a CW or containing information from which an IRD 106 may determine the CW such that the asset may be correctly decrypted by the DES decryption circuit 523. In the illustrated example of FIG. 5, determination of a CW from a CWP is performed by a smart card (not shown) based upon, for example, functionality (e.g., a cryptographic hash function) implemented by the smart card (not shown) and/or security data stored in the smart card and accessed via a smart card reader 562 associated with the front panel module 560. In the illustrated example of FIG. 5, secure insertion of the CW from the smart card into the DES decryption circuitry is achieved by way of a security chip (SC) 524 which receives an encrypted version of the CW from the smart card. Alternatively, data packets encrypted by the HE 102 using AES encryption may be decrypted using an AES decryption circuit 525.

To allow additional encryption to be applied to received broadcast encrypted data packets prior to storage on the HDD 425, the example IRD 106 of FIG. 5 includes an AES encryption circuit 527 that optionally applies additional encryption to the received encrypted data packets. In general, the received encrypted data packets are the same encrypted packets created by the HE 102 and transmitted via the satellite/relay 104 and/or made available for download via the CDN 110. To decode additionally encrypted data stored on the HDD 425, the illustrated example includes a second AES decryption circuit 528. Alternatively, the AES decryption circuit 525 could be multiplexed to perform the decrypting operations implemented by the decrypters 525 and 528. An example encryption configuration is discussed below in connection with FIG. 6. The use of additional decryption for use in the reception of additionally encrypted assets from a CDN 110 are discussed in Section VI and in connection with FIGS. 24A-B, 25 and 26A-C. Additionally, as discussed in Sections VII and VIII and in connection with FIGS. 27-34, the additional encryption and/or decryption may also be used to implement secure delivery of assets between the IRD 106 and clients 114 and/or media players 114 communicatively coupled to the example IRD 106.

The authorized and decrypted data of interest, which now consists of, for example, encoded audio/video data, are, for example, forwarded to decoder dynamic random access memory (DRAM) for buffering (not shown). The display module 530 and/or the audio module 535, using any of a variety of techniques and/or methods, decode the received encoded audio/video data, as needed. For example, a video decoder 532 reads the encoded video data, parses it, obtains quantized frequency domain coefficients, and then performs an inverse quantization, an inverse discrete cosine transform (DCT) and motion compensation. At this point, an image is reconstructed in the spatial domain and stored in a frame buffer (not shown). At a later time, the image is read out of the frame buffer and passed to an encoder 534. Alternatively or additionally, the display module 530 may generate graphics that allow, for example, an electronic program guide to be displayed. The video encoder 534 may convert the digital video signals to, for example, an analog signal according to the NTSC standard or to another desired output protocol (e.g., a protocol defined by the ATSC), thereby allowing video to be received by the display device 420 (FIG. 4) via the A/V output module 540. Alternatively, received data may be used by the controller module 505 to, for instance, configure the receiver (e.g., software downloads and/or updates), present program guide information, etc.

To communicatively couple the example IRD 106 to a HE 102 and/or a CDN 110, the illustrated example interface module 550 includes a network interface 435 and/or a conventional modem 551. In the example of FIG. 5, the network interface 435 implements an Ethernet interface and couples the example IRD 106 to a HE 102 and a CDN 110 via the Internet 111 (FIG. 1) and optionally to one more clients 114 and/or media players 114 via a home network 116. For example, the network interface 435 may be connected to a router (not shown) that provides connectivity between the IRD 106 and devices 114 connected to the home network 116 and provides a bridge to a broadband modem (e.g., an ADSL modem) (not shown) that connects the IRD 106 to the Internet 111. The IRD 106 may, additionally or alternatively, be connected to clients 114 and/or media players 114 via a USB interface 552, a serial port interface 553, a Firewire interface (not shown), etc. that also may be implemented by the interface module 550.

To receive inputs and provide outputs, the illustrated example IRD 106 includes the front panel module 560 that provides an interface between the controller module 505 and a plurality of input and/or output devices (e.g., devices 562, 564, 566 and 568). To read and/or write data to any of a variety of smart cards, the example IRD 106 includes the smart card reader 562. To receive user inputs and/or selections from a remote control, the IRD 106 includes an infrared (IR) receiver 564. In addition, support for a RF remote control, e.g. that uses UHF frequencies instead of IR frequencies, may be offered through a RF receiver module (not shown). A user may also provide inputs and/or control the example IRD 106 via one or more buttons (e.g., power on/off, play, etc.) 566 physically located on the IRD 106. To provide user prompts, status, date, time, etc. information to a user, the illustrated example includes any of a variety of display devices 568, for example, a liquid crystal display (LCD).

The controller module 505 may be implemented using any of a variety of techniques, devices, components and/or circuits. An example controller module 505 includes one of any variety of microprocessors, processors, controllers, CPUs 507, an electronically erasable programmable read only memory (EEPROM) 508 and flash memory 509 to store, for example, machine readable instructions that may be executed by the CPU 507, a static random access memory (SRAM) 506 to store data and/or variables used and/or accessed by the CPU 507, or other memory.

Reception of content (i.e., assets) by downloading them from a CDN 110 may be performed by the example IRD 106 of FIG. 5 using any of a variety of techniques. For example, reception and/or recording of an asset may be performed via an IP socket. In particular, based on information from APG data (e.g., an Internet URL), a connection to the CDN 110 is established over which a stream of IP packets may be received. The stream of packets is processed by an IP stack executing, for example, on the CPU 507 and/or the network interface 435 and then passed onto the transport module 520.

The transport module 520 processes the data in a substantially similar manner as data received from the front end modules 510 are processed.

Assets and/or programs received via the satellite/relay 104 include a program clock reference (PCR) that may be used by the transport module 520, the display module 530 and/or the audio module 535 during playback of the received assets and/or programs. Assets and/or programs received from a CDN 110 do not include a PCR and, thus, the IRD 106 assumes the PCR is running exactly at 27 MHz and therefore runs its internal clock 580 at its default frequency. Like assets and/or programs received via the satellite/relay 104, for assets received via the CDN 110, the display module 530 and/or the audio module 535 use presentation time stamps (PTS) to maintain appropriate frame rates and to establish audio and video synchronization. In particular, the IRD 106 uses the first PTS encountered to set the phase of the clock 580.

Figure 6:
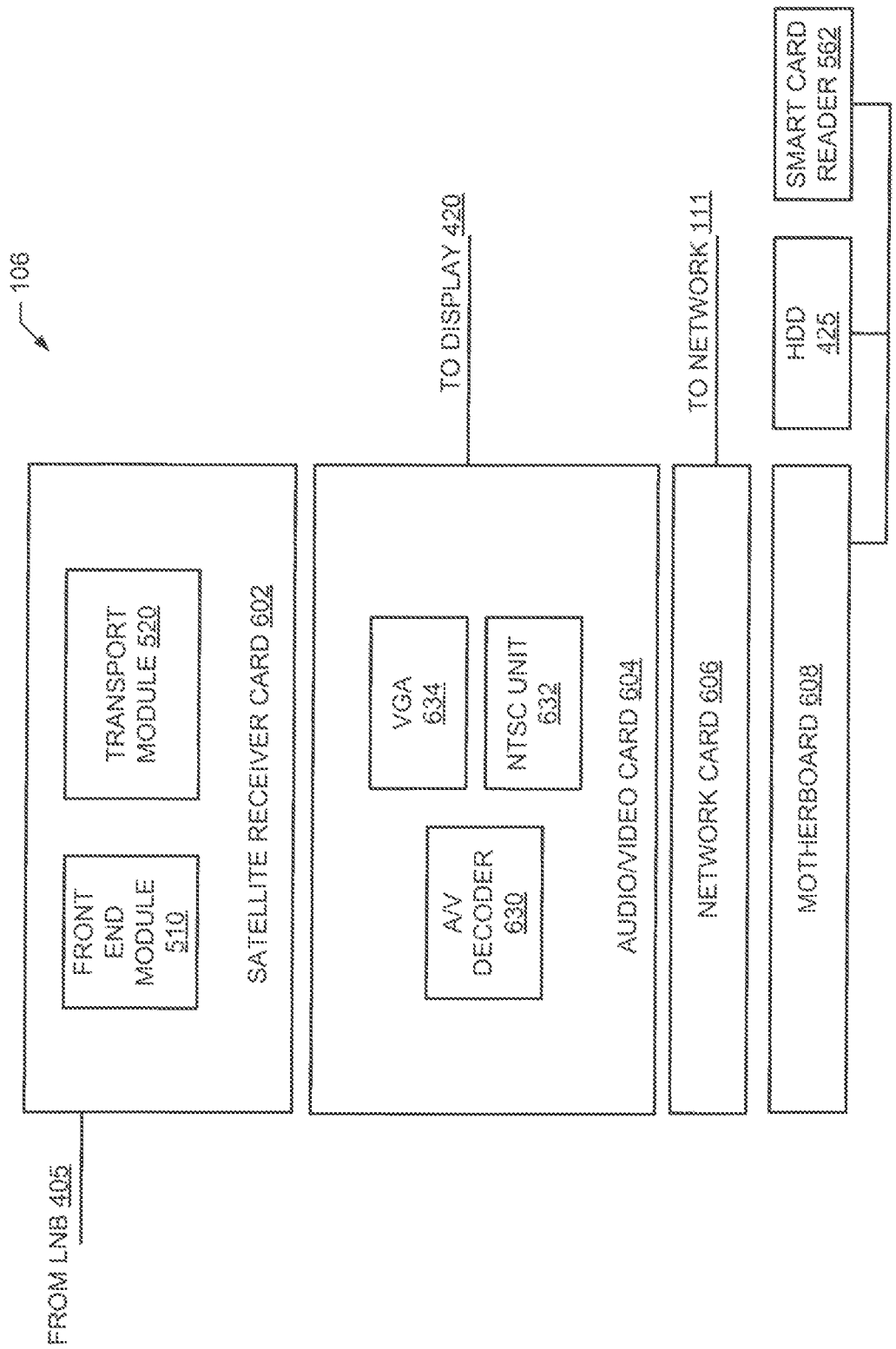

FIG. 6 is a detailed illustration of a third example IRD 106 having a personal computer (PC) based architecture, it being understood that the example IRD 106 of FIG. 6 could be used in the example DTH system 100 of FIG. 1. As shown, the example IRD 106 of FIG. 6, which receives an input from the LNB 405, includes any variety of satellite receiver card(s) 602, any variety of audio/video card(s) 604 and any variety of network card(s) 606, each of which may be coupled to a motherboard 608. The video/audio decoder card 620 could, of course, be integrated with the satellite receiver card 602 and the network card 606 may be integrated into the motherboard 608. The IRD 106 also includes any variety of smart card reader(s) 562 and any variety of HDD(s) 425 that may be coupled to the motherboard 608 or integrated with the cards 602, 604 and/or 606.

In one example, the satellite receiver card 602 includes a front end module 510 and a transport module 520. The implementation and/or interconnection of these devices are substantially the same as shown and described in conjunction with FIG. 5 and, thus, in the interest of brevity will not be repeated here. The interested reader is referred to the discussion above in connection with FIG. 5.

The audio/video decoder card 604 includes an audio/video decoder 630, an optional NTSC and/or ATSC output driver 632 and a video graphics adapter (VGA) output driver 634. As described below in detail, the satellite receiver card 602 can receive and the audio/video card 604 can decode the signal received from the LNB 405.

In operation, an incoming signal from the LNB 405 is received by the satellite receiver card 602 and passed through a series of initial processing operations including the front end module 510 and the transport module 520. Although the functional circuits within the transport module 520 are not illustrated, they may, for example, be identical to those described above in connection with FIG. 5. For example, the transport module 520 receives the transport stream or bitstream of digitized data packets containing video, audio, scheduling information, and other data. The digital packet information contains identifying headers as part of its overhead data. Under control of a main processor/controller (typically located on the motherboard 608), the transport module 520 filters out received data packets that are not currently of interest. Received data packets that are of interest are routed through decryption within the transport module 510. Received data packets may also be additionally encrypted and stored, for example, by the motherboard 608 on the HDD 425.

The transport module 510 passes the data to the audio/video decoder 630 of the video/audio decoder card 604. The authorized data of interest are stored in system RAM (not shown) for buffering, and the video/audio decoder 630 retrieves the data from RAM as needed. For video data, the audio/video decoder 630 reads in the encoded video data from its RAM, and, using any of a variety of techniques and/or methods, decodes the encoded video data and stores the resulting video data in a frame buffer in the video decoder's RAM. At a later time, the image may be read out of the frame buffer and passed through the display circuitry to the VGA output driver 634 and optionally, to the NTSC and/or ATSC output driver 632, the output of which may be coupled to the display device 420. The display circuitry may also generate graphics and text for a graphical user interface (GUI), such as an electronic program guide, to be displayed.

Although not shown, any one or more of the cards 602-608 may include one or more processors to execute machine readable instructions that may be used to implement the example methods, processes, apparatus, and/or systems described herein. Also, the allocation of memory and control functions may be arbitrarily divided between the cards 602-608 of the example IRD 106 of FIG. 6. Thus, a substantial amount, or possibly all, of the control and memory functions for operation of the disclosed system may be integrated within a single card, or alternatively, may be incorporated within the PC motherboard 608.

Although the example IRDs 106 illustrated in FIGS. 4, 5 and 6 are shown as having a plurality of components, circuits and/or devices that are interconnected or communicatively coupled with other components, circuits and/or devices, such interconnections are illustrated by way of example and should not be construed as limiting the manner in which they can be interconnected to implement the example methods, apparatus, and/or systems described herein. On the contrary, the components, circuits and/or devices described above in connection with the illustrated examples of FIGS. 4-6 may be interconnected in any other suitable manner to implement the example methods, apparatus, and/or systems.

In the illustrated example DTH system 100, the HDD 425 of the example IRDs 106 of FIGS. 4-6 is partitioned into at least two partitions. A first network partition is used to store content (e.g., assets) "pushed" by the HE 102 to the IRDs 106 via the satellite/relay 104. Such pushed content is received and stored by the IRDs 106 without being selected and/or requested by a user of an IRD 106. A second user partition is used to store content requested and/or selected by the user and be received via the satellite/relay 104 and/or downloaded via a CDN 110. A content request could be for a specific program or for a specific category of programs meeting any number of criteria, e.g. genre, actor name.

As discussed above, the example IRDs 106 of FIGS. 4-6 are able to receive, decode and playback both live programs and non-live programs. Live programs received by an IRD 106 may be recorded by the IRD 106 to the HDD 425 and/or may be directly decoded and played back to a display device 420. In general, non-live programs are received and first stored in their entirety on the HDD 425 before being subsequently decoded and/or played back. Alternatively, a non-live asset may be directly decoded and/or played back if it is received by the IRD 106 at a rate exceeding the playback rate of the asset. As also discussed above, live and non-live programs may be recorded, stored, decoded, played back and/or otherwise manipulated identically by the IRDs 106. In particular, all assets are stored on the HDD 425 using a single file format.

In the example IRDs 106 of FIGS. 4-5, reception and/or recording of live data will, in general, have a higher priority than the reception and/or recording of non-live data. For example, an IRD 106 will be able to interrupt (e.g., pause) the download of an asset from a CDN 110 to ensure that a live program is received, recorded and/or played back in its entirety and without interruption. Once the conflict is over, the IRD 106 may resume downloading and/or reception of the non-live asset.

Since the example IRDs 106 of FIGS. 4-6 include a connection to the Internet 111, the example IRDs preferably use the Internet connection via the network interface 435 for back channel communications and/or callbacks to the HE 102. Further, since Internet connections are typically higher speed and always on, the Internet connection may be more suitable for interactive applications, gaming, ratings measurement, etc.

The example IRDs 106 illustrated in FIGS. 4-6 may be implemented in a same housing or in different housings. For example, an IRD 106 may be implemented in a single housing as a set-top box (STB), a DVR, a HMC and/or a PC. Another example IRD 106 comprises a first housing that includes the front end module 510 and a PC (i.e., second housing) implementing the other portions of the example IRD 106. In this event, the content delivered from one housing to the other would be protected, e.g. using data encryption techniques.

Figure 7:
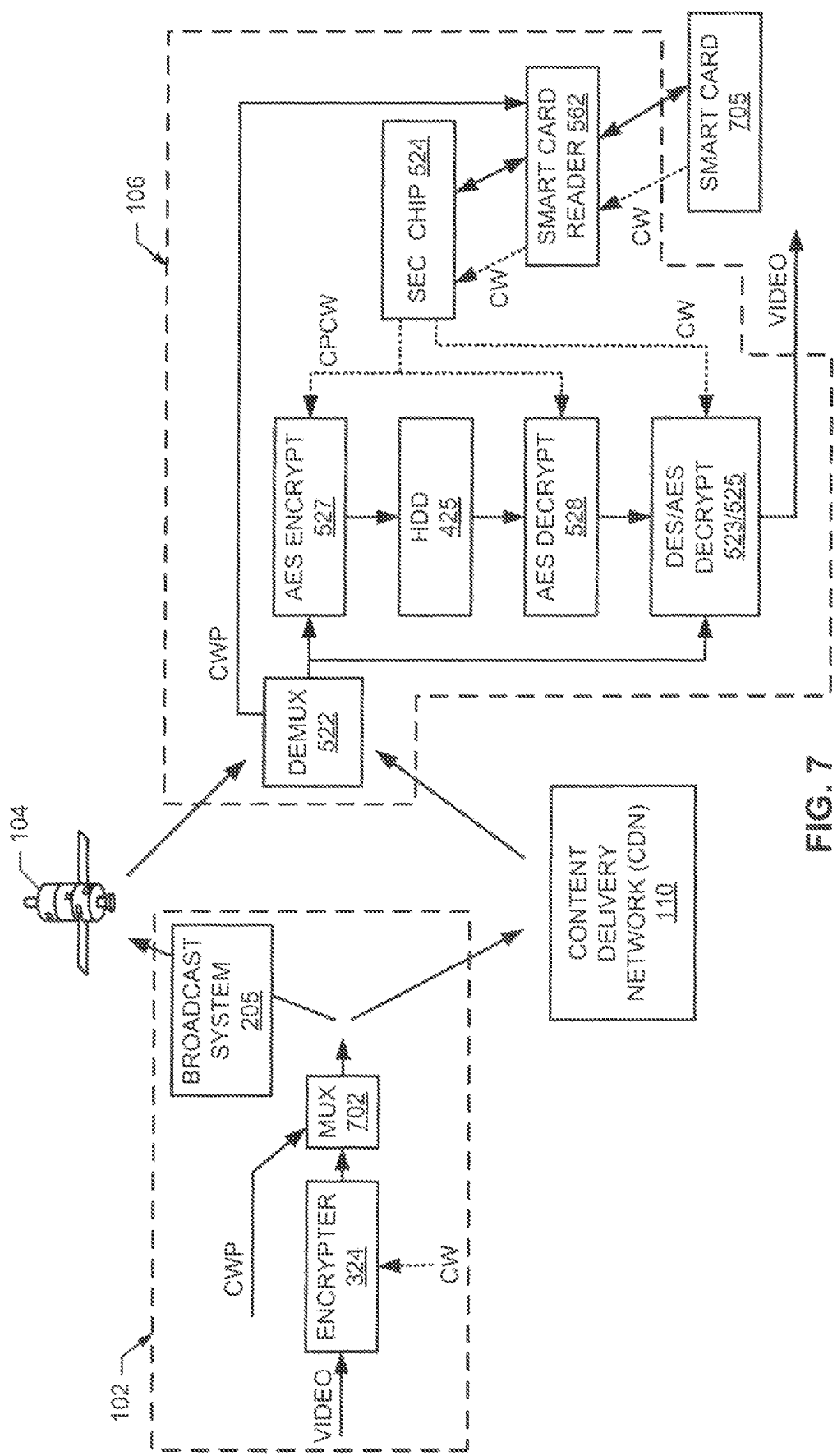
FIG. 7 illustrates an example encryption configuration for the example content delivery system of FIG. 1.

FIG. 7 illustrates an example encryption configuration for the example DTH system 100 of FIG. 1. At a HE 102, video is broadcast encrypted by the encrypter 324 (FIG. 3) or encrypter 240 (FIG. 2) using, for example, a CW determined by the CAS 350. Using any variety of multiplexer 702, the HE 102 may multiplex the multiplexed broadcast encrypted video with a CWP from which the CW may be determined. As discussed above, the multiplexed CWP and broadcast encrypted video may be sent via a satellite/relay 104 to the IRD 106 and/or made available for download by the IRD 106 via a CDN 110.

In the illustrated example of FIG. 7, at the IRD 106, the received broadcast encrypted video is additionally encrypted using the AES encrypter 527. The additional encryption is performed using a copy protection codeword (CPCW) determined by the security chip 524 using, for example, unique information input to the security chip and secret information stored on the security chip. In the example of FIG. 7, the CPCW is not known by the HE 102 or any other IRDs 106. The additionally encrypted (i.e., super-encrypted) video is subsequently stored on the HDD 425.

When the encrypted video stored on the HDD 425 is to be played back, the encrypted video is first decrypted by the AES decrypter 528 using the CPCW and then the resulting broadcast encrypted video is further decrypted using the CW by the DES decrypter 523 or an AES decrypter 525, depending upon the type of broadcast encryption performed by the encrypter 324 or the encrypter 240. Audio and data are handled in a similar manner. The decrypted data may be subsequently decoded and played back for viewing by a user of the IRD 106 as described above in connection with FIG. 5.

Figure 8:
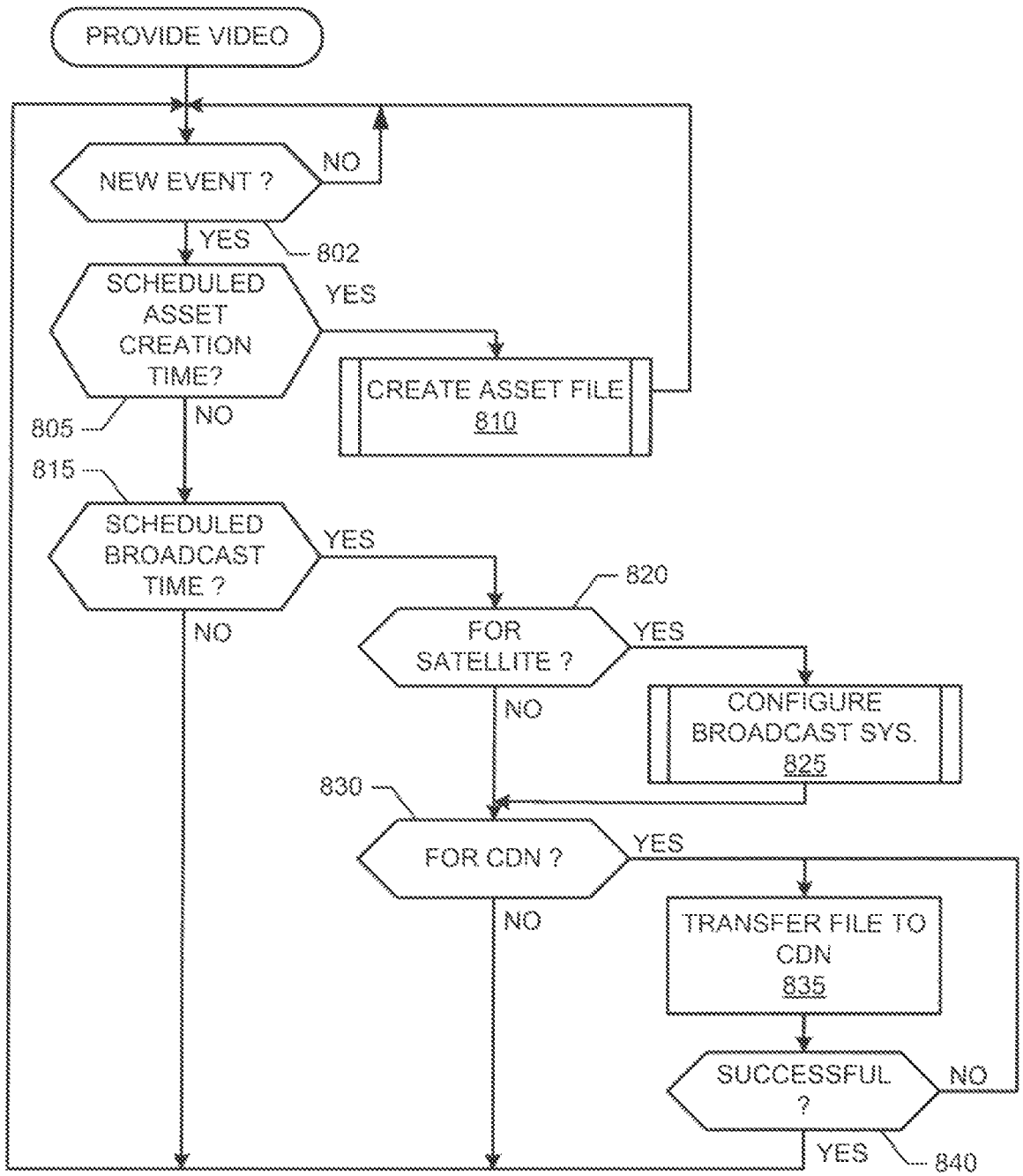
FIGS. 8-10 are flowcharts representative of example processes that may be carried out to implement the example headend (HE) of FIG. 1.
Figure 9:
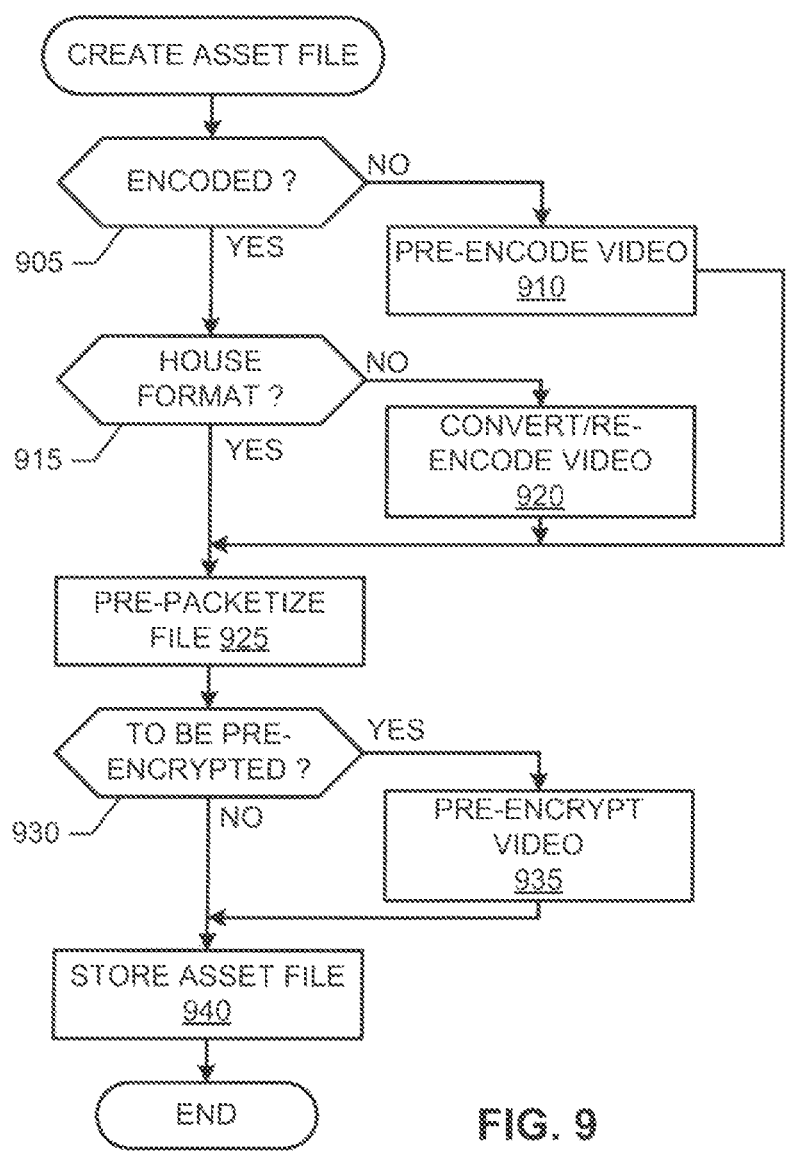
Figure 10:
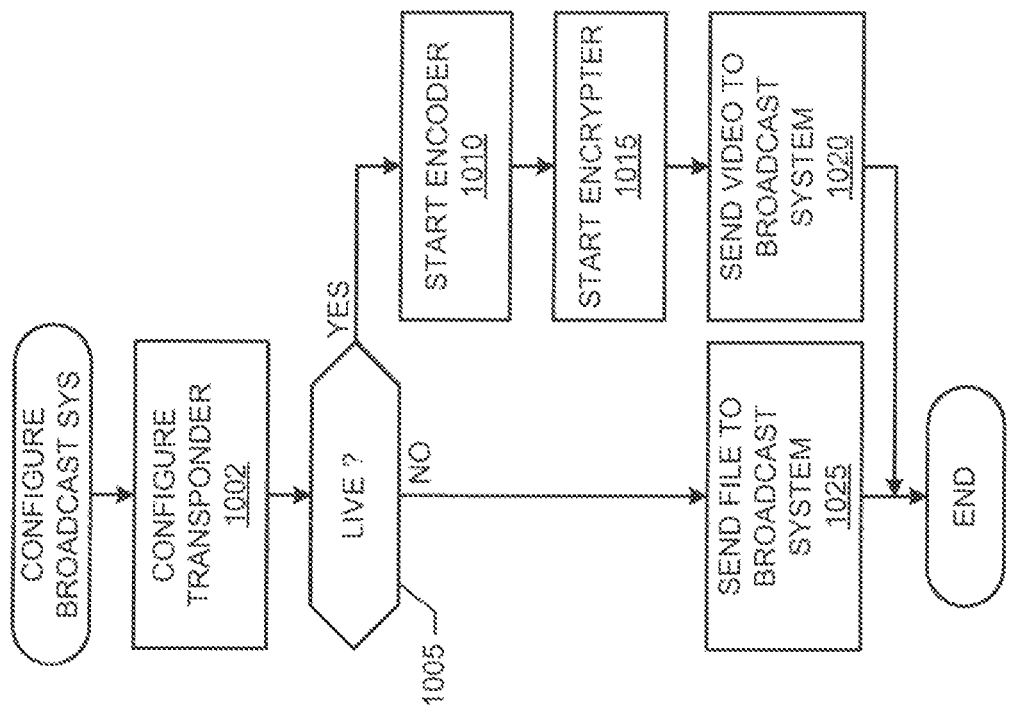

FIGS. 8, 9 and 10 illustrate flowcharts representative of example processes that may be carried out to implement the example HE 102 of FIGS. 1-3. The example processes of FIGS. 8-10 and/or, more generally, the example HE 102 may be executed by a processor, a controller and/or any other suitable processing device. For example, the example processes of FIGS. 8-10 and/or, more generally, the example HE 102 may be embodied in coded instructions stored on a tangible medium such as a flash memory, or RAM associated with a processor (e.g., the processor 8010 shown in the example processor platform 8000 and discussed below in conjunction with FIG. 35). Alternatively, some or all of the example processes of FIGS. 8-10 and/or, more generally, the example HE 102 may be implemented using an application specific integrated circuit (ASIC), a programmable logic device (PLD), a field programmable logic device (FPLD), discrete logic, hardware, firmware, etc. Also, some or all of the example processes of FIGS. 8-10 and/or, more generally, the example HE 102 may be implemented manually or as combinations of any of the foregoing techniques, for example, a combination of firmware and/or software and hardware. Further, although the example processes of FIGS. 8-10 are described with reference to the flowcharts of FIGS. 8-10, persons of ordinary skill in the art will readily appreciate that many other methods of implementing the example HE 102 may be employed. For example, the order of execution of the blocks may be changed, and/or some of the blocks described may be changed, eliminated, sub-divided, or combined. Persons of ordinary skill in the art will appreciate that the example processes of FIGS. 8-10 may be carried out sequentially and/or carried out in parallel by, for example, separate processing threads.

The example process of FIG. 8 begins with the HE 102 waiting for a new event such as, for example, a scheduled time for asset creation, a scheduled time to broadcast an asset, etc. (block 802). If a new event time has not arrived, the HE 102 continues waiting. If the scheduled time for a new event has arrived (block 802) and if new event corresponds to the scheduled creation of an asset (block 805), the TSS 315 triggers the creation of an asset file (i.e., distribution file) by, for example, carrying out the example process described below in conjunction with FIG. 9 (block 810). Once the asset file has been created (block 810), control returns to block 802 to await another event.

Returning to block 805, if the scheduled time to create an asset has not arrived, the TSS 315 determines if a scheduled time to broadcast an asset has arrived (block 815). If a scheduled time to broadcast an asset has arrived (block 815), the TSS 315 determines if the asset is to be transmitted via the satellite/relay 104 (block 820). If the asset is to be transmitted via the satellite/relay 102 (block 820), the SMA 330 configures the broadcast system 205 by, for example, carrying out the example process described below in conjunction with FIG. 10 (block 825) and control proceeds to block 830.

At block 830, if the asset is to be transmitted to a CDN 110, the SMA 330 under the control of the TSS 315 transmits the asset to the CDN 110 using the assigned BOC channel of the link (block 835). If the transfer is not successful (block 840), the SMA 330 re-transmits the asset to the CDN 110 (block 835). Once the asset has been successfully transmitted to the CDN 110 (block 840) and/or the broadcast system 205 has been configured (block 825), control returns to block 802 to await another new event. If the asset is not to be transmitted to a CDN 110 (block 830), control returns to block 802 to await another new event.

The example process of FIG. 9, generally carried out when a new video asset is received from a media source (e.g., block 805 of FIG. 8), is scheduled by the TSS 315. If the video asset is not received already encoded (block 905), the encoder/converter 312 pre-encodes and packages the asset according to the CableLabs specification for VoD content (block 910). If the asset is already encoded (block 905), but is not encoded according to the house format (i.e., the CableLabs specification for VoD content) (block 915), the encoder/converter 312 converts/re-encodes the assets and packages the asset according to the CableLabs specification for VoD content (block 920).

Once the video asset has been correctly pre-encoded and packaged according to the CableLabs specification for VoD content, the packetizer 322 pre-packetizes the pre-encoded asset (block 925). If the pre-packetized pre-encoded asset is to be pre-encrypted (block 930), the encrypter 324 pre-encrypts the pre-packetized pre-encoded asset (block 935). The broadcast encrypted or unencrypted asset is then stored, along with descriptive information (i.e., program name and/or other labels) in the repository 322 (block 940) and control returns to, for example, the example process of FIG. 8.

The example process of FIG. 10 is carried out when the scheduled time to broadcast content (i.e., an asset) via the satellite/relay 104 arrives (e.g., block 820 of FIG. 8). The broadcast system 205 is configured with the satellite transponder to be used to broadcast the asset (block 1002). If the asset is live (block 1005), the broadcast system 205 is configured to start encoding the asset (block 1010) and to start encrypting the asset (block 1015) and to start transmitting the live asset via the satellite/relay 104 (block 1020). Control then returns to, for example, the example process of FIG. 8.

Returning to block 1005, if the asset is not live, the SMA 330 sends the asset file of the asset to the multiplexer/modulator 245 of the example broadcast system 205 of FIG. 2, the broadcast system 205 starts transmitting the non-live asset via the satellite/relay 104 (block 1025) and control returns to, for example, the example process of FIG. 8.

Figure 11:
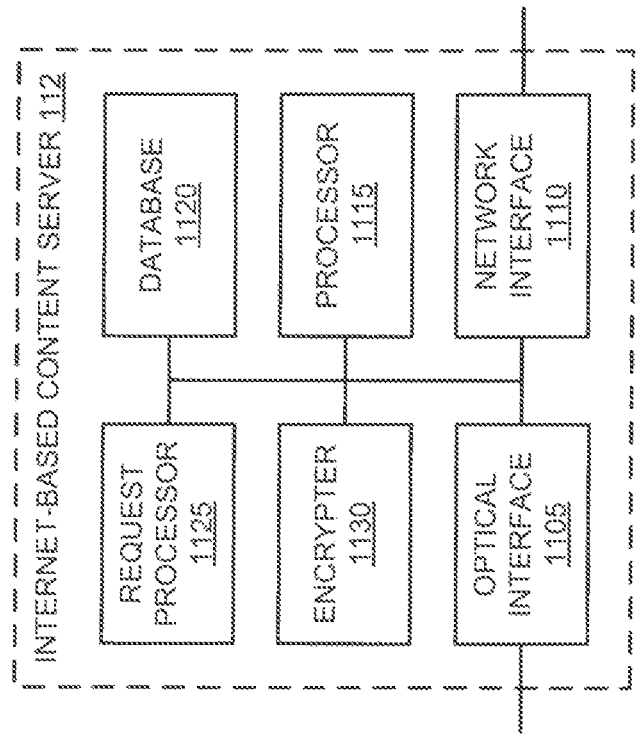
FIG. 11 illustrates an example manner of implementing the example Internet-based content server of FIG. 1.

FIG. 11 illustrates an example manner of implementing the Internet-based content server 112 of FIG. 1. To connect the example Internet-based content server 112 with other Internet-based content servers 112, the example Internet-based content server 112 includes one of any variety of optical interface 1105. To connect the Internet-based content server 112 with the Internet 111, the example Internet-based content server 112 includes a network interface 1110. Alternatively, the example Internet-based content server 112 may be connected to the Internet 111 via the optical interface 1105.

To control, manage and/or configure the example Internet-based content server 112 of FIG. 11, the illustrated example includes a processor 1115. The processor 1115 executes coded instructions present in main memory of the processor 1115. The processor 1115 may be any type of processing unit, such as a microprocessor from the Intel®, AMD®, IBM®, or SUN® families of microprocessors.

To store one or more pre-encoded, pre-packetized and, optionally, pre-encrypted asset files, the example Internet-based content server 112 of FIG. 11 includes a database 1120. The database 1120 may also be used to store encryption keys, identifiers for the IRDs 106 and/or authorization results.

To process content delivery requests received from the IRDs 106, the illustrated example Internet-based content server 112 includes a request processor 1125. The request processor 1125 uses, for example, IRD 106 identifiers and/or authorization results stored in the database 1120 to determine is an IRD 106 is allowed to download an asset file.

To encrypt or additionally encrypt an asset file prior to download to an IRD 106, the example Internet-based content server 112 of FIG. 11 includes an encrypter 1130. The encrypter 1130 implements, for example, either the AES or the DES encryption standards.

Example usage of the Internet-based content server 112 of FIG. 11 to authorize and/or securely delivery asset files to the IRDs 106 are discussed below in Sections III-VI and in connection with FIGS. 16-26C.

Figure 12:
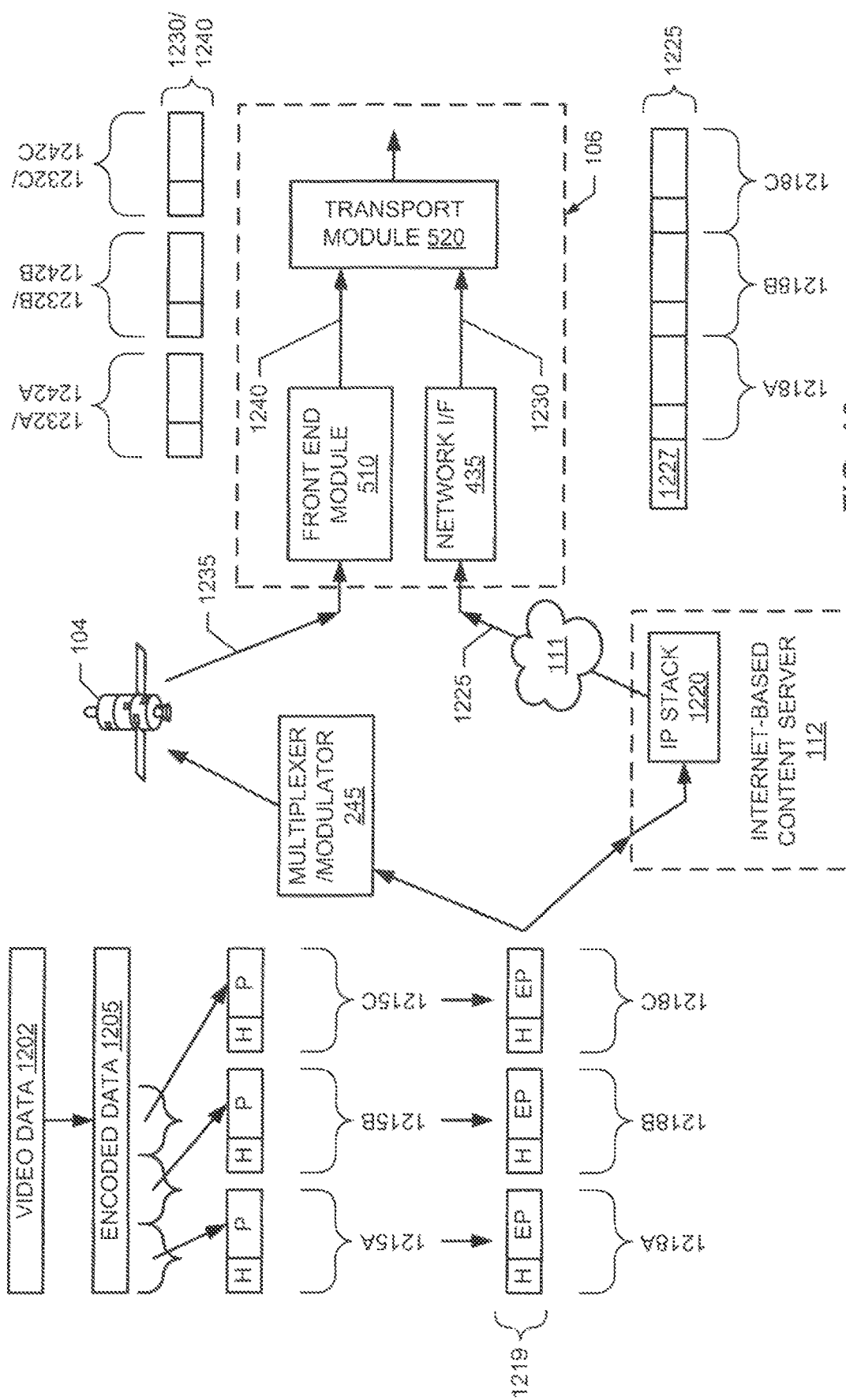
FIG. 12 illustrates example signal processing and content delivery paths for the example content delivery system of FIG. 1.

FIG. 12 illustrates example signal processing, content delivery paths and content delivery configurations for the example content delivery system of FIG. 1. In the illustrated example of FIG. 12, video data 1202 is encoded by, for instance, the encoder/converter 312 (FIG. 3) thereby creating a block of encoded data 1205 consisting of, for example, a plurality of bytes. The encoded data 1205 is then packetized by, for instance the packetizer 322 (FIG. 3) creating a plurality (i.e., stream) of data packets 1215A, 1215B and 1215C each having a header H and a payload P. In the example of FIG. 12, the plurality of data packets 1215A-C are then broadcast encrypted by the encrypter 324 (FIG. 3) creating a plurality (i.e., stream) of encrypted data packets 1218A, 1218B and 1218C each having the header H and an encrypted payload EP. In particular, the payload P of each of the plurality of data packets 1215A-C are broadcast encrypted and the data packet headers H are left unencrypted. Taken together, the stream of broadcast encrypted data packets 1218A, 1218B and 1218C constitute a data stream 1219 that may be stored in an asset file in the repository 332 (FIG. 3) and/or immediately transmitted via the satellite/relay 104. Alternatively, encryption of the data packets 1215A-C may be skipped and, thus, the data packets 1218A-C would be substantially identical to data packets 1215A-C. For simplicity the follow discussion refers to the encrypted data packets 1218A-C, persons of ordinary skill in the art will readily appreciate that the signal processing and content delivery paths described below could also be used to deliver the unencrypted data packets 1215A-C.

The contents of the example asset file may subsequently be made available for download via the CDN 110 and, in particular, an Internet-based content server 112. The Internet-based content server 112, using any of a variety of techniques, receives and stores the example asset file. In particular, a data structure used by the Internet-based content server 112 to store the asset file maintains, intact, the plurality of encrypted data packets 1218A-C created and provided by the HE 102. When an IRD 106 downloads the example asset file, the Internet-based content server 112 encapsulates the plurality of encrypted data packets 1218A-C, via, for instance, an IP stack 1220 into one or more IP packets that are sent to the IRD 106 via the Internet 111 (i.e., an Internet signal). An example IP packet 1225 (i.e., Internet signal 1225) includes an IP header 1227 and a payload carrying one or more of the plurality of encrypted data packets 1218A-C. At an IRD 106, the network interface 435 (FIG. 5) receives the Internet signal 1225 transmitted by the CDN 110 and using, for example an IP stack and/or download application, removes the IP header 1227 and passes the payload of the IP packet 1225 (i.e., a data stream 1230) to the transport module 520. In particular, the data stream 1230 includes a plurality of data packets 1232A-C and, in the example of FIG. 12, the received broadcast encrypted data packets 1232A-C are identical, excluding, for example, transmission errors, the broadcast encrypted data packets 1218A-C created by the HE 102.

Additionally or alternatively, the broadcast encrypted data packets 1218A-C may be immediately broadcast via the satellite/relay 104 and/or the contents of the example asset file may be broadcast via the satellite/relay 104 at a later time. In either case, the stream of broadcast encrypted data packets 1218A-C are multiplexed and modulated by the multiplexer/modulator 245 (FIG. 2) and then processed by the uplink frequency converter/RF amplifier 250 (not shown) and broadcast via the transmit (i.e., uplink) antenna 107 (not shown) to the satellite/relay 104. In the example of FIG. 12, the IRD 106 receives a satellite signal 1235 including the up-converted, modulated and multiplexed version of the stream of encrypted data packets 1218A-C. The front end module 510 (FIG. 5) down-converts de-modulates and de-multiplexes the received satellite signal 1235 and passes the thus received data stream 1240 to the transport module 520. In particular, the data stream 1240 includes a plurality of received broadcast encrypted data packets 1242A-C and, in the example of FIG. 12, the broadcast encrypted data packets 1242A-C are identical, excluding, for example, transmission errors, the broadcast encrypted data packets 1218A-C created and broadcast by the HE 102.

As illustrated in the example of FIG. 12, the IRD 106 receives the same broadcast encrypted data packets 1218A-C created by the HE 102. Additionally, the transport module 520 receives same the broadcast encrypted data packets 1218A-C regardless of whether the content, asset and/or asset file is received via the satellite/relay 104 and/or the Internet-based content server 112. In particular, the payload of the satellite signal 1235 and the payload of the Internet signal 1225 are identical. Further, the satellite signal 1235 and the Internet signal 1225 only differ in the portion(s) of the satellite signal 1235 and the Internet signal 1225 that are transmission medium dependent, that is they differ only in, for example, the modulation, the uplink frequency conversion, the IP packetization, etc. applied to broadcast and/or transmit the plurality of broadcast encrypted data packets 1218A-C to the IRD 106. Clearly, as illustrated in FIG. 12, storage, decryption, decoding and/or playback of the received broadcast encrypted data packets 1232A-C and/or 1242A-C may be performed independently of how they were received.

II. Flexible Content Delivery

As described above in connection with the example DTH system 100 of FIG. 1, the example IRDs 106 of FIGS. 1 and 4-6 may receive a program (e.g., a TV program, a movie, a music video, etc.) via the satellite/relay 104 and/or the CDN 110. More specifically, as described above in connection with the illustrated example of FIG. 12, an IRD 106 receives the same plurality of encrypted and/or unencrypted data packets (e.g., the encrypted data packets 1218A-C of FIG. 12) regardless of whether the associated program is received via the satellite/relay 104 and/or the CDN 110 (i.e., via a satellite signal and/or an Internet signal).

As also described above, the satellite signal(s) broadcast by the HE 102 represent one or more programs. In the illustrated example of FIG. 1, the programs are broadcast at times determined by, for example, the TSS 315. Reception of those programs via the satellite signal must then occur during the associated broadcast times. In contrast, programs downloaded by an IRD 106 from the CDN 110 may occur at a time chosen by the IRD 106.

By nature, the reception of a program by a large plurality of IRDs 106 via the satellite/relay 104 is bandwidth efficient. That is, a program may be broadcast once and simultaneously received by the large plurality of IRDs 106. However, because channels (i.e., transponders) are limited on the satellite/relay 104, the number of programs simultaneously supported by the satellite/relay 104 is correspondingly limited. Also by nature, the reception of a program by a large plurality of IRDs 106 via the CDN 110 is bandwidth inefficient. In particular, each program downloaded by an IRD 106 requires a separate transmission from the CDN 110 to an IRD 106 and, thus, downloads of a single program by a large plurality of IRDs 106 requires a correspondingly large plurality of separate transmissions.

In recognition of the above capabilities, characteristics and/or inherent advantages of the example DTH system 100 of FIG. 1, an IRD 106 preferably receives and/or acquires content via the satellite/relay 104. However, because the same plurality of encrypted data packets is received via either the satellite/relay 104 and/or the CDN 110, an IRD 106 may selectively receive all or any portion of a program from either of the satellite relay 104 and/or the CDN 110.

Figure 13:
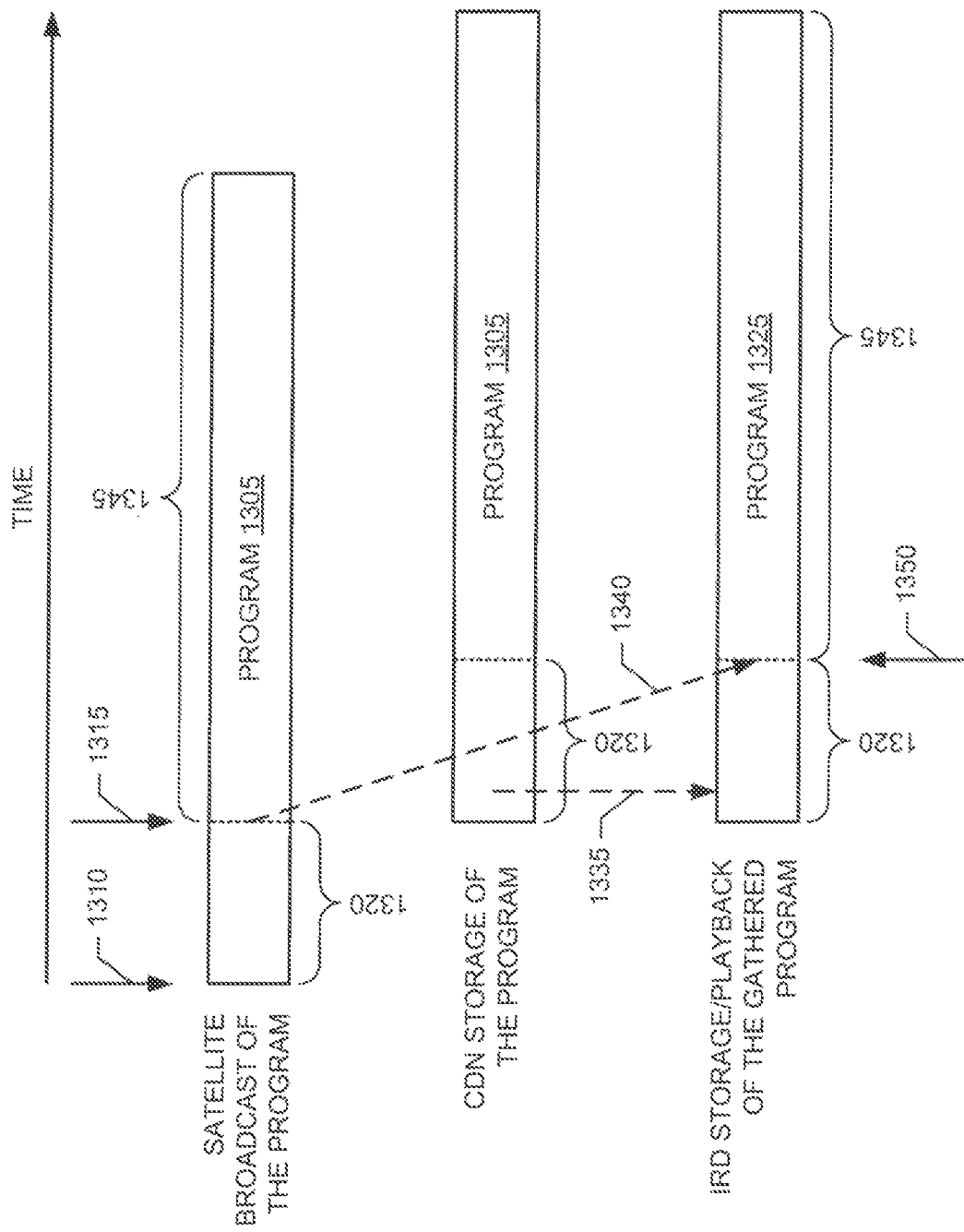
FIGS. 13 and 14 illustrate example video on demand data packet gathering methods for the example content delivery system of FIG. 1.

FIG. 13 illustrates an example reception of a portion of an example program 1305 via the satellite/relay 104 and another portion of the program 1305 via the CDN 110. Time in the example of FIG. 13 progresses from left to right. In the example of FIG. 13, the HE 102 starts transmission of (i.e., broadcasting) the program 1305 at a first point in time designated by reference numeral 1310. At a later point in time designated by reference numeral 1315, a user of an IRD 106 selects for viewing and/or recording the program 1305. However, between times 1310 and 1315, a beginning portion 1320 of the program 1305 has already been broadcast and is, thus, not currently receivable by the IRD 106.

In the illustrated example of FIG. 13, the CDN 110 has available for download an asset file containing the program 1305. In particular, as discussed above in connection with FIG. 12, the asset file available for download via the CDN 110 may contain the exact same plurality of encrypted and/or unencrypted data packets that the HE 102 is currently broadcasting via the satellite/relay 104.

To allow the IRD 106 to start recording the program 1305 at time 1315 into, for example, a file 1325 on the HDD 425 of the IRD 106, even though the HE 102 is currently part way through transmission of the program 1305 via the satellite/relay 104, the IRD 106 in the illustrated example downloads 1335 the beginning portion 1320 of the file from the CDN 110 and starts recording 1340 the remaining portion 1345 of the program 1305 from the satellite signal. Because the same stream of encrypted data packets is receivable via the satellite/relay 104 and/or the CDN 110, the IRD 106 can seamlessly splice at a point in the program designated by reference numeral 1350 the portion 1320 of the program downloaded from the CDN 110 while the remaining portion 1345 of the program 1305 is recorded from the satellite signal. For instance, the IRD 106 may use the sequence numbers in the headers of the encrypted data packets to assemble a complete set of encrypted data packets, that is, to ensure no data packets are duplicated or missing. Obviously, the file 1325 thus created is identical to either recording the entire program 1305 from the satellite signal or downloading the entire program 1305 from the CDN 110.

After downloading at least some of the portion 1320 from the CDN 110, the IRD 106 may, additionally or alternatively, immediately start displaying (i.e., decoding and playing back) the program 1305 while simultaneously recording the portion 1345 (i.e., the remainder of the program 1305) from the satellite signal. Once the entire downloaded portion 1320 has been displayed, the remaining portion 1345 can be decoded and played back from the portion 1345 recorded from the satellite signal.

If an asset file for the example program 1305 is not available via the CDN 110, the IRD 106 may wait for the next time the program 1305 is broadcast. Furthermore, if the program 1305 is intended to not be played back right away, the IRD 106 may alternatively download the portion 1345 now, and record the portion 1320 at a later time.

Figure 14:
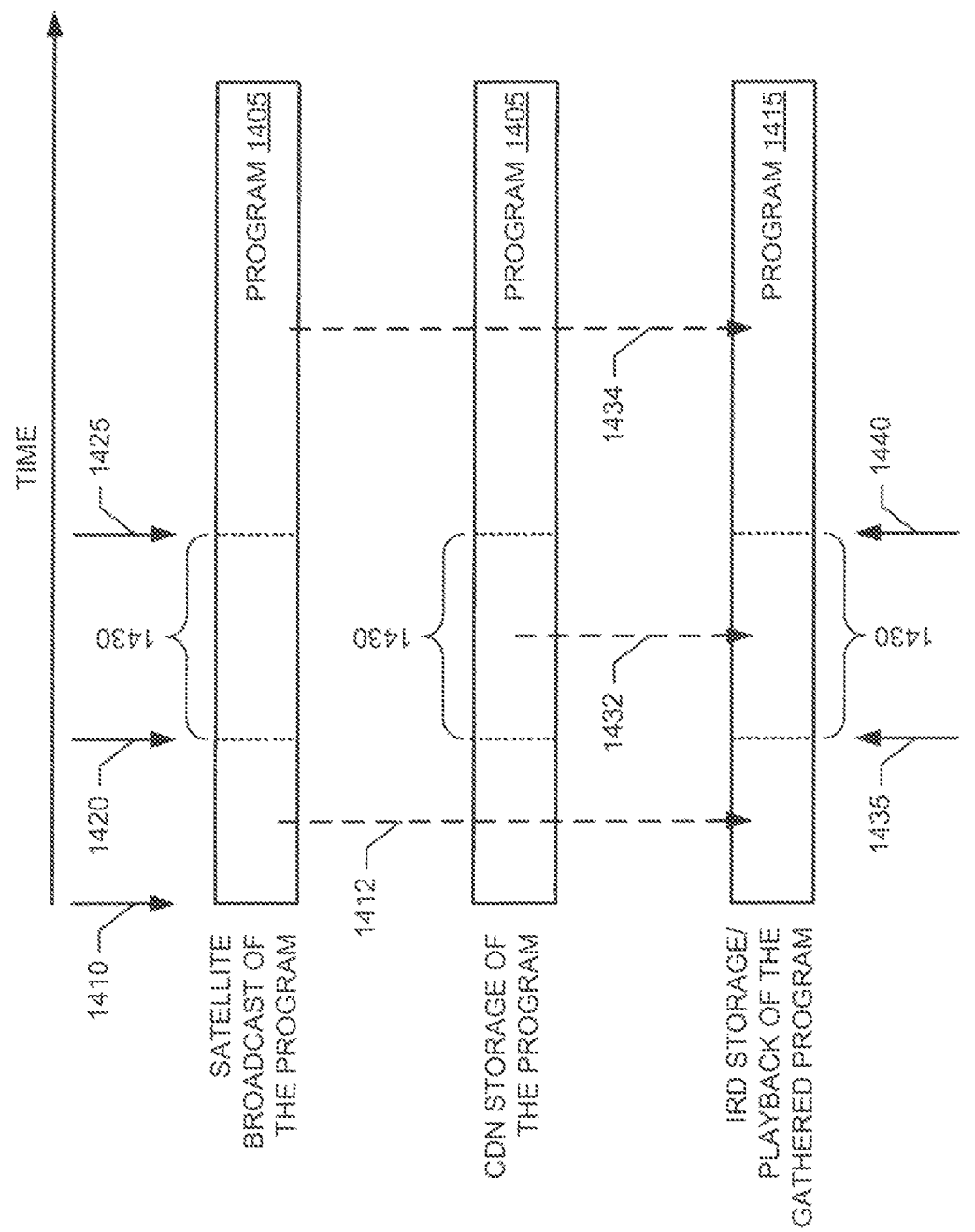

FIG. 14 illustrates another example reception of a portion of an example program 1405 via the satellite/relay 104 and another portion of the program 1405 via the CDN 110. As in FIG. 13, time in the example of FIG. 14 progresses from left to right. In the example of FIG. 14, the HE 102 starts transmission of (i.e., broadcasting) the program 1405 at a point in time designated by reference numeral 1410. Also at the point in time 1410, an IRD 106 starts recording 1412 the program 1405 into, for example, a file 1415 on the HDD 425 of the IRD 106 from the satellite signal broadcast by the HE 102.

Starting at a later point in time designated by reference numeral 1420 and continuing to a point in time designated by reference numeral 1425, reception of the satellite signal by the IRD 106 is inhibited by, for example bad weather. Between the point in times 1420 and 1425, a portion 1430 of the program 1405 is, thus, not receivable by the IRD 106 via the satellite signal. In the example of FIG. 14, the IRD 106 downloads 1432 the missing portion 1430 of the program 1405 from the asset file for the program 1405 available via the CDN 110 thereby allowing continued recording and/or delayed viewing of the example program 1405 at the IRD 106. When the satellite signal is again receivable (e.g., a point in time designated by reference numeral 1425), the IRD 106 may resume recording 1434 the remainder of the program 1405 from the satellite/relay 104.

Because the same stream of encrypted data packets is receivable via the satellite/relay 104 and/or the CDN 110, the IRD 106 can seamlessly splice at points in the program designated by reference numerals 1435 and 1440 the portion 1430 of the program downloaded from the CDN 110 with the beginning and end of the program 1405 recorded from the satellite signal (i.e., the portion of the program 1405 received via the satellite signal prior to point in the program 1420 and after point in the program 1425). Of course, the file 1415 thus created is identical to either recording the entire program 1405 from the satellite signal or downloading the entire program 1405 from the CDN 110.

After downloading at least some of the portion 1420 from the CDN 110, the IRD 106 may, additionally or alternatively, immediately starting displaying (i.e., decoding and playing back) the program 1405 while simultaneously recording the remainder of the program 1405 including, for example portion 1430.

If an asset file for the example program 1405 is not available via the CDN 110, the IRD 106 may wait for the next time the program 1405 is broadcast. Furthermore, if the program 1405 is intended to not be played back right away, the IRD 106 may alternatively record the portion 1430 at a later time.

Figure 15:
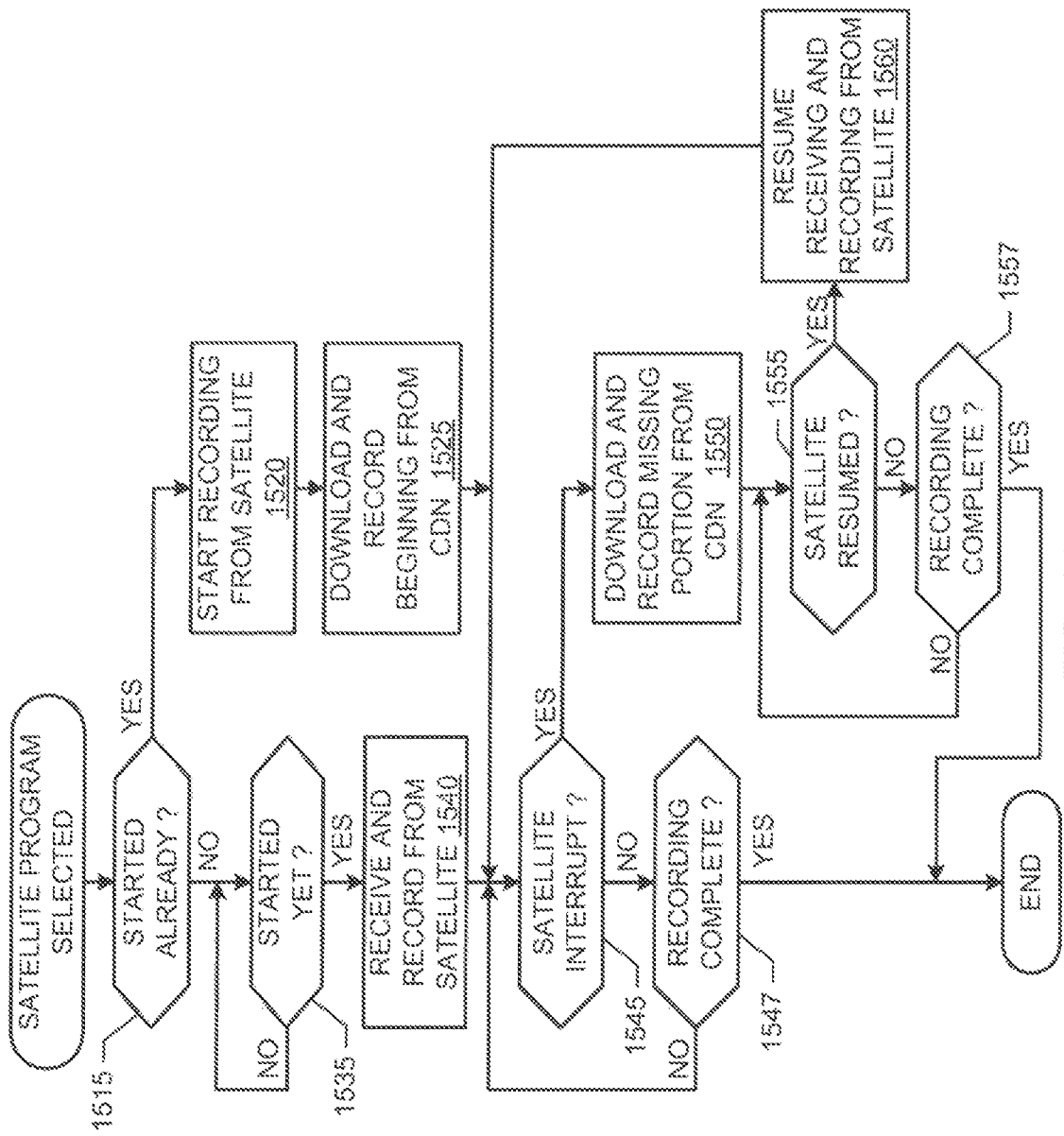
FIG. 15 is a flowchart representative of an example process that may be carried out to implement the example methods illustrated in FIGS. 13 and 14.

FIG. 15 illustrates a flowchart representative of an example process that may be carried out to implement the example IRDs 106 of FIGS. 1 and 4-6 and/or, more specifically, the examples illustrated in FIGS. 13 and 14. The example process of FIG. 15 and/or, more specifically, the example receptions illustrated in FIGS. 13 and 14 may be executed by a processor, a controller and/or any other suitable processing device. For example, the example process of FIG. 15 and/or, more specifically, the example receptions illustrated in FIGS. 13 and 14 may be embodied in coded instructions stored on a tangible medium such as a flash memory, or RAM associated with a processor (e.g., the controller module 505 of FIG. 5). Alternatively, some or all of the example process of FIG. 15 and/or, more specifically, the examples illustrated in FIGS. 13 and 14 may be implemented using an ASIC, a PLD, a FPLD, discrete logic, hardware, firmware, etc. Also, some or all of the example process of FIG. 15 and/or, more specifically, the example receptions illustrated in FIGS. 13 and 14 may be implemented manually or as combinations of any of the foregoing techniques, for example, a combination of firmware and/or software and hardware. Further, although the example process of FIG. 15 are described with reference to the flowchart of FIG. 15, persons of ordinary skill in the art will readily appreciate that many other methods of implementing the example IRDs 106 of FIGS. 1 and 4-6 and/or, more specifically, the example receptions illustrated in FIGS. 13 and 14 may be employed. For example, the order of execution of the blocks may be changed, and/or some of the blocks described may be changed, eliminated, sub-divided, or combined. Persons of ordinary skill in the art will appreciate that the example processes of FIG. 15 may be carried out sequentially and/or carried out in parallel by, for example, separate processing threads.

The example process of FIG. 15 begins with the selection by, for example, a user of a new program for viewing and/or recording (i.e., a program different from that currently being viewed and/or recorded). The IRD 106 determines if the transmission of the new program via the satellite/relay 104 has already started (block 1515), that is, if a beginning portion of the new program (e.g., the example beginning portion 1320 of FIG. 13) has already been missed. If transmission of the new program via the satellite/relay 104 has already started (block 1515), the IRD 106 starts recording the remainder of the new program from the satellite signal (e.g., the example portion 1345 of FIG. 13) (block 1520) and downloads and records the missed beginning portion from the CDN 110 (block 1525). If the new program is to be viewed, the IRD 106 begins playback of the new program starting with the beginning portion downloaded from the CDN 110 and continues with the remainder portion received via the satellite signal. Control then proceeds to block 1545 to monitor for a satellite interruption.

Returning to block 1515, if the new program has not already started, the IRD 106 waits for the start of the new program (block 1535). When the new program starts (block 1535), the IRD 106 starts recording and/or playback of the new program received via the satellite signal (block 1540).

At block 1545, after recording from the satellite has begun at either block 1520 or block 1540, the IRD 106 determines if reception of an ongoing satellite signal is interrupted. If no interrupt occurs (block 1545), the IRD 106 determines if downloading of the program has completed via the CDN 110 and/or the satellite signal (block 1547). If download of the program has not completed (block 1547), control returns to block 1545 to monitor for a satellite signal interruption. If recording of the program has completed (block 1547), control returns from the example machine executable instructions of FIG. 15.

Returning to block 1545, if a satellite signal interruption occurs, the IRD 106 starts downloading and recording the missing (i.e., interrupted) portion of the program (e.g., the example missing portion 1430 of FIG. 14) from the CDN 110 (block 1550). The IRD 106 continues downloading the program from the CDN 110 until the reception of the satellite signal resumes (block 1555). When reception of the satellite signal resumes (block 1555), the IRD 106 resumes playback and/or recording of the program via the satellite signal (block 1560). Control then returns to block 1545 to check for another interruption. If at block 1555 reception of the satellite signal does not resume, if the IRD 106 checks if recording of the new program has completed (block 1557). If recording is not complete, the IRD 106 continues recording the program from the CDN 110 and control returns to block 1555 to monitor for the satellite signal to resume. If recording of the program is complete (block 1557), control returns from the example machine executable instructions of FIG. 15.

The downloading from the CDN 110 of any missing and/or beginning portion(s) continues in parallel to recording via the satellite signal, if necessary, to complete reception and recording of the selected program. Of course, if the interruption occurs during a recording for later playback, the downloading and recording of the missing portion of the program need not occur simultaneously with the reception of the satellite signal.

III. Conditional Access of Broadband Content

As described above in connection with the example DTH system 100 of FIG. 1, the example IRDs 106 of FIGS. 1 and 4-6 may receive a program (e.g., a TV program, a movie, a music video, an asset file, etc.) via the satellite/relay 104 and/or the CDN 110. In an example described above in connection with the illustrated example of FIG. 7, an IRD 106 utilizes existing encryption and/or authorization implemented by the example DTH system 100 to authorize the decryption and/or playback of programs downloaded via the CDN 110. In particular, the IRD 106 uses CWP(s) to determine if the IRD 106 is authorized to decrypt and/or playback a program.

To facilitate more efficient utilization of the CDN 110 and/or the Internet 111 and/or to reduce costs associated with operating the example pay content delivery system 100 of FIG. 1, a download of a program may be authorized prior to download. In particular, an IRD 106 may first request an authorization to download a program and, if the download is authorized, then download the program. That is the pay content delivery system 110 implements a conditional access scheme whereby authorization to download content is based upon a condition (e.g., information provided by the IRD 106). By authorizing before download, unauthorized downloads and the costs associated with downloads may be reduced. For example, the vendor of the CDN 110 may charge the operator of the HE 102 for each program download regardless of whether or not the IRD 106 is able to successfully decrypt the program (i.e., playback the program). In particular, an IRD 106 which is not authorized to download a program will be unable to download the program, thereby reducing the likelihood and/or motivation for content pirates using, for example, Internet connections from anywhere in the world to exploit the example pay content delivery system 100.

Multiple methods may be implemented to pre-authorize program downloads. An example method is described below in connection with FIGS. 16 and 17A-C. Additional and/or alternative methods are described in Sections IV-VI in connection with FIGS. 18-26C.

Figure 16:
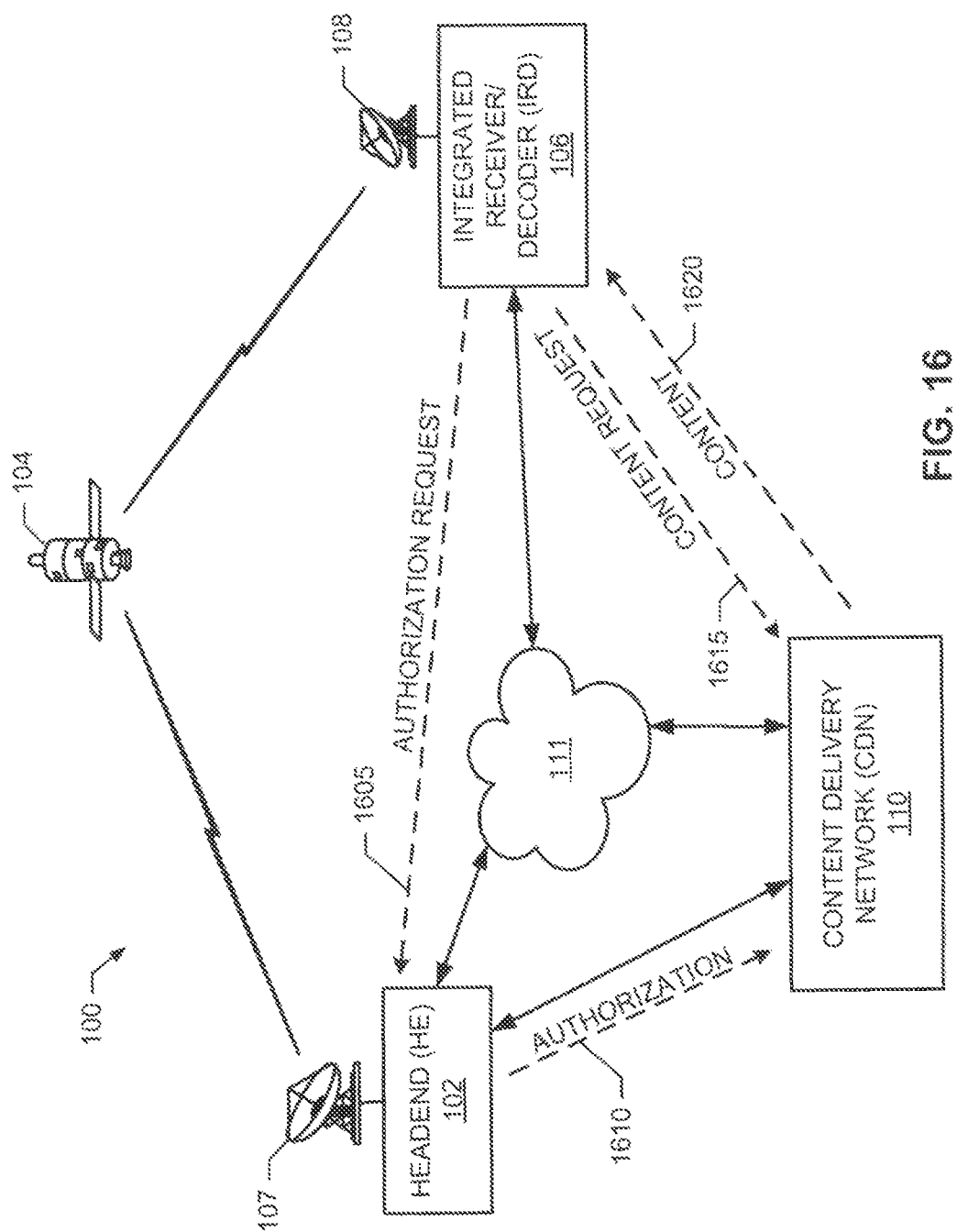
FIG. 16 illustrates an example conditional access exchange for the example pay content delivery system of FIG. 1.

FIG. 16 illustrates an example conditional access exchange that may be implemented to authorize a download of an asset prior to download. In the illustrated example of FIG. 16, a user of an IRD 106 selects a program (e.g., a movie, a TV program, a music video, etc.) for download via the CDN 110. The IRD 106 sends an authorization request 1605 (e.g., via an authorization request message) to the HE 102. The CAS 350 (FIG. 3) determines if the IRD 106 is authorized to download the program and, if the download is authorized, sends authorization information 1610 (e.g., via an authorization message) to the CDN 110. If, in the example of FIG. 16, the HE 102 determines that an IRD 106 is not authorized to download the program, the HE 102 does not send authorization information to the CDN 110 and sends an authorization rejection response to the IRD 106 (not shown). Alternatively or additionally, the HE 102 may send authorization information 1610 to the CDN 110 that indicates that the IRD 106 is not authorized to download the program. In the illustrated example of FIG. 16, the authorization request 1605 may be communicated via existing communication paths within the example pay content delivery system 100 of FIG. 1 such as, for instance, via back-channel communications (e.g., via the Internet 111).

The CDN 110 stores the authorization information 1610 in, for example, the database 1120 (FIG. 11). When the IRD 106 sends a content request 1615 (e.g., via a content request message) to the CDN 110, the request processor 1125 (FIG. 11) determines if the IRD 106 is authorized to download the requested program based on authorization information stored in, for instance, the database 1120. In particular, if the IRD 106 is authorized to download the program, then the request processor 1125 is able to locate the authorization information 1610 for the IRD 106 and the requested program. If the IRD 106 is authorized to download the program, the CDN 110 transmits 1620 the program (i.e., the contents of the asset file for the program) to the IRD 106.

After and/or during download, the IRD 106 may decrypt and/or playback the program as described above in connection with FIG. 7. In particular, the IRD 106 may utilize CWP(s) received in a satellite signal and/or received from the CDN 110 to determine CW(s) that may be used to correctly decrypt those received data packets that are encrypted. Further, as also described above in connection with FIG. 7, the IRD 106 may additionally encrypt the downloaded program prior to storage on the HDD 425 (FIG. 5).

In an example, the authorization request 1605 may contain information that the HE 102 may use to verify the identity of the IRD 106. For example, an identification number for a smart card inserted in the smart card reader 562 (FIG. 5), an identification number of the IRD 106, a periodically or aperiodically changing number received by the IRD 106 in a satellite signal broadcast by the HE 102, etc. Of course, other examples abound.

Additionally or alternatively, the content request 1615 is cryptographically enhanced. For example, any of a variety of cryptographic hashes could be applied to the content request 1615 prior to transmission. For instance, the IP address of the IRD 106 may be used to scramble the content request 1615 to prevent "copy" and/or "replay" type piracy attacks. If the CDN 110 is unable to correctly decipher the content request message 1615 the CDN 110 ignores the content request 1615 and/or returns an error message. The content request 1615 may include a periodically or aperiodically changing number received by the IRD 106 in a satellite signal broadcast by the HE 102 to verify that the IRD 106 is currently part of the example pay content delivery system 100 of FIG. 1. Further, authorization information 1610 received from the HE 102 may expire some period of time (e.g., 24 hours) after the authorization information 1610 is received.

Figure 17C:
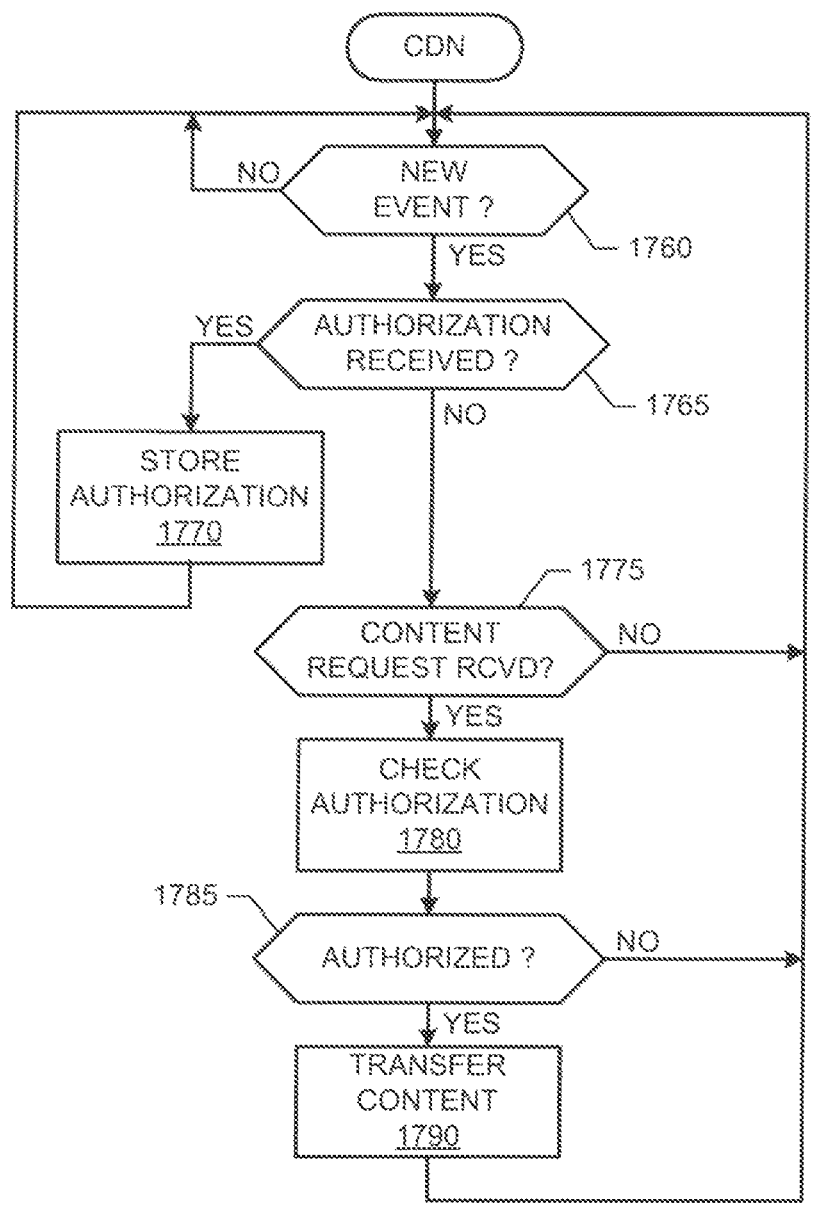

FIGS. 17A-C illustrate flowcharts representative of example processes that may be carried out by the HE 102, the IRDs 106 and the CDN 110, respectively, to implement the example conditional access exchange of FIG. 16 and/or, more generally, the example pay content delivery system 100 of FIG. 1. The example processes of FIGS. 17A-C may be executed by a processor, a controller and/or any other suitable processing device. For example, the example processes of FIGS. 17A-C may be embodied in coded instructions stored on a tangible medium such as a flash memory, or RAM associated with a processor (e.g., the processor 8010 shown in the example processor platform 8000 and discussed below in conjunction with FIG. 35). Alternatively, some or all of the example processes of FIGS. 17A-C may be implemented using an ASIC, a PLD, a FPLD, discrete logic, hardware, firmware, etc. Also, some or all of the example processes of FIGS. 17A-C may be implemented manually or as combinations of any of the foregoing techniques, for example, a combination of firmware and/or software and hardware. Further, although the example processes of FIGS. 17A-C are described with reference to the flowcharts of FIGS. 17A-C, persons of ordinary skill in the art will readily appreciate that many other methods of implementing the example conditional access exchange of FIG. 16 and/or, more generally, the example DTH system 100 may be employed. For example, the order of execution of the blocks may be changed, and/or some of the blocks described may be changed, eliminated, sub-divided, or combined. Persons of ordinary skill in the art will appreciate that the example processes of FIGS. 17A-C may be carried out sequentially and/or carried out in parallel by, for example, separate processing threads.

The example process of FIG. 17A begins with an IRD 106 waiting until a user selects a program for viewing and/or playback (block 1702). When a program selection is received (block 1702), the IRD 106 generates and sends an authorization request (e.g., the authorization request 1605 of FIG. 16) to the HE 102 (block 1705). The authorization request, as discussed above, may contain information that verifies the identity of the IRD 106. The IRD 106 then sends a content request (e.g., the content request 1615 of FIG. 16) to the CDN 110 (block 1710). As also discussed above, the content request may be cryptographically enhanced and/or include information that the CDN 110 may use to verify that the IRD 106 is a member of the example pay content delivery system 100.

If the download is authorized (block 1715), the IRD 106 downloads the program from the CDN 110 (block 1720) and control returns to block 1702 to await another program selection. Authorization may be determined by, for example, the start of reception (i.e., download) of the program from the CDN 110. The CDN 110 may, alternatively, send an authorization response message to the IRD 106 prior to the start of the download or send an authorization rejection message to the IRD 106. The IRD 106 may also use a timeout to determine that the download was not authorized. If authorization is rejected or download doesn't start, the IRD 106 presents, for example, an authorization denied message to the user (block 1725) and control returns to block 1702 to wait for another program selection. Alternatively, the IRD 106 may retry, one or more times, the authorization request (block 1705) and/or content request (block 1710). In particular, one retry of the content request (block 1710) may be beneficial to ensure that the CDN 110 had adequate time to receive and process authorization information provided by the HE 102. Alternatively, the IRD 106 may wait a period of time before sending the content request message (block 1710).

The example process of FIG. 17B begins with the HE 102 waiting to receive an authorization request (e.g., the authorization request 1605 of FIG. 16) (block 1730). If an authorization request is received (block 1730), the CAS 350 (FIG. 3) determines based on, for example, identifying information in the authorization request, if download of the program is authorized (block 1735). If the download is authorized (block 1740), the HE 102 sends authorization information (e.g., the authorization information 1610 of FIG. 16) to the CDN 110 (block 1745) and control returns to block 1730 to await another authorization request. If the download is not authorized (block 1740), an authorization rejection message may be sent (not shown) and control returns to block 1730 to await another authorization request.

The example process of FIG. 17C begins with the CDN 110 waiting until a new event occurs (block 1760). Example new events include receiving authorization information and/or receiving a content request. If a new event occurs (block 1760), the CDN 110 determines if authorization information (e.g., the authorization information 1610 of FIG. 16) is received (block 1765). If authorization information is received (block 1765), the CDN 110 stores the authorization information in, for example, the database 1120 (FIG. 11) (block 1770) and control returns to block 1760 to await another new event.

If a content request is received (e.g., the content request 1615 of FIG. 16) (block 1775), the request processor 1125 (FIG. 11) determines, as described above, if the IRD 106 is authorized to download the program (block 1780). If the IRD 106 is authorized to download the program (block 1785), the CDN 110 transfers the program to the IRD 106 (block 1790) and control returns to block 1760 to wait for another new event. If no authorization is available, an authorization denied message may be sent (not shown).

IV. Signed Conditional Access of Broadband Content

As described above in Sections I and III, to facilitate more efficient utilization of the CDN 110 and/or the Internet 111 and/or to reduce costs associated with operating the example pay content delivery system 100 of FIG. 1, a download of a program may be authorized prior to download. In particular, an IRD 106 may first request an authorization to download a program and, if the download is authorized, the download may proceed. Multiple methods may be implemented to pre-authorize program downloads. An example method is described below in connection with FIGS. 18 and 19A-C. Additional and/or alternative methods are described in Sections III, V-VI in connection with FIGS. 16-17C and 20-26C.

Figure 18:
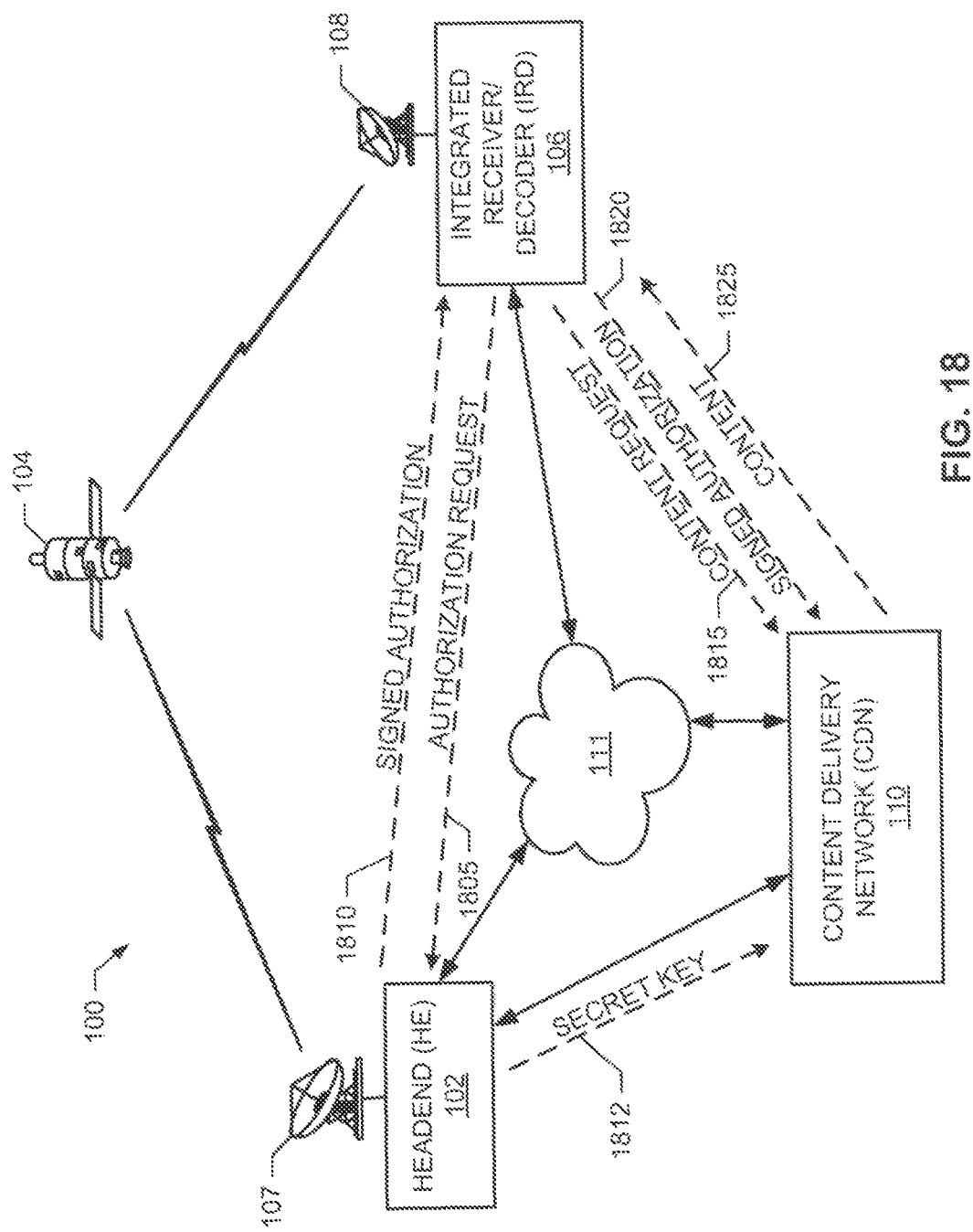
FIG. 18 illustrates an example conditional access exchange for the example pay content delivery system of FIG. 1.

FIG. 18 illustrates an example conditional access exchange that may be implemented to authorize a download of an asset prior to download. In the illustrated example of FIG. 18, a user of an IRD 106 selects a program (e.g., a movie, a TV program, a music video, an asset file, etc.) for download via the selection, the IRD 106 sends an authorization request 1805 (e.g., via an authorization request message) to the HE 102. The CAS 350 (FIG. 3) determines if the IRD 106 is authorized to download the program and, if the download is authorized, signs and sends an authorization 1810 (e.g., via a signed authorization message) to the IRD 106. If, in the example of FIG. 18, the HE 102 determines that an IRD 106 is not authorized to download the program, the HE 102 sends an authorization rejection response (not shown) to the IRD 106. The HE 102 sends to the CDN 110, for example, a secret key 1812 that may be used by the CDN 110 to verify the signed authorization 1810 (e.g., via a key message).

The authorization 1810 may be signed using any of a variety of techniques such as, for example, the authorization 1810 may be signed using a secret key (e.g., the secret key 1812) known to both the CAS 350 (FIG. 3) and the CDN 110, the authorization 1810 may be signed using a private signing key for which the CDN 110 knows a corresponding public checking key, etc. In the illustrated example of FIG. 18, the authorization request 1805 and the signed authorization response 1810 may be communicated via existing communication paths within the example pay content delivery system 100 of FIG. 1. In particular, the authorization request 1805 may be transmitted as discussed above via back-channel communications (e.g., via the Internet 111) and the signed authorization 1810 may be transmitted via the satellite/relay 104 and/or via the Internet 111.

The IRD 106 then sends a content request 1815 (e.g., via a content request message) and a corresponding signed authorization 1820 (e.g., via a signed authorization message) to the CDN 110. In the example of FIG. 18, the signed authorization 1820 sent to the CDN 110 is the signed authorization 1810 received from the HE 102. In response to the content request 1815 and the signed authorization 1820, the request processor 1125 (FIG. 11) determines if the IRD 106 is authorized to download the requested program based on the signed authorization 1820. The CDN 110 may verify the authenticity of the signed authorization 1820 using any of a variety of techniques such as, for example, using the secret key used by the HE 102 to sign the authorization 1810, using a public checking key, etc. In the example of FIG. 18, the HE 102 delivers to the CDN 110, via any of a variety of secure means, secret keys and/or public checking keys for verifying signed authorizations 1820 (e.g., the secret key 1812). If the IRD 106 is authorized to download the program (i.e., the CDN 110 is able to successfully verify the signed authorization 1820), the CDN 110 transmits 1825 the program (i.e., the contents of the asset file for the program) to the IRD 106.

After and/or during download, the IRD 106 may decrypt and/or playback the program as described above in connection with FIG. 7. In particular, the IRD 106 may utilize CWP(s) received in a satellite signal and/or received from the CDN 110 to determine CW(s) that may be used to correctly decrypt those received data packets that are encrypted. Further, as also described above in connection with FIG. 7, the IRD 106 may additionally encrypt the downloaded program prior to storage on the HDD 425 (FIG. 5).

In an example, the authorization request 1805 may contain information that the HE 102 may use to verify the identity of the IRD 106. For example, an identification number for a smart card inserted in the smart card reader 562 (FIG. 5), an identification number of the IRD 106, a periodically or aperiodically changing number received by the IRD 106 in a satellite signal broadcast by the HE 102, etc. Of course, other examples abound.

Additionally or alternatively, the content request 1815 and/or the signed authorization 1820 may be cryptographically enhanced. For example, any of a variety of cryptographic hashes could be applied to the content request 1815 and/or the signed authorization 1820 prior to transmission. For instance, the IP address of the IRD 106 may be used to scramble the content request 1815 to prevent "copy" and/or "replay" type piracy attacks. If the CDN 110 is unable to correctly decipher the content request message 1815 the CDN 110 ignores the content request 1815 or returns an error message. The content request 1815 may include a periodically or aperiodically changing number received by the IRD 106 in a satellite signal broadcast by the HE 102 to verify that the IRD 106 is currently part of the example pay content delivery system 100 of FIG. 1.

Figure 19A:
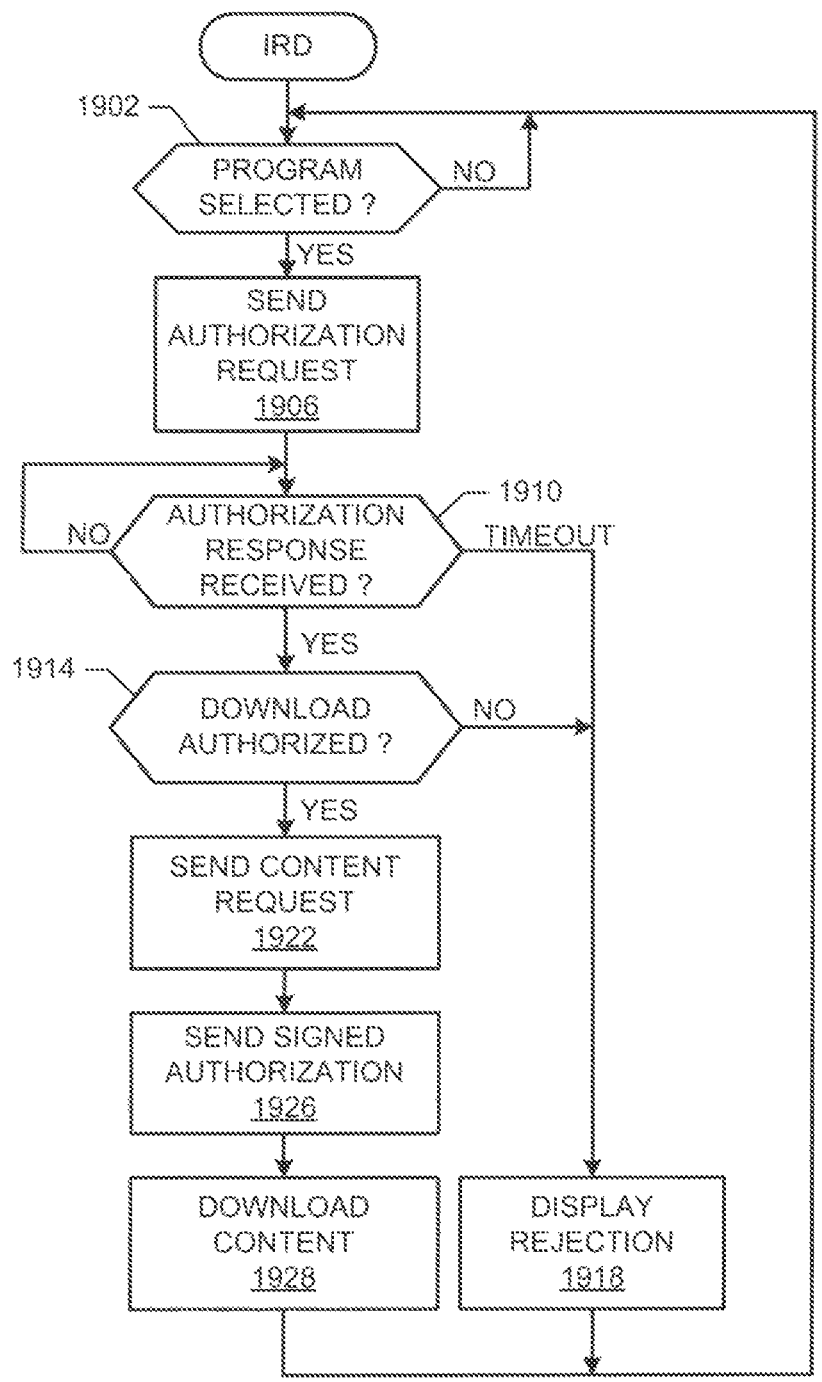
FIGS. 19A-C are flowcharts representative of example processes that may be carried out to implement the example exchange of FIG. 18.
Figure 19C:
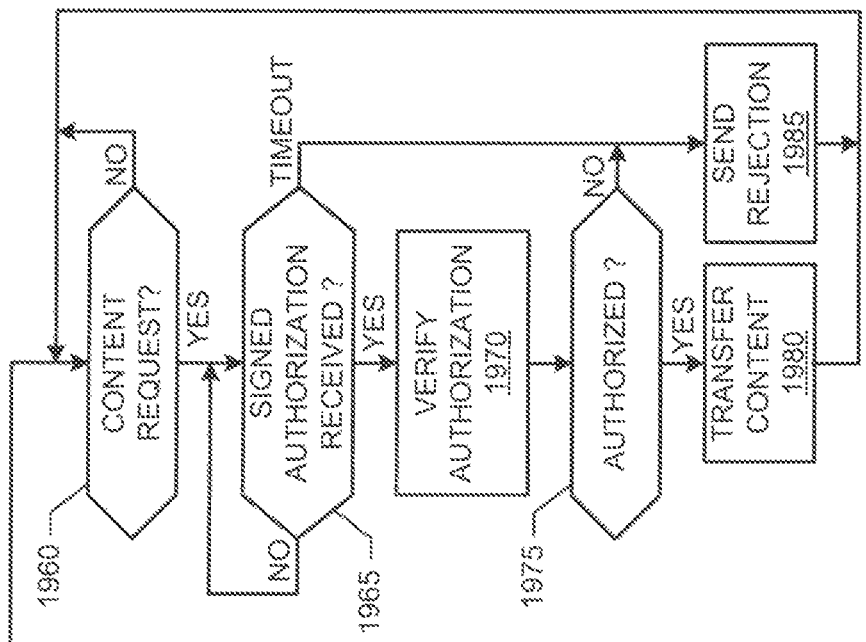
Figure 19B:
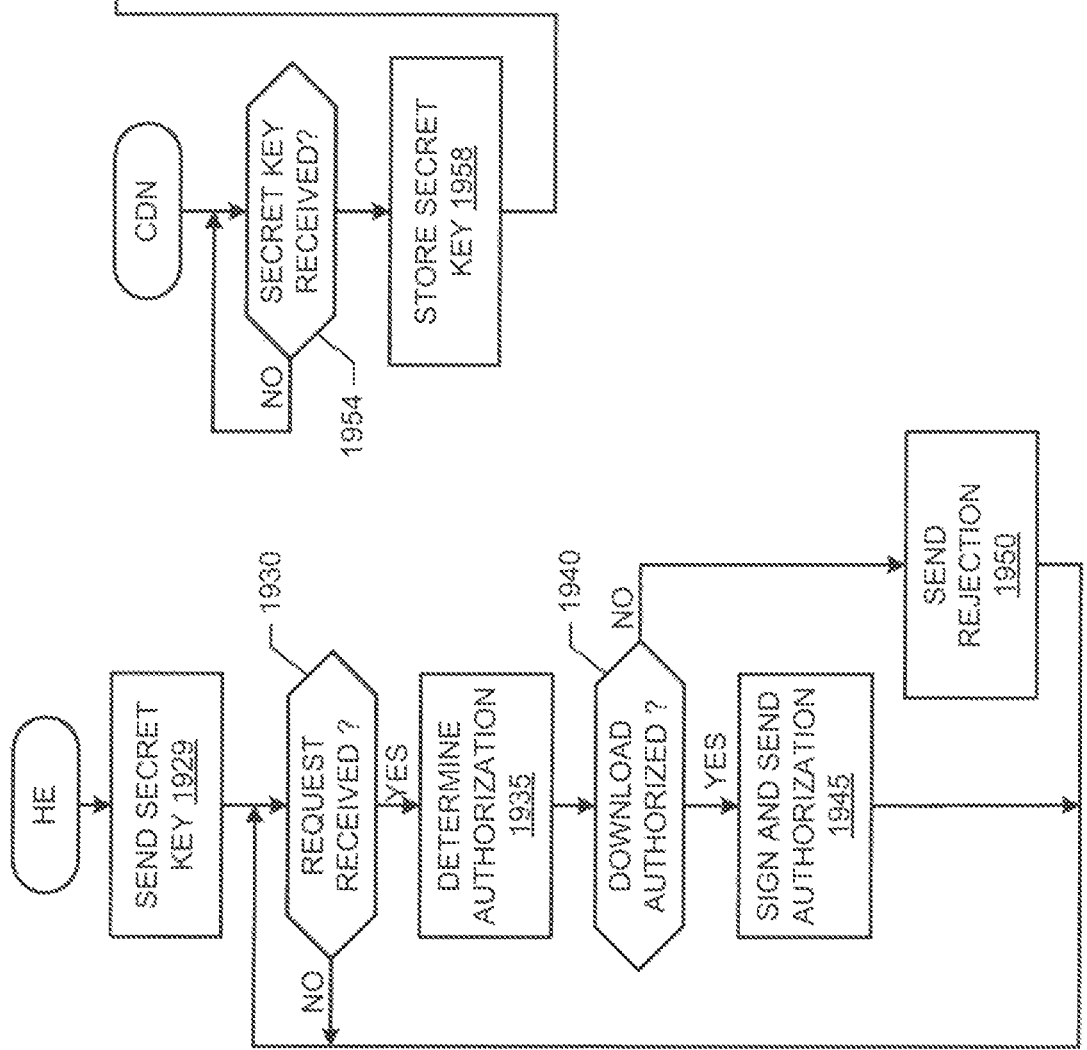

FIGS. 19A-C illustrate flowcharts representative of example processes that may be carried out by the IRDs 106, the HE 102 and the CDN 110, respectively, to implement the example conditional access exchange of FIG. 18 and/or, more generally, the example pay content delivery system 100 of FIG. 1. The example processes of FIGS. 19A-C may be executed by a processor, a controller and/or any other suitable processing device. For example, the example processes of FIGS. 19A-C may be embodied in coded instructions stored on a tangible medium such as a flash memory, or RAM associated with a processor (e.g., the processor 8010 shown in the example processor platform 8000 and discussed below in conjunction with FIG. 35). Alternatively, some or all of the example processes of FIGS. 19A-C may be implemented using an ASIC, a PLD, a FPLD, discrete logic, hardware, firmware, etc. Also, some or all of the example processes of FIGS. 19A-C may be implemented manually or as combinations of any of the foregoing techniques, for example, a combination of firmware and/or software and hardware. Further, although the example processes of FIGS. 19A-C are described with reference to the flowcharts of FIGS. 19A-C, persons of ordinary skill in the art will readily appreciate that many other methods of implementing the example conditional access exchange of FIG. 18 and/or, more generally, the example DTH system 100 may be employed. For example, the order of execution of the blocks may be changed, and/or some of the blocks described may be changed, eliminated, sub-divided, or combined. Persons of ordinary skill in the art will appreciate that the example processes of FIGS. 19A-C may be carried out sequentially and/or carried out in parallel by, for example, separate processing threads.

The example process of FIG. 19A begins with an IRD 106 waiting until a user selects a program for viewing and/or playback (block 1902). When a program selection is received (block 1902), the IRD 106 generates and sends an authorization request (e.g., the authorization request 1805 of FIG. 18) to the HE 102 (block 1906). The authorization request, as discussed above, may contain information that verifies the identity of the IRD 106. The IRD 106 then waits for an authorization response (e.g., the signed authorization response 1810 of FIG. 18) from the HE 102 (block 1910). In an example, upon sending the authorization request (block 1906), the IRD 106 starts a count down timer. When the timer expires at block 1910, the IRD 106 ceases waiting for a response from the HE 102, displays a rejection message (block 1918) and control returns to block 1902 to wait for another program selection.

When an authorization response is received (block 1910), the IRD 106 based upon information in the authorization response determines if the requested download is authorized (block 1914). If the download is not authorized (block 1914), the IRD 106 presents, for example, an authorization denied message to the user (block 1918) and control returns to block 1902 to wait for another program selection.

If the download is authorized (block 1914), the IRD 106 sends a content request (e.g., the content request 1815 of FIG. 18) to the CDN 110 (block 1922) and sends the signed authorization received from the HE 102 at block 1910 (e.g., the signed authorization 1820 of FIG. 18) to the CDN 110 (block 1926). As also discussed above, the content request and/or the signed authorization may be cryptographically enhanced and/or include information that the CDN 110 may use to verify that the IRD 106 is a member of the example pay content delivery system 100. The IRD 106 then downloads the program from the CDN 110 (block 1928) and control returns to block 1902 to await another program selection.

The example process of FIG. 19B begins with the HE 102 sending a secret key (e.g., the secret key 1812 of FIG. 18) to the CDN 110 (block 1929). The HE 102 then waits to receive an authorization request (e.g., the authorization request 1805 of FIG. 18) (block 1930). If an authorization request is received (block 1930), the CAS 350 (FIG. 3) determines based on, for example, identifying information in the authorization request, if download of the program is authorized (block 1935). If the download is authorized (block 1940), the HE 102 signs and sends an authorization (e.g., the signed authorization 1810 of FIG. 18) to the IRD 106 (block 1945) and control returns to block 1930 to await another authorization request. If the download is not authorized (block 1940), the HE 102 sends an authorization rejection (block 1950) to the IRD 106 and control returns to block 1930 to await another authorization request.

The example process of FIG. 19C begins with the CDN 110 waiting to receive a secret key (e.g., the secret key 1812 of FIG. 18) from the HE 102 (block 1954). When a secret key is received (block 1954), the CDN 110 stores the secret key (block 1958) and then waits to receive a content request (block 1960).

When a content request is received (e.g., the content request 1815 of FIG. 18) (block 1960), the request processor 1125 (FIG. 11) waits to receive a signed authorization (e.g., the signed authorization 1820 of FIG. 18) (block 1965). If a timeout occurs while waiting for the signed authorization, the CDN 110 sends a rejection response to the IRD 106 (block 1985) and control returns to block 1960 to wait for another new event. When both a content request and a corresponding signed authorization are received (block 1965) and the CDN 110 has stored the secret key, the request processor 1125 determines, as described above, if the IRD 106 is authorized to download the program (block 1970). In particular, the request processor 1125 verifies the authenticity of the signed authorization. In an example, upon receiving a content request (block 1960), the request processor 1125 starts a count down timer. When the timer expires, the request processor 1125 ceases waiting for a signed authorization from the IRD 106 (block 1965) and control returns to block 1960 to wait for another content request.

If the signature of the authorization response is verified (block 1975), the CDN 110 transfers the program to the IRD 106 (block 1980) and control returns to block 1960 to wait for another new event. If the authorization response is not verifiable (block 1975), the CDN 110 sends a rejection response to the IRD 106 (block 1985) and control returns to block 1960 to wait for another new event.

V. Validated Conditional Access of Broadband Content

As described above in Sections I and III, to facilitate more efficient utilization of the CDN 110 and/or the Internet 111 and/or to reduce costs associated with operating the example pay content delivery system 100 of FIG. 1, a download of a program may be authorized prior to download. In particular, an IRD 106 may first request an authorization to download a program and, if the download is authorized, the download may proceed. Multiple methods may be implemented to pre-authorize program downloads. Example methods are described below in connection with FIGS. 20, 21, 22A-C and 23A-C. Additional and/or alternative methods are described in Sections III, IV, and VI in connection with FIGS. 16-19C, 24A-B, 25 and 26A-C.

Figure 20:
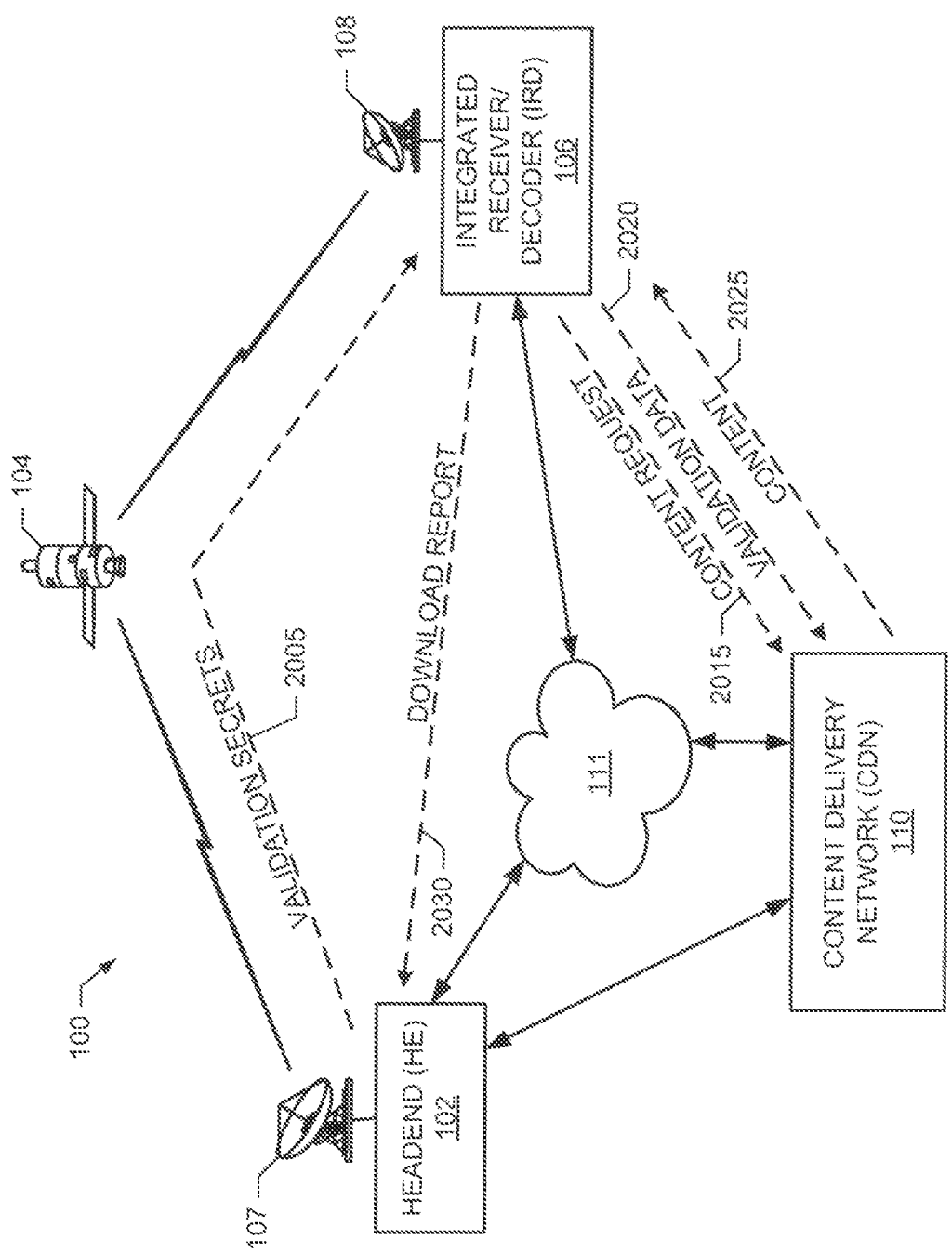
FIGS. 20 and 21 illustrate example conditional access exchanges for the example pay content delivery system of FIG. 1.
Figure 21:
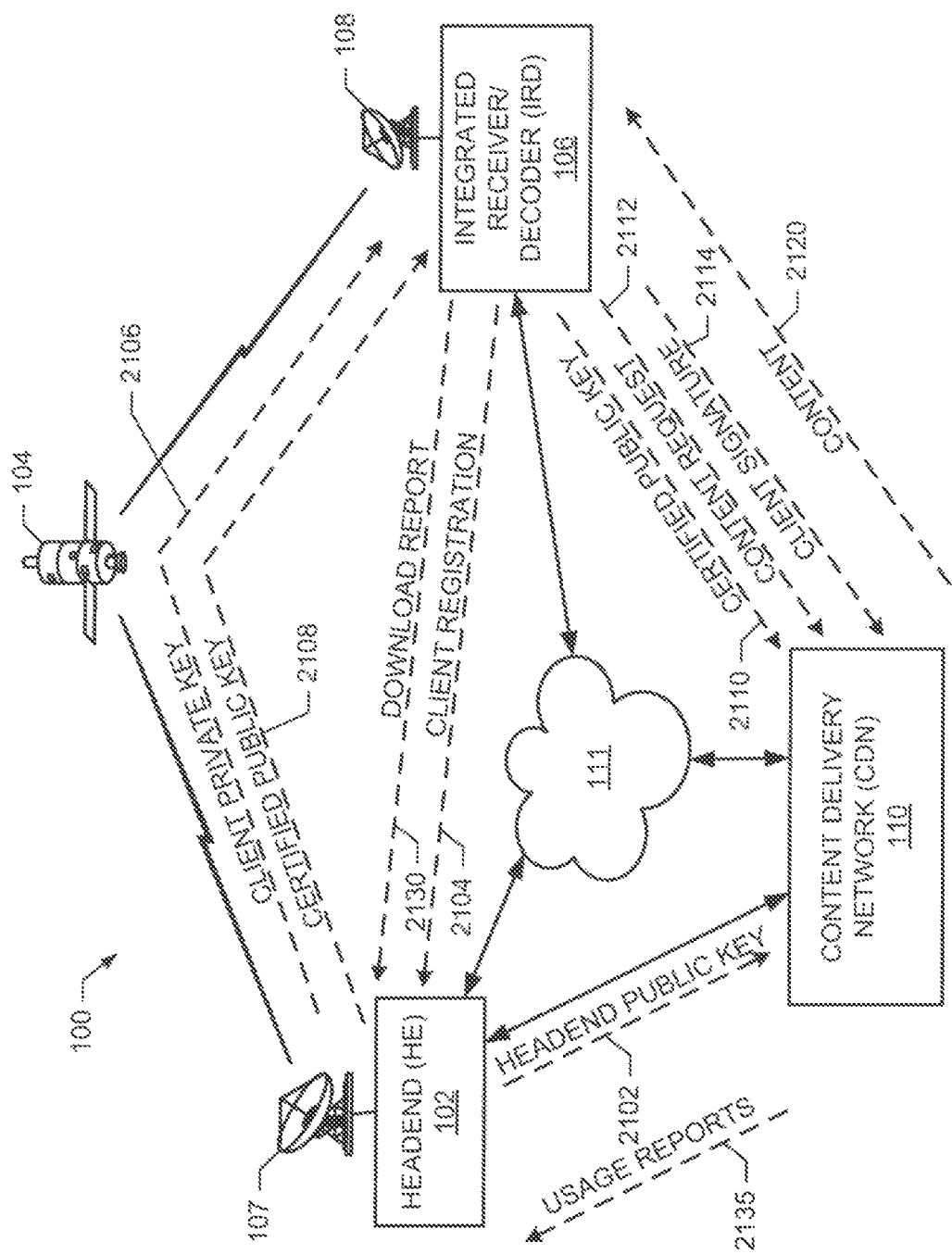

FIGS. 20 and 21 illustrate example conditional access exchanges that may be implemented to authorize a download of an asset prior to download. In the illustrated example of FIG. 20, the HE 102 sends validation secrets 2005 to an IRD 106. The validation secrets 2005 includes any of a variety of information such as, for example, a shared secret, a public key, a private key, etc. that may be used to verify the identity of the IRD 106. In particular, as described below, the IRD 106 will use validation secrets 2005 to verify its identity as part of a content request made to the CDN 110.

When a user of an IRD 106 selects a program (e.g., a movie, a TV program, a music video, an asset file, etc.) for download via the CDN 110, the IRD 106 sends a content request 2015 (e.g., via a content request message) and any of a variety of validation data 2020 (e.g., via a validation data message) to the CDN 110. An example validation data message 2020 includes a cryptographic signature of the IRD 106 or a shared secret. In the example of FIG. 20, the validation data 2020 may be used to determine the authorization for the corresponding content request 2015 (i.e., the validation data 2020 is a form of an authorization message). Using any of a variety of techniques, the request processor 1125 (FIG. 11) authenticates the identity of the IRD 106 based on the validation data 2020. If the identity of the IRD 106 is authentic, the CDN 110 transmits 2025 the program (i.e., the contents of the asset file for the program) to the IRD 106. After downloading the program, the IRD 106 sends a download report 2030 (e.g., via a download report message 2030) to the HE 102. If, in the example of FIG. 20, the HE 102 determines that an IRD 106 is not authorized to download the program, the HE 102 may send an authorization rejection response (not shown) to the IRD 106.

In a presently preferred example, the IRDs 106 utilize a common shared secret to authenticate themselves to the CDN 110. In particular, the HE 102 broadcasts a shared secret 2005 that may be, for example, changed periodically or aperiodically by the HE 102, to all authorized IRDs 106 as well as to the CDN 110 (not shown). Preferably a portion of the content request 2015 (e.g., the URL of the requested asset) is cryptographically hashed with the shared secret, thus, eliminating the need to expressly send the validation data 2020. That is, the content request 2015 and an authorization message containing validation data 2020 are combined since the validation data 2020 is used to cryptographically modify the content request 2015.

In the illustrated example of FIG. 21, the HE 102 sends, using any of a variety of secure methods, a HE public key 2102 to the CDN 110. The HE public key 2102 may be used by the CDN 110, as discussed below, to verify information received from an IRD 106. To enhance security, the HE 102 may periodically change and re-distribute the HE public key 2102.

The IRD 106 registers with the HE 102 by sending a client registration 2104 (e.g., a client registration message). In response to the client registration 2104, the HE 102 determines a private key 2106 and a corresponding public key 2108 for the IRD 106, sends the private key 2106 to the IRD 106 (e.g., via a private key message), and sends a certified version of the public key 2108 to the IRD 106 (e.g., via a public key message). In the example of FIG. 21, the public key 2108 is certified with a HE private key that corresponds to the HE public key 2102. The certified public key 2108 is passed in, for example, a message 2110 by the IRD 106 to the CDN 110 (e.g., via a certified public key message). Using the previously received HE public key 2102, the CDN 110 certifies the authenticity of the public key 2108 received from the IRD 106. Having certified the public key 2108, the CDN 110 may use the public key 2108 to verify future information from the IRD 106 that is signed with the private key 2106. The IRD 106 may periodically repeat the above client registration process to update the public key certificate and/or to extend the expiry of the public key.

When a user of an IRD 106 selects a program (e.g., a movie, a TV program, a music video, etc.) for download via the CDN 110, the IRD 106 sends a content request 2112 (e.g., via content request message) and a client signature 2114 (e.g., via a client signature message) to the CDN 110 together with the previously received certified public key 2108 in, for example, the message 2110. Using the certified public key 2108, the request processor 1125 (FIG. 11)

authenticates the identity of the IRD 106 and/or the authenticity of the content request 2112. If the identity of the IRD 106 and/or the content request 2112 is authentic, the CDN 110 transmits 2120 the program (i.e., the contents of the asset file for the program) to the IRD 106. At some point after downloading the program, the IRD 106 sends a download report 2130 (e.g., via a download report message 2130) to the HE 102. Additionally or alternatively, the CDN 110 may, at some point, transmit a download report to the HE 102 (not shown). Such download reports may be compared with, for example, download usage report(s) 2135 provided periodically or aperiodically to the HE 102 by the CDN 110. If, in the example of FIG. 21, the CDN 110 determines that an IRD 106 is not authorized to download the program, the CDN 110 may send an authorization rejection response (not shown) to the IRD 106.

In the illustrated examples of FIGS. 20 and 21, information between the HE 102 and the IRD 106 may be communicated via existing communication paths within the example pay content delivery system 100 of FIG. 1. For example, the client registration 2104 may be transmitted using any of a variety of secure methods via the Internet 111. The private key 2106 and/or the public key 2108 may also be delivered using any of a variety of secure methods via the Internet 111. Alternatively, the private key 2106 and/or the public key 2108 may be delivered via the satellite/relay 104 using existing broadcast security and IRD 106 addressing techniques.

In the examples of FIGS. 20 and 21, after and/or during download, the IRD 106 may decrypt and playback the program as described above in connection with FIG. 7. In particular, the IRD 106 may utilize CWP(s) received in a satellite signal and/or received from the CDN 110 to determine CW(s) that may be used to correctly decrypt the received encrypted data packets. Further, as also described above in connection with FIG. 7, the IRD 106 may additionally encrypt the downloaded program prior to storage on the HDD 425 (FIG. 5).

FIGS. 22A-C and 23A-C illustrate flowcharts representative of example processes that may be carried out by the HE 102, the IRDs 106 and the CDN 110, respectively, to implement the example conditional access exchanges of FIGS. 20 and 21, respectively, and/or, more generally, the example pay content delivery system 100 of FIG. 1. The example processes of FIGS. 22A-C and 23A-C may be executed by a processor, a controller and/or any other suitable processing device. For example, the example processes of FIGS. 22A-C and 23A-C may be embodied in coded instructions stored on a tangible medium such as a flash memory, or RAM associated with a processor (e.g., the processor 8010 shown in the example processor platform 8000 and discussed below in conjunction with FIG. 35). Alternatively, some or all of the example processes of FIGS. 22A-C and 23A-C may be implemented using an ASIC, a PLD, a FPLD, discrete logic, hardware, firmware, etc. Also, some or all of the example processes of FIGS. 22A-C and 23A-C may be implemented manually or as combinations of any of the foregoing techniques, for example, a combination of firmware and/or software and hardware. Further, although the example processes of FIGS. 22A-C and 23A-C are described with reference to the flowcharts of FIGS. 22A-C and 23A-C, persons of ordinary skill in the art will readily appreciate that many other methods of implementing the example conditional access exchange of FIGS. 20 and 21, respectively, and/or, more generally, the example DTH system 100 may be employed. For example, the order of execution of the blocks may be changed, and/or some of the blocks described may be changed, eliminated, sub-divided, or combined. Persons of ordinary skill in the art will appreciate that the example processes of FIGS. 22A-C and 23A-C may be carried out sequentially and/or carried out in parallel by, for example, separate processing threads.

Figure 22A:
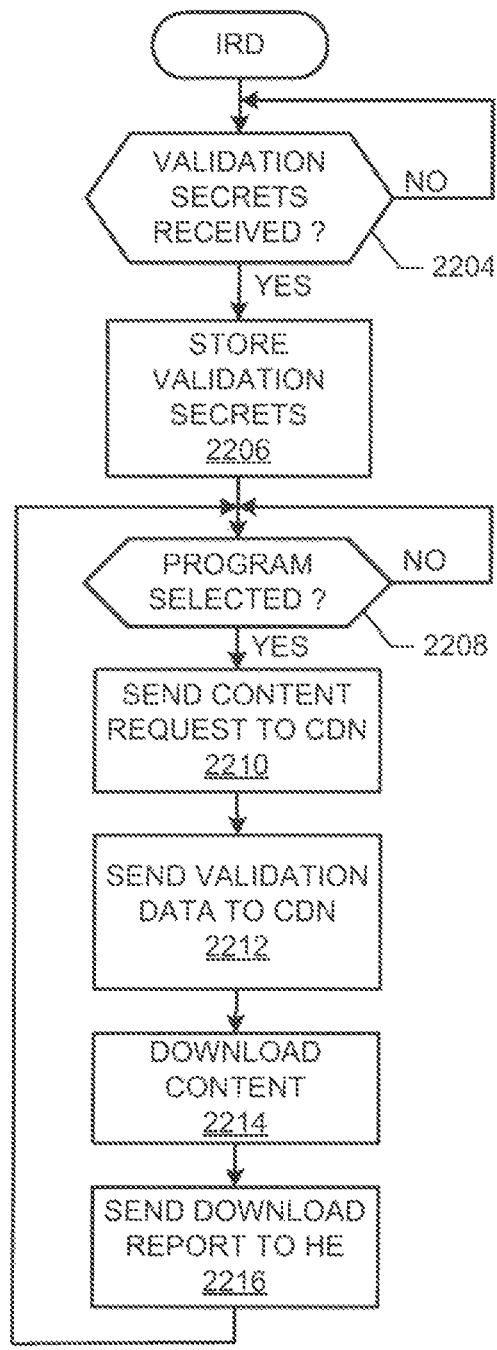
FIGS. 22A-C and 23A-C are flowcharts representative of example processes that may be carried out to implement the example exchange of FIGS. 20 and 21, respectively.

The example process of FIG. 22A begins with an IRD 106 determining if new validation secrets were received (block 2204). If validation secrets were not received (block 2204), the IRD 106 continues to wait. If validation secrets (e.g., the validation secrets 2005 of FIG. 20) are received (block 2204), the IRD 106 stores the validation secrets (e.g., a shared secret) (block 2206).

Once validation secrets have been received (block 2204) and stored (block 2206), the IRD 106 determines if a user selected a program for viewing and/or playback (block 2208). If a program selection was made (block 2208), the IRD 106 generates and sends a content request (e.g., the content request 2015 of FIG. 20) to the CDN 110 (block 2210) and sends the validation data (e.g., the validation data 2020 of FIG. 20) to the CDN 110 (block 2212). The IRD 106 then downloads the program from the CDN 110 (block 2214), sends a download report (e.g., the download report 2030 of FIG. 20) to the HE 102 (block 2216) and control returns to block 2208 to await a new program selection.

Alternatively, as discussed above, the content request sent at block 2210 may contain additionally information useable to authorize the IRD 106 to download the program and, thus, the IRD 106 may skip sending the validation data (block 2212). For example, the IRD 106 may receive a shared secret via the satellite/relay 104 and then use the shared secret to scramble the content request (block 2210).

Figure 22C:
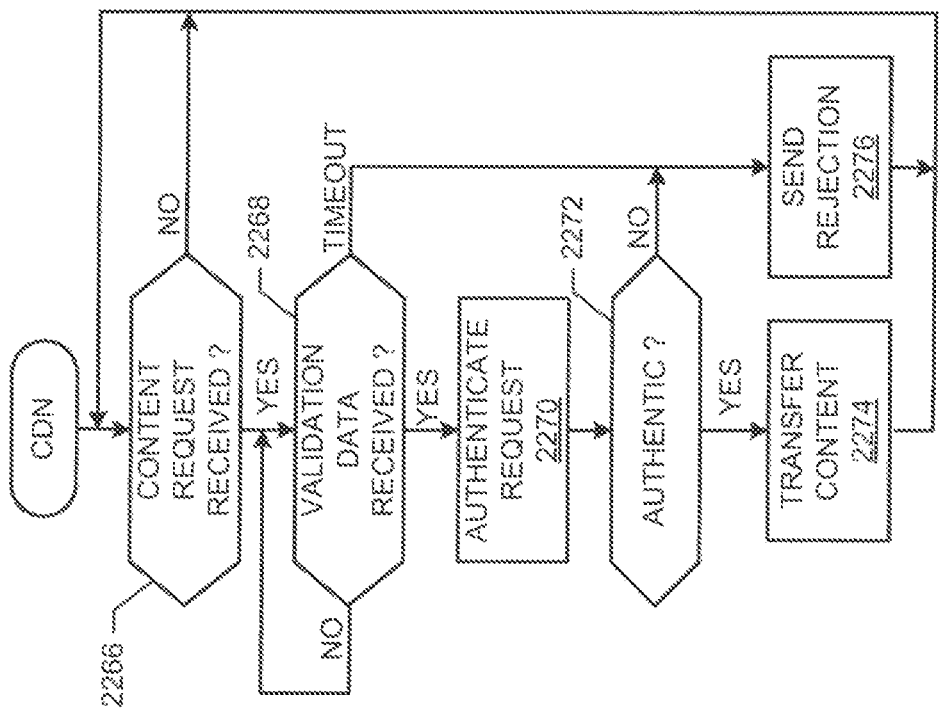
Figure 22B:
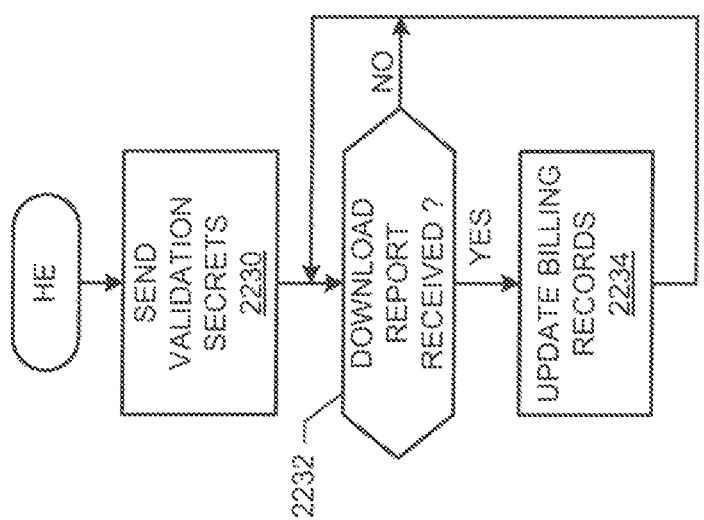

The example process of FIG. 22B begins with the HE 102 sending validation secrets (e.g., a shared secret, the validation secrets 2005 of FIG. 20) to the IRD 106 (block 2230). The HE 102 then waits to receive a download report (e.g., the download report 2030 of FIG. 20) (block 2232). If a download report is received (block 2232), the billing system 355 (FIG. 3) updates the billing record for the IRD 106 (block 2234) and control returns to block 2232 to await another download report.

The example process of FIG. 22C begins with the CDN 110 waiting to receive a content request (block 2266). When a content request (e.g., the content request 2015 of FIG. 20) is received (block 2266), the CDN 110 waits to receive validation data (block 2268). If a timeout occurs while waiting to receive the validation data (block 2268), the CDN 110 notifies the IRD 106 by, for example, sending a download rejection (block 2276) and control returns to block 2266 to await another new content request. When validation data (e.g., the validation data 2020 of FIG. 20) is received (block 2268), the CDN 110 verifies the authenticity of the content request based on the validation data (block 2270). If the content request is authentic (block 2272), the CDN 110 starts transferring the program (block 2274) and control returns to block 2266 to await another content request. If the content request is not authentic (block 2272), the CDN 110 notifies the IRD 106 by, for example, sending a download rejection (block 2276) and control returns to block 2266 to await another new content request.

Alternatively, instead of receiving the validation data (block 2268), the received content request (block 2266) could be de-scrambled using the current shared secret to verify the authorization and/or authenticity of the content request (block 2270).

Figure 23B:
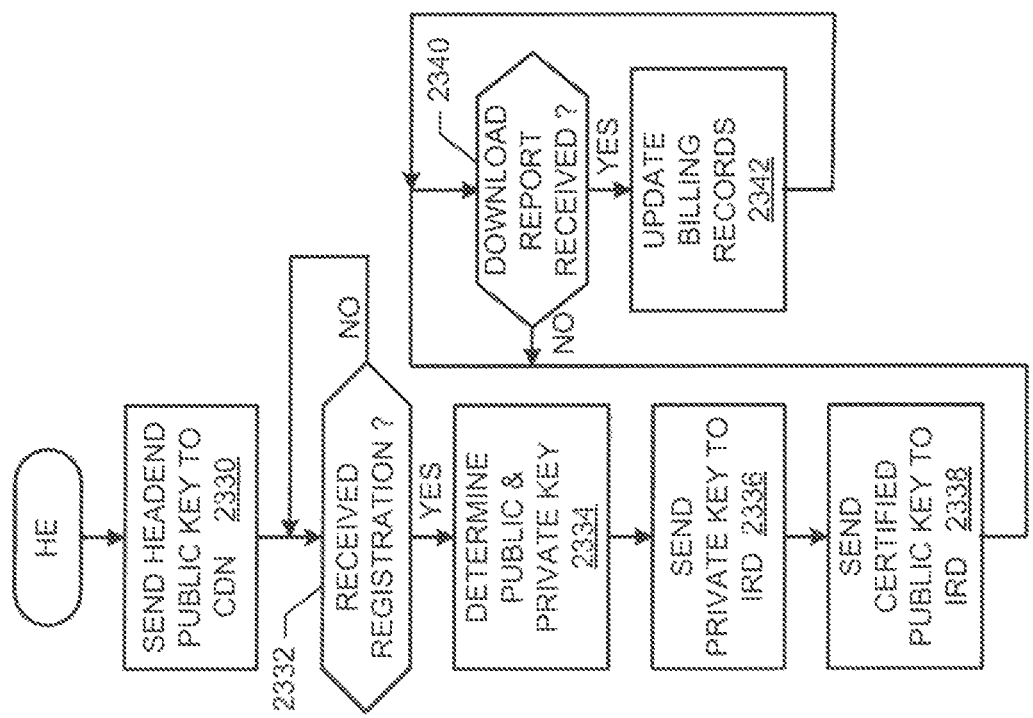
Figure 23A:
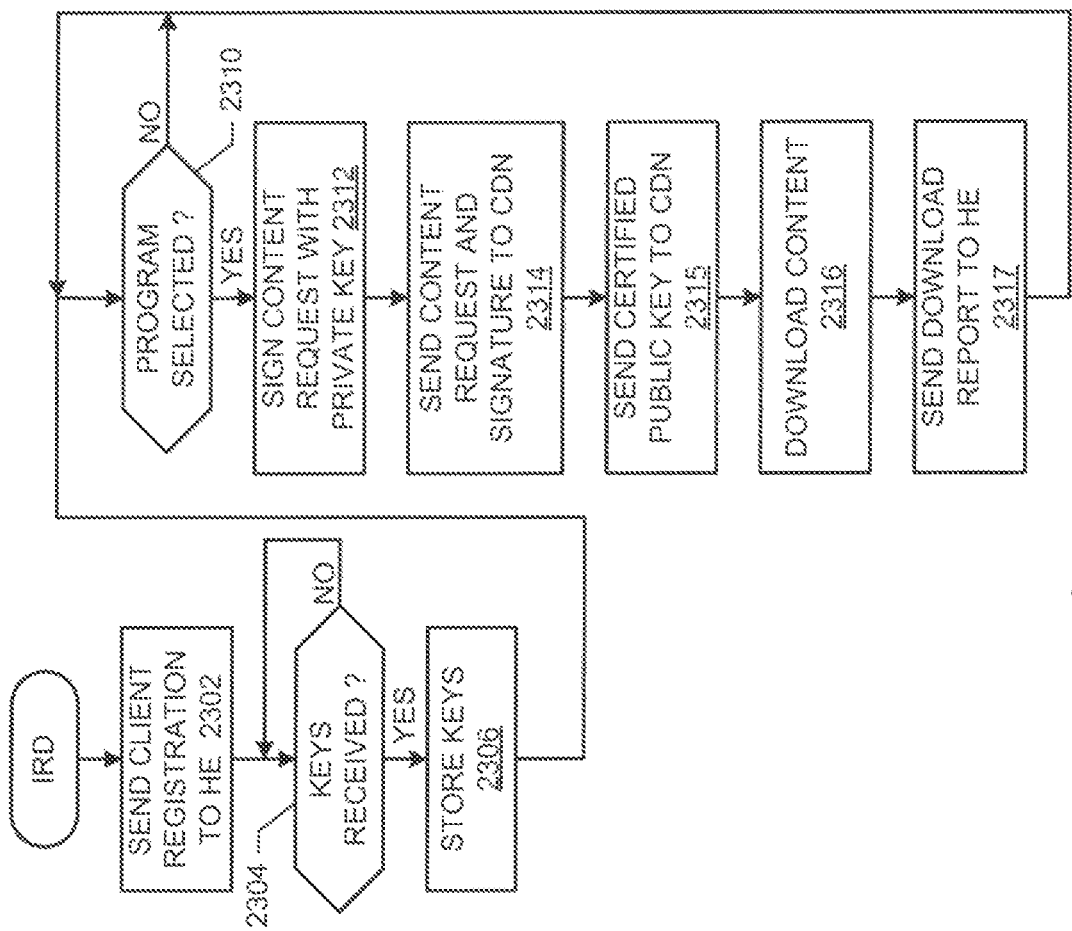

The example process of FIG. 23A begins with an IRD 106 sending a client registration (e.g., the client registration message 2104 of FIG. 21) to the HE 102 (block 2302). The IRD 106 then waits to receive the private key (e.g., the private key 2106 of FIG. 21) and the certified public key (e.g., the public key 2108 of FIG. 21) from the HE 102 (block 2304). When the keys are received (block 2304), the IRD 106 stores the keys (block 2306). The IRD 106 may, of course, use a timeout to abandon waiting to receive the keys (block 2304).

The IRD 106 waits until a user selects a program for viewing and/or playback (block 2310). When a program selection is received (block 2310), the IRD 106 generates a content request. The IRD 106 signs the content request with the private key of the IRD 106 (block 2312), and sends the signed content request (e.g., the content request 2112 of FIG. 21) and client signature (e.g., the client signature 2114 of FIG. 21) to the CDN 110 (block 2314). The IRD 106 also sends the certified public key (e.g., the certified public key 2110 of FIG. 21) to the CDN 110 (block 2315). The IRD 106 then downloads the program from the CDN 110 (block 2316), sends a download report to the HE 102 (block 2317) and control returns to block 2310 to await another program selection.

In an example, upon sending the content request (block 2312) and/or the signature (block 2314), and/or the certified public key (block 2315) the IRD 106 starts a count down timer. When the timer expires, the IRD 106 ceases waiting for the download to start (block 2316) and control returns to block 2310 to wait for another program selection. Alternatively, the IRD 106 may receive a message from the CDN 110 indicating that authorization failed.

The example process of FIG. 23B begins with the HE 102 sending a HE public key (e.g., the HE public key 2102 of FIG. 21) to the CDN 110. The HE 102 then waits to receive a client registration (e.g., the client registration 2104 of FIG. 21) (block 2332). If a client registration is received (block 2332), the CAS 350 (FIG. 3) determines based on, for example, identifying information in the client registration a private key (e.g., the private key 2106 of FIG. 21) (block 2334) and a corresponding public key (e.g., the public key 2108 of FIG. 21) (block 2336). The HE 102 sends the private and the certified pubic key to the IRD 106 (block 2338). Later, when a download report is received (block 2340), the billing system 355 (FIG. 3) updates the billing record for the IRD 106 (block 2342) and control returns to block 2340 to await another download report from the IRD 106. As discussed above, the billing report may be received from the IRD 106 and/or the CDN 110. The example process illustrated in FIG. 23B is repeated for each IRD 106 in the example network of FIG. 1.

Figure 23C:
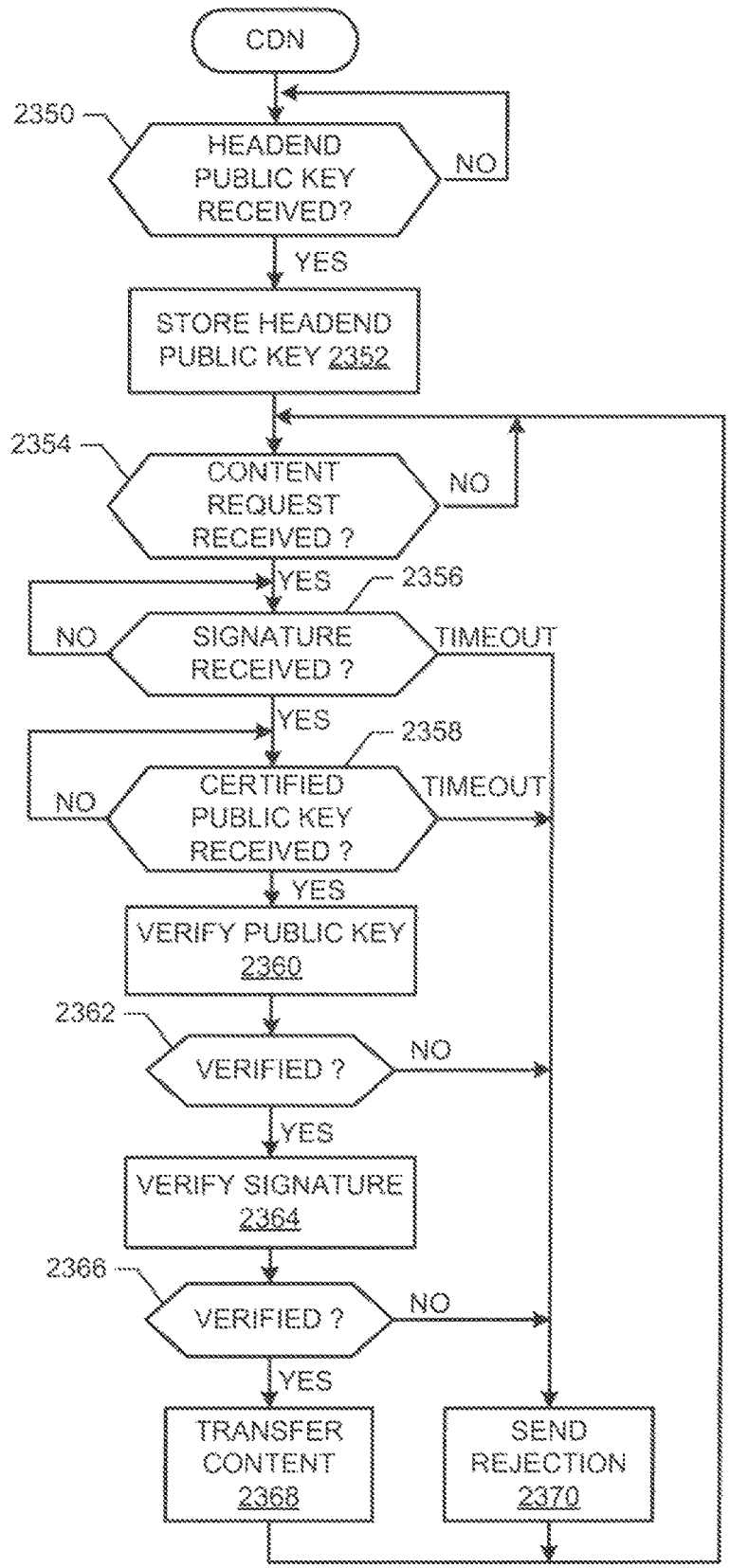

The example process of FIG. 23C begins with the CDN 110 waiting to receive a HE public key (e.g., the HE public key 2102 of FIG. 21) from the HE 102 (block 2350). When the HE public key is received (block 2350), the CDN 110 stores the HE public key (block 2352).

The CDN 110 waits to receive a content request from an IRD 106 (block 2354). If a content request (e.g., the content request 2112 of FIG. 21) is received (block 2354), the CDN 110 waits for a client signature to be received from the IRD 106 (block 2356). If a timeout occurs while waiting for the client signature (block 2356), the CDN 110 notifies the IRD 106 by, for example, sending an authorization failed response (block 2370). If a client signature (e.g., the client signature 2114 of FIG. 21) is received (block 2356), the CDN 110 determines if a certified public key (e.g., the certified public key 2110 of FIG. 21) has been received from the IRD 106 (block 2358). If a timeout occurs while waiting for the certified public key (block 2358), the CDN 110 notifies the IRD 106 by, for example, sending an authorization failed response (block 2370). If a certified public key is received (block 2358), the CDN 110 verifies the public key received from the IRD 106 using the stored headend public key (block 2360). If the public key received from the IRD 106 is not certified (block 2362), the CDN 110 notifies the IRD 106 by, for example, sending an authorization failed response (block 2370).

If a certified public key was received and certification verified (block 2362), the CDN 110 verifies the authenticity of the content request based on the client signature using the certified public key (block 2364). If the content request is authentic (block 2366), the CDN 110 starts transferring the requested content (block 2368) and control returns to block 2354 to await another content request. If the content request is not authentic (block 2366), the CDN 110 notifies the IRD 106 by, for example, sending a download rejection (block 2370) and control returns to block 2354 to wait for another content request.

VI. Additionally Encrypted Broadband Content Delivery

As described above in Sections I and III, to facilitate more efficient utilization of the CDN 110 and/or the Internet 111 and/or to reduce costs associated with operating the example pay content delivery system 100 of FIG. 1, a download of a program may be authorized prior to download. In particular, an IRD 106 may first request an authorization to download a program and, if the download is authorized, the download may proceed. Multiple methods may be implemented to pre-authorize program downloads. An example method is described below in connection with FIGS. 24A-B, 25 and 26A-C. Additional and/or alternative methods are described in Sections III-V in connection with FIGS. 16-23C.

Figure 24A:
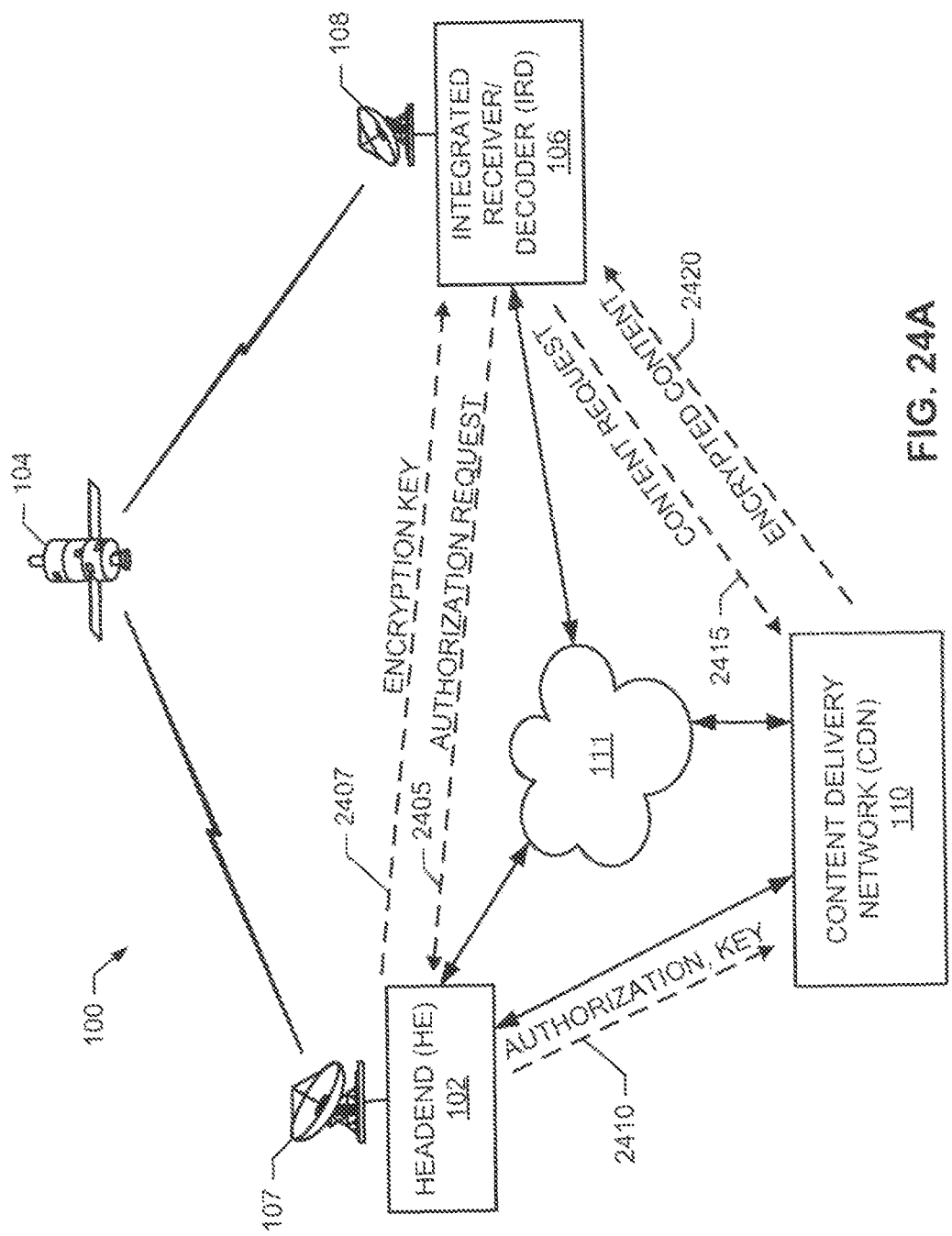
FIGS. 24A and 24B illustrate example conditional access exchanges for the example pay content delivery system of FIG. 1.
Figure 24B:
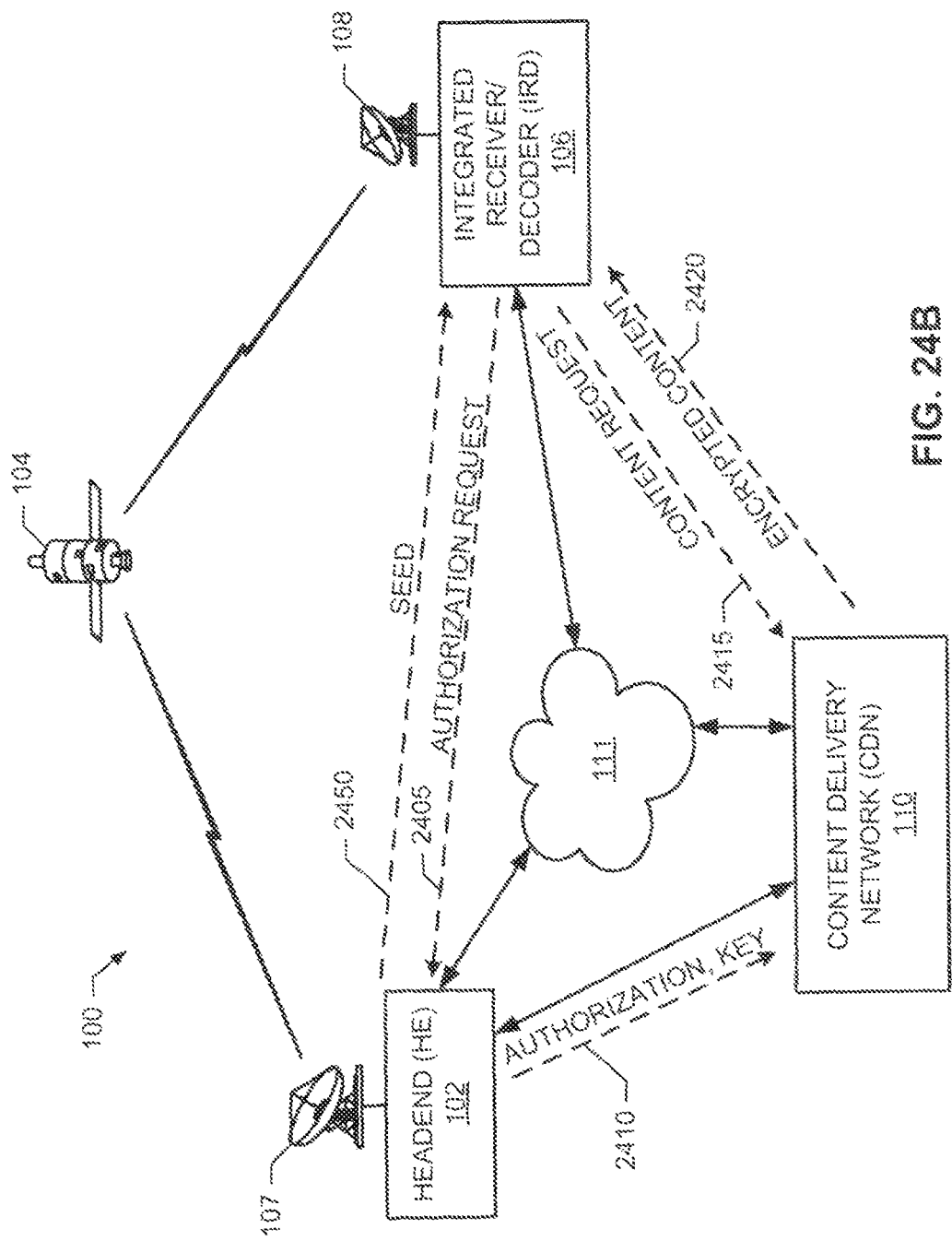

FIGS. 24A and 24B illustrate example conditional access exchanges that may be implemented to authorize a download of an asset prior to download. In the illustrated example of FIG. 24A, a user of an IRD 106 selects a program (e.g., a movie, a TV program, a music video, an asset file, etc.) for download via the CDN 110. The IRD 106 sends an authorization request 2405 (e.g., via an authorization request message 2405) to the HE 102. The CAS 350 (FIG. 3) determines if the IRD 106 is authorized to download the program. If the IRD 106 is authorized, the CAS 350 determines a key for additional encryption that will be applied to the already broadcast encrypted asset file prior to delivery to the IRD 106. The HE 102 then sends the encryption key 2407 (e.g., via a key message) to the IRD 106. The HE 102 then sends authorization information and the encryption key 2410 (e.g., via an authorization message) to the CDN 110. If, in the example of FIG. 24A, the HE 102 determines that an IRD 106 is not authorized to download the program, the HE 102 does not send authorization information to the CDN 110 and sends an authorization rejection response to the IRD 106 (not shown). Alternatively or additionally, the HE 102 may send authorization information 2410 to the CDN 110 that indicates that the IRD 106 is not authorized to download the program.

In the illustrated example of FIG. 24A, the authorization request 2405 and/or the encryption key 2407 is preferably communicated via a secure communication path (i.e., encrypted) within the example pay content delivery system 100 of FIG. 1 such as, for instance, via secure back-channel communications (e.g., via the Internet 111). For instance, as illustrated in FIG. 24A, the encryption key 2407 is encrypted before being sent to the IRD 106. Alternatively, the encryption key 2407 may be sent over a non-secure path relying instead on the nature of the point-to-point communication path established via the Internet 111 between the IRD 106 and the HE 102 for security. In another example, the encryption key 2407 is provided to the IRD 106 by the CDN 110 at the time of download.

The CDN 110 stores the authorization information and the encryption key 2410 in, for example, the database 1120 (FIG. 11). When the IRD 106 sends a content request 2415 (e.g., via a content request message 2415) to the CDN 110, the request processor 1125 (FIG. 11) determines if the IRD 106 is authorized to download the requested program based on authorization information stored in, for instance, the database 1120. In particular, if the IRD 106 is authorized to download the program, then the request processor 1125 is able to locate the authorization information 2410 for the IRD 106 and the requested program. If the IRD 106 is authorized to download the program, the encrypter 1130 (FIG. 11) additionally encrypts the already broadcast encrypted asset file using the encryption key 2410 and the CDN 110 transfers 2420 the additionally encrypted asset (i.e., the additionally encrypted contents of the asset file for the program) to the IRD 106.

Figure 25:
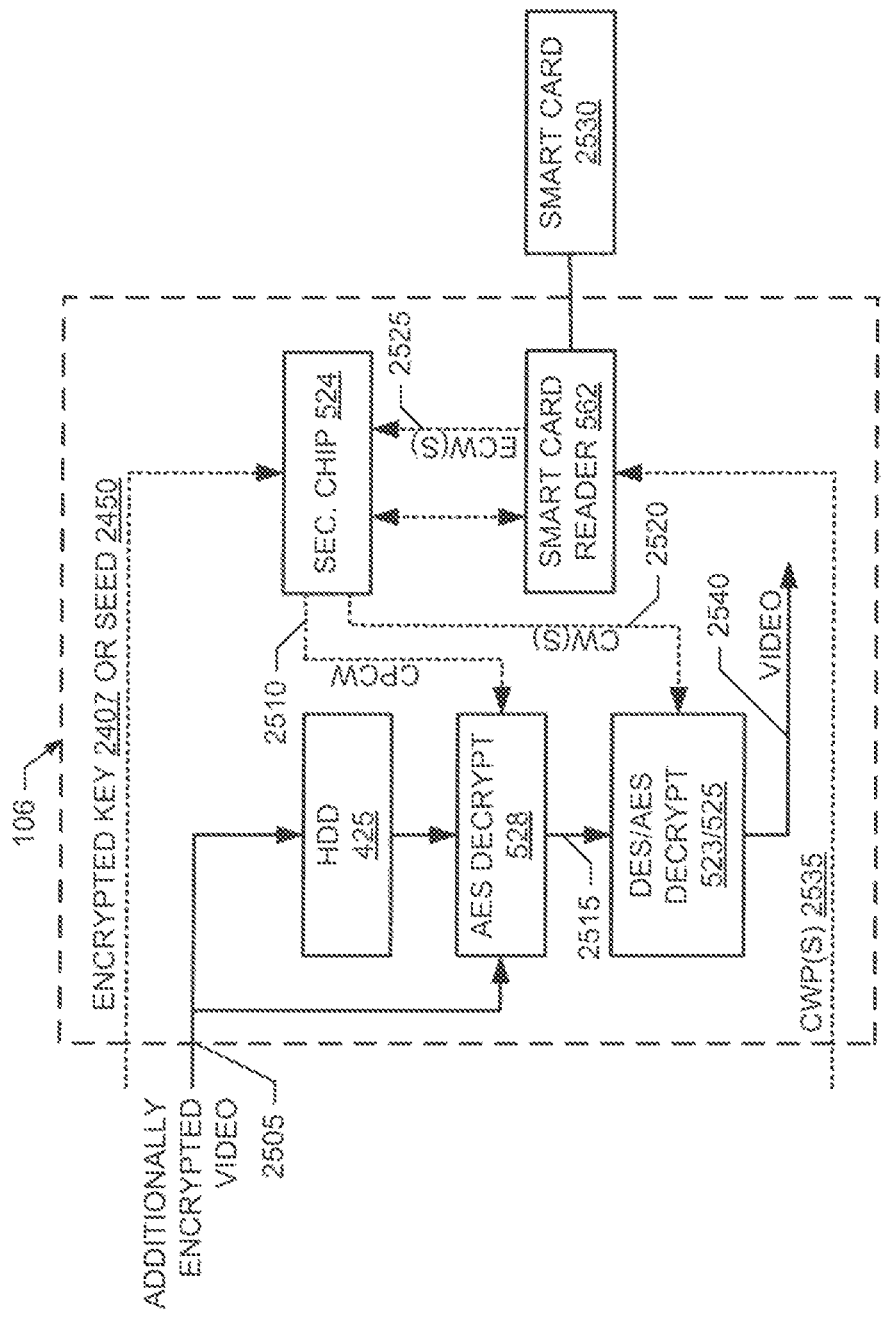
FIG. 25 illustrates an example encryption configuration for the integrated receiver/decoder of FIG. 1.

After and/or during download, the IRD 106 may decrypt and playback the program as described below in connection with FIG. 25. In particular, the IRD 106 may use the encrypted key 2407 and utilize CWP(s) received in a satellite signal and/or received from the CDN 110 to determine CW(s) that correctly decrypt the received doubly encrypted data packets. For instance, as illustrated in FIG. 25, since the received asset file is already additionally encrypted (i.e., super-encrypted) by the CDN 110 with the encryption key 2407, the IRD 106 may directly store the downloaded asset file onto the HDD 425 (FIG. 5). During subsequent decrypting and playback of the downloaded asset file, the IRD 106 utilizes the encryption key 2407 as the CPCW for the asset. Alternatively or additionally, as illustrated in FIG. 25, the IRD 106 may immediately decrypt and playback the downloaded asset file using the encryption key 2407 as the CPCW for the asset.

FIG. 24B illustrates an alternative example conditional access exchange that may be implemented to authorize a download of an asset prior to download. The illustrated example exchange of FIG. 24B proceeds similarly to the example exchange illustrated in FIG. 24A. Thus, the description of identical portions of FIG. 24A will not be repeated here. Instead, the interested reader is referred back to the corresponding description of FIG. 24A. To facilitate this process, like operations have been numbered with like reference numerals in FIGS. 24A and 24B.

In the illustrated example of FIG. 24B, instead of the HE 102 sending the encryption key 2407 to the IRD 106, the HE 102 sends a seed 2450 to the IRD 106. Like the key 2407 of FIG. 24A, the seed 2450 is preferably communicated via a secure communication path or, alternatively, the seed 2450 may be sent over a non-secure path relying instead on the nature of a point-to-point communication path established via the Internet 111. As discussed below in connection with FIG. 25, and in additional detail in FIG. 27, the IRD 106 uses the seed 2450 received from the HE 102 and a family key (FK) to determine a CPCW which may be used to decrypt and playback the super-encrypted asset file 2420 received from the CDN 110. The HE 102, knowing the method and FK used by the IRD 106 to determine the CPCW, also determines the CPCW and sends the CPCW to the CDN 110 with the authorization information 2410. Like the example exchange of FIG. 24A, the CDN 110 uses the key 2410 (i.e., the CPCW) to additionally encrypt the asset file prior to transferring the asset file to the IRD 106. Family keys are discussed in more detail below in connection with FIG. 27.

FIG. 25 illustrates an example encryption configuration for the example IRD 106 of FIG. 1. The example configuration of FIG. 25 may be used to receive, record, decrypt and/or playback additionally encrypted asset files received from a CDN 110 via, for instance, one of the example exchanges of FIG. 24A or FIG. 24B. In the illustrated example of FIG. 25, super-encrypted video data 2505 is received from the CDN 110. Since the content 2505 is already additionally encrypted (i.e., it has already had copy protection encryption applied), the super-encrypted content 2505 may directly stored on the HD 425 without the IRD 106 applying any additional encryption. As discussed in more detail in connection with FIG. 27, during decryption and playback of the content 2505, the security chip 524 either decrypts and uses the encrypted key 2407 (FIG. 24A) or uses the seed 2450 (FIG. 24B) to determine, for the content 2505, a corresponding CPCW 2510. For example, the security chip 524 may decrypt an encrypted encryption key 2407 using a secret that is unique to and embedded within the security chip 524 to determine the CPCW 2510. Alternatively, the security chip 524 scrambles the seed with a FK to obtain the CPCW 2510. In the illustrated examples of FIGS. 24A-B and 25, the CPCW 2510 is the same code word used by the CDN 110 to additionally encrypt the super-encrypted video data 2505. In the illustrated examples of FIGS. 24A-B, the code word is provided to the CDN 110 in the authorization and key message 2410.

In the example of FIG. 25, the CPCW 2510 is provided to and used by the AES decrypter 528 to decrypt the additionally encrypted data 2505 thereby obtaining broadcast encrypted video data 2515. The broadcast encrypted video data 2515 may be further decrypted by the DES/AES decrypter 523/525 using CW(s) 2520. As also discussed in more detail below in connection with FIG. 27, in the illustrated example of FIG. 25, the CW(s) 2520 are determined from encrypted CW(s) (ECW(s)) 2525 provided to the security chip 524 by a smart card 2530. The ECW(s) are encrypted versions of CW(s) received from the HE 102 via one or more CWP(s) 2535. The security chip 524 decrypts the ECW(s) 2525 and provides the CW(s) 2520 to the DES/AES decrypter 523/525. The DES/AES decrypter 523/525, in turn, decrypts the broadcast encrypted video data 2515 to obtain unencrypted video data 2540.

In the examples of FIGS. 24A and 24B, the authorization request 2405 may contain information that the HE 102 may use to verify the identity of the IRD 106. For example, an identification number for the smart card 2530 inserted in the smart card reader 562 (FIG. 5), an identification number of the IRD 106, a periodically or aperiodically changing number received by the IRD 106 in a satellite signal broadcast by the HE 102, etc. Of course, other examples abound.

Additionally or alternatively, the example content request 2415 of FIGS. 24A and 24B may be cryptographically enhanced. For example, any of a variety of cryptographic hashes could be applied to the content request 2415 prior to transmission. For instance, the IP address of the IRD 106 may be used to scramble the content request 2415 to prevent "copy" and/or "replay" type piracy attacks. If the CDN 110 is unable to correctly decipher the content request message 2415 the CDN 110 ignores the content request 2415 and/or returns an error message (not shown). The content request 2415 may include a periodically or aperiodically changing number received by the IRD 106 in a satellite signal broadcast by the HE 102 to verify that the IRD 106 is currently part of the example pay content delivery system 100 of FIG. 1. Further, authorization information 2410 received from the HE 102 may expire some period of time (e.g., 24 hours) after the authorization information 2410 is received.

Figure 26B:
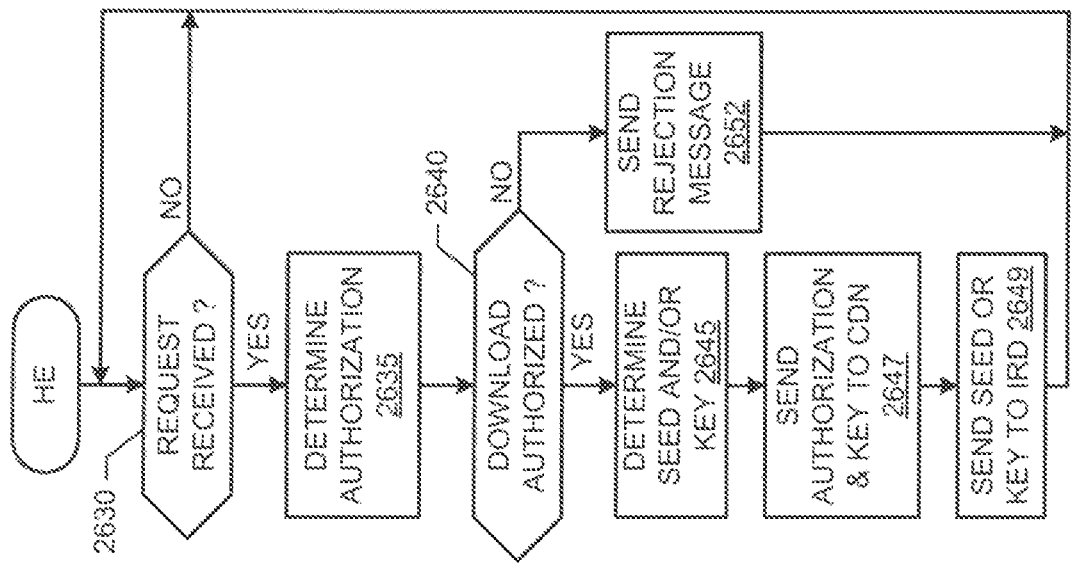
FIGS. 26A-C are flowcharts representative of example processes that may be carried out to implement the example exchange of FIGS. 24A and 24B.
Figure 26A:
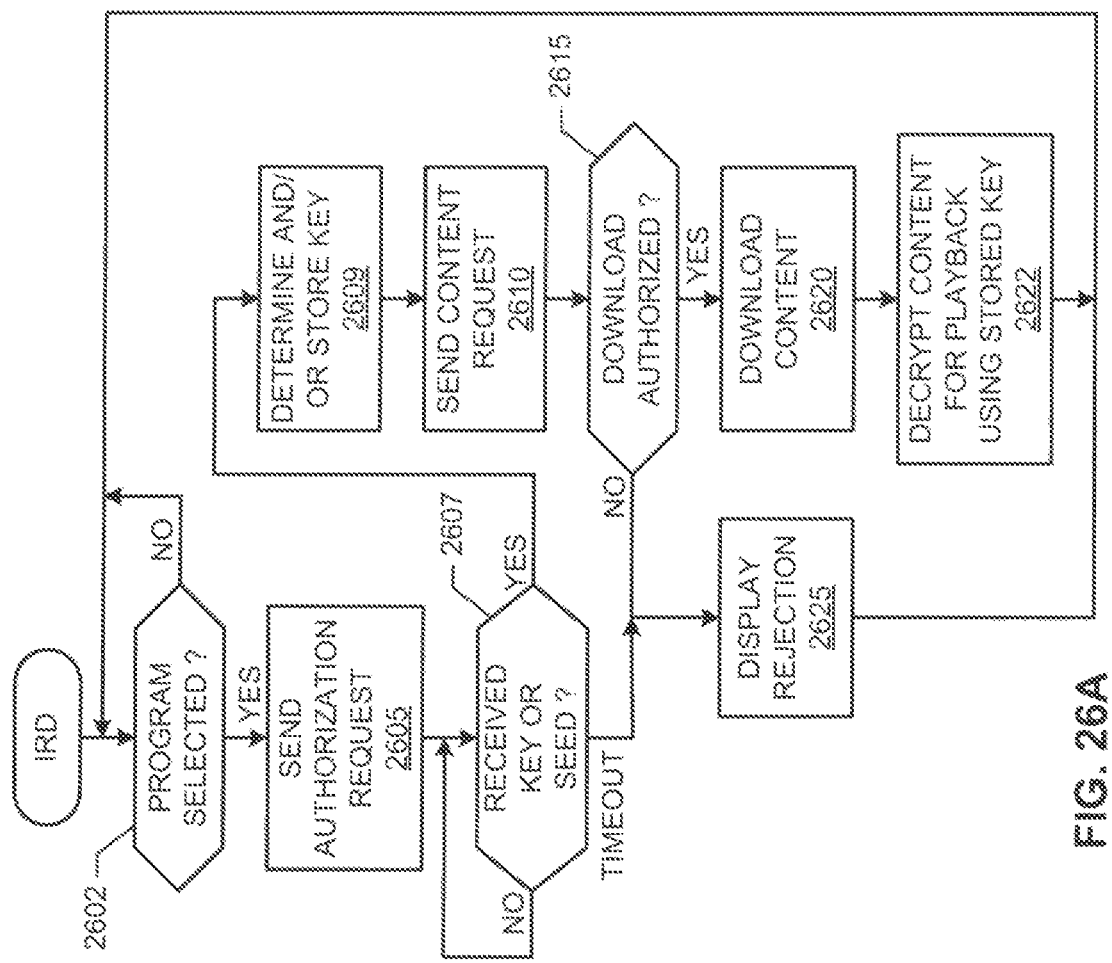
Figure 26C:
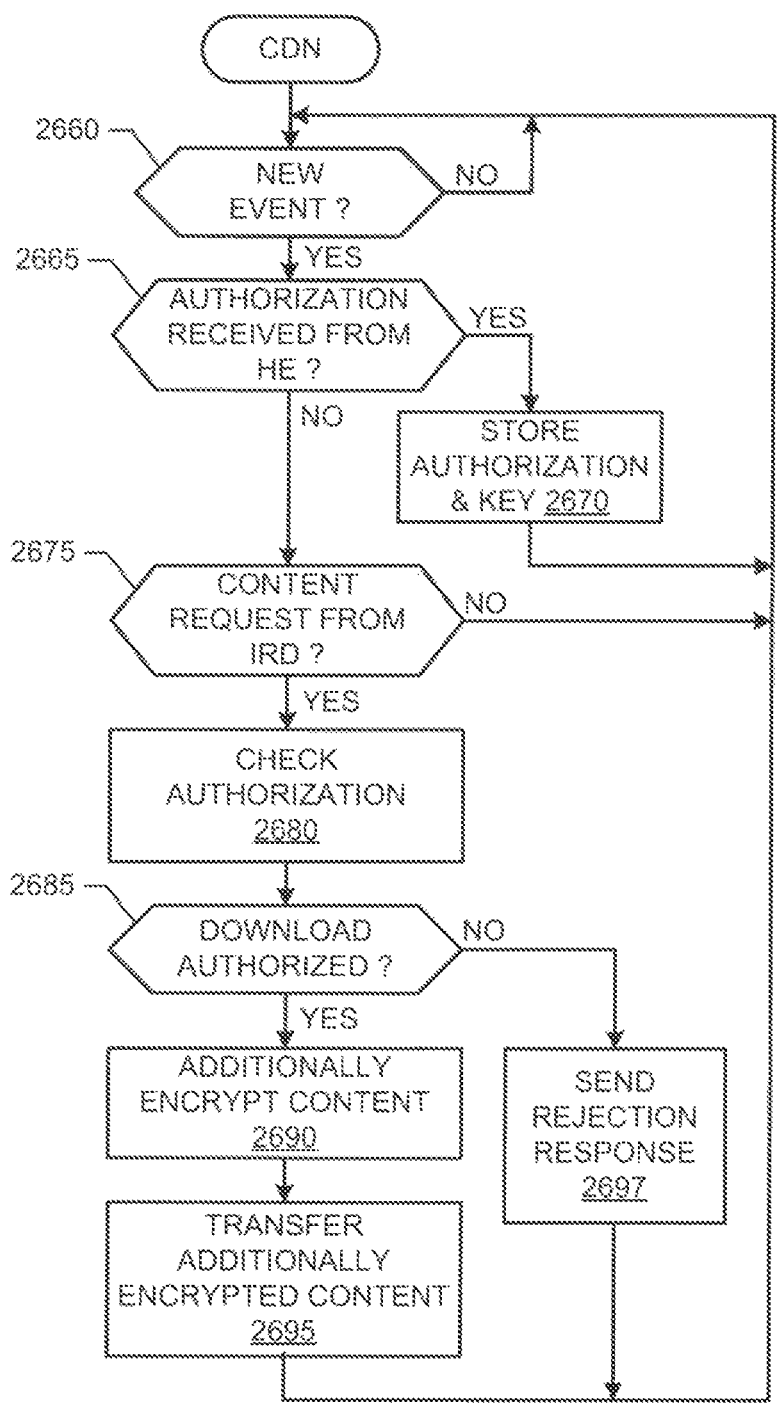

FIGS. 26A-C illustrate flowcharts representative of example processes that may be carried out by the IRDs 106, the HE 102 and the CDN 110, respectively, to implement the example conditional access exchanges of FIGS. 24A and 24B, the example encryption configuration of FIG. 25 and/or, more generally, the example pay content delivery system 100 of FIG. 1. The example processes of FIGS. 26A-C may be executed by a processor, a controller and/or any other suitable processing device. For example, the example processes of FIGS. 26A-C may be embodied in coded instructions stored on a tangible medium such as a flash memory, or RAM associated with a processor (e.g., the processor 8010 shown in the example processor platform 8000 and discussed below in conjunction with FIG. 35). Alternatively, some or all of the example processes of FIGS. 26A-C may be implemented using an ASIC, a PLD, a FPLD, discrete logic, hardware, firmware, etc. Also, some or all of the example processes of FIGS. 26A-C may be implemented manually or as combinations of any of the foregoing techniques, for example, a combination of firmware and/or software and hardware. Further, although the example processes of FIGS. 26A-C are described with reference to the flowcharts of FIGS. 26A-C, persons of ordinary skill in the art will readily appreciate that many other methods of implementing the example conditional access exchanges of FIGS. 24A-B, the example configuration of FIG. 25 and/or, more generally, the example DTH system 100 may be employed. For example, the order of execution of the blocks may be changed, and/or some of the blocks described may be changed, eliminated, sub-divided, or combined. Persons of ordinary skill in the art will appreciate that the example processes of FIGS. 26A-C may be carried out sequentially and/or carried out in parallel by, for example, separate processing threads.

The example process of FIG. 26A begins with an IRD 106 waiting until a user selects a program for viewing and/or playback (block 2602). When a program selection is received (block 2602), the IRD 106 generates and sends an authorization request (e.g., the authorization request 2405 of FIG. 24A or FIG. 24B) to the HE 102 (block 2605). The authorization request, as discussed above, may contain information that verifies the identity of the IRD 106. The IRD 106 waits to receive either an, optionally encrypted, encryption key (e.g., the encryption key 2407 of FIG. 24A) or a seed (e.g., the seed 2450 of FIG. 24B) (block 2607). If a timeout occurs while waiting for the encryption key or seed, a rejection message is displayed (block 2625) and controls returns to block 2602 to wait for another program selection. When the encryption key or the seed is received (block 2607), the IRD 106 either decrypts the received encrypted encryption key or determines the encryption key from the seed, and then stores the encryption key (block 2609). The IRD 106 then sends a content request (e.g., the content request 2415 of FIGS. 24A-B) to the CDN 110 (block 2610). As also discussed above, the content request may be cryptographically enhanced and/or include information that the CDN 110 may use to verify that the IRD 106 is a member of the example pay content delivery system 100.

If the download is authorized (block 2615), the IRD 106 downloads the program from the CDN 110 (block 2620) and decrypts the downloaded program for playback using the received encryption key (block 2622). Control then returns to block 2602 to await another program selection. Authorization may be determined by, for example, the start of reception (i.e., download) of the program from the CDN 110. The CDN 110 may, alternatively, send an authorization response message to the IRD 106 prior to the start of the download. The IRD 106 may also use a timeout to determine that the download was not authorized. If neither an authorization response nor download start occurs, the IRD 106 presents, for example, an authorization denied message to the user (block 2625) and control returns to block 2602 to wait for another program selection. Alternatively, the IRD 106 may retry, one or more times, the authorization request (block 2605) and/or content request (block 2610). In particular, one retry of the content request (block 2610) may be beneficial to ensure that the CDN 110 had adequate time to receive and process authorization information provided by the HE 102. Alternatively, the IRD 106 may wait a period of time before sending the content request message (block 2610).

The example process of FIG. 26B begins with the HE 102 waiting to receive an authorization request (e.g., the authorization request 2405 of FIG. 24A or FIG. 24B) (block 2630). If an authorization request is received (block 2630), the CAS 350 (FIG. 3) determines based on, for example, identifying information in the authorization request, if download of the program is authorized (block 2635). If the download is authorized (block 2640), the HE 102 determines a seed (e.g., the seed 2450 of FIG. 24B) and/or, as described above, an encryption key (e.g., the encryption key 2407 of FIG. 24A) (block 2645) and sends authorization information and the encryption key (e.g., the authorization information and key 2410 of FIG. 24A or FIG. 24B) to the CDN 110 (block 2647). The HE 102 then sends either the seed or the encryption key to the IRD 106 (block 2649) and control returns to block 2630 to await another authorization request. If the download is not authorized (block 2640), the HE 102 sends, for example, an authorization denied message (block 2652) and control returns to block 2630 to await another authorization request.

The example process of FIG. 26C begins with the CDN 110 waiting until a new event occurs (block 2660). Example new events include receiving authorization information and/or receiving a content request. If a new event occurs (block 2660), the CDN 110 determines if authorization information and an encryption key (e.g., the authorization information and key 2410 of FIG. 24A or FIG. 24B) were received from a HE 102 (block 2665). If authorization information and an encryption key were received (block 2665), the CDN 110 stores the authorization information and the encryption key in, for example, the database 1120 (FIG. 11) (block 2670) and control returns to block 2660 to await another new event.

If a content request is received from an IRD 106 (e.g., the content request 2415 of FIG. 24A or FIG. 24B) (block 2675), the request processor 1125 (FIG. 11) determines, as described above, if the IRD 106 is authorized to download the program (block 2680). If the IRD 106 is authorized to download the program (block 2685), the encrypter 1130 (FIG. 11) additionally encrypts the asset file for the requested content based on the encryption key (block 2690), the CDN 110 transfers the additionally encrypted asset file to the IRD 106 (block 2695) and control returns to block 2660 to wait for another new event. If the IRD 106 is not authorized to download the program (block 2685), the CDN 110 sends, for example, an authorization denied message to the IRD 106 (block 2697) and control returns to block 2660 to wait for another new event.

VII. Secure Content Sharing in a Home Network

As described above in connection with the example DTH system 100 of FIG. 1, a media server 106 (e.g., the example IRD 106 of FIGS. 1 and/or 4-6) may receive secure content (i.e., encrypted content) via the satellite/relay 104 and/or the CDN 110, and may securely provide that content to one or more clients 114 (i.e., devices 114) communicatively coupled to the media server 106. In particular, encryption information (e.g., CWP(s)) and/or content is received by the content server 106 and/or delivered to the content server 106 as described above in Sections I-VI in connection with FIGS. 1-26C. In a presently disclosed example, the clients 114 support content delivery and/or protection in a method substantially similar to that implemented by the media server 106.

Figure 27:
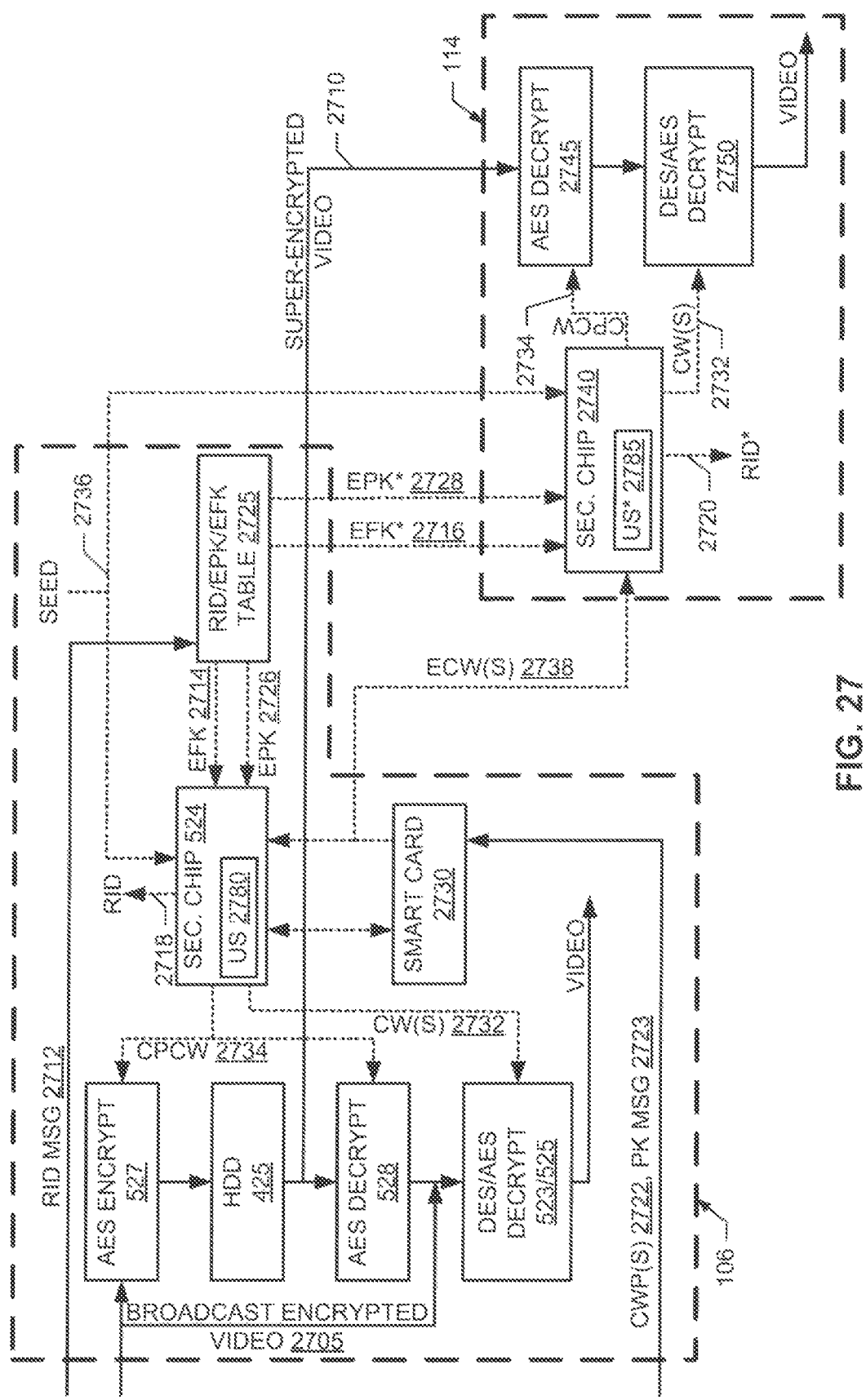
FIG. 27 illustrates an example implementation of protected content delivery between the integrated receiver/decoder and the device of FIG. 1.

FIG. 27 illustrates an example implementation of protected content delivery within a home network of the example pay delivery network 100 of FIG. 1. For instance, protected content is delivered between a media server 106 and a client 114 communicatively coupled, as discussed above in connection with FIGS. 1 and 4-6, to the media server 106. In the example of FIG. 27, the media server 106 and the client 114 belong to a home domain with the media server 106 serving as a gateway between the HE 102 and the client 114. In the illustrated example of FIG. 27, protected content 2705 (i.e., encrypted content 2705) that has been delivered to and/or downloaded by the media server 106 may be securely provided and/or delivered to the client 114. In the illustrated example of FIG. 27, the protected content 2705 is broadcast encrypted at the HE 102 using, for example, DES/AES encryption, such that only authorized subscribers of the broadcast service can decrypt the protected content 2705. In the example of FIG. 27, the received broadcast encrypted content 2705 is additionally protected (i.e., super encrypted) by the AES encrypter 527 such that only an authorized client 114 associated with the media server 106 is able to correctly decrypt the super-encrypted content 2710.

In the example of FIG. 27, the broadcast system HE 102 provides encryption information (i.e., encrypted keys) to the media server 106 and the client 114 that the media server 106 and/or the client 114 each use to determine a first encryption secret (i.e., a CW) used by the HE 102 to broadcast encrypt the protected content 2705. The media server 106 and/or the client 114 use the determined first encryption secret to decrypt the protected content 2705. The HE 102 further provides additional encryption information (i.e., additional encrypted keys) used by the media server 106 to determine a second encryption secret (i.e., a CPCW) used by the media server 106 to super-encrypt the protected content 2705 and used by the media server 106 and/or the client 114 to later decrypt the super-encrypted content 2710. If more than one CW is used by the HE 102 to broadcast encrypt the protected content 2705, the media server 106 and/or the client 114 determine additional encryption secrets from the encrypted keys and use the additional encryption secrets to decrypt the protected content 2705. The HE 102 not only controls, as discussed above, secure delivery of content from the HE 102 to the media server 106 (i.e., an IRD 106) but also controls secure content delivery between the media server 106 and the client 114 (i.e., a device 114). Further, the protected content is delivered and/or stored throughout the path from the HE 102 via the media server 106 to the client 114 in an encrypted form and, thus, provides a continuous chain of digital rights protection.

Alternatively, as discussed above in connection with FIGS. 24A-B and 25, the protected content 2705 received at the media server 106 may be additionally encrypted (i.e., super-encrypted) by a CDN 110. If the protected content 2705 is received super-encrypted at the media server 106, the media server 106 can directly store the super-encrypted content 2705 on the HDD 425 without the AES encrypter 527 applying additional encryption. In this alternative example, the broadcast system HE 102 provides encryption information (i.e., encrypted keys) to the media server 106 and the client 114 that the media server 106 and/or the client 114 each use to determine a first encryption secret (i.e., a CPCW) used by the media server 106 and/or the client 114 to decrypt the super-encrypted content 2705. The broadcast system HE 102 further provides additional encryption information (i.e., additional encrypted keys) to the media server 106 and the client 114 that the media server 106 and/or the client 114 each use to determine one or more additional encryption secrets (i.e., CW(s)) used by the media server 106 and/or the client 114 to decrypt the broadcast encrypted video formed by the decryption of the super-encrypted content 2705 with the determined first encryption secret.

In the illustrated example of FIGS. 1 and 27, each security chip (e.g., the security chip 524) in a media server 106 and/or client 114 is identified by a unique receiver identifier (RID) (e.g., a RID 2718) and contains a unique secret (US) (e.g., a US 2780) embedded during manufacturing. The RID may be used by other devices (e.g., the HE 102) to identify the server 106 and/or the client 114. In response to a registration request containing a RID, the HE 102 sends, for a registered and authorized media server 106 or client 114, one or more conditional access packets (CAPs) that contain encryption information. In the example of FIG. 27, CAPs are sent to the media server 106 and, as discussed below, the media server 106 is responsible for passing along to a client 114 the encryption information for the client 114. In the illustrated examples of FIGS. 1 and 27, the operator of the HE 102 manufactures, sells, and/or otherwise provides the security chips and, thus, knows the valid combinations of RID and US values. Further, the HE 102 maintains and accesses a table of RID and US values.

An example CAP is a RID message (MSG) 2712 associating a RID with a Family Key (FK) and a Pairing Key (PK). In the examples of FIGS. 1 and 27, the FK and PK sent in a RID MSG 2712 are encrypted using the US associated with the RID of the receiving media server 106 or client 114, for example, the RID 2718 or a RID* 2720, respectively. That is, HE 102 provides encrypted versions of the FK and the PK unique to each of the media server 106 and the client 114. In the example of FIG. 27, the media server 106 and the associated clients 114 share a FK and PK, but each RID MSG 2712 contains a uniquely encrypted version of the FK and PK. For example, an encrypted FK (EFK) 2714 (i.e., a first encrypted version of the FK) encrypted for the media server 106 will be encrypted using the unique secret (US) 2780, contained within the security chip 524 and associated with the RID 2718, for the media server 106 and will not be decryptable by another media server 106 or any client 114. Likewise, an encrypted FK (EFK*) 2716 (i.e., a second encrypted version of the FK) encrypted for the client 114 will be encrypted using the US 2785 of the client 114. In the example of FIGS. 1 and 27, the media server 106 is aware of the RID(s) (e.g., the RID* 2720) for each of its associated clients 114.

Another example CAP is a PEK MSG that contains, for the smart card 2730, a personal entitlement key (PEK) that the smart card 2730 may use to encrypt received CWP(s) 2722 prior to storing the received CWP(s) 2722 on the HDD 425. Likewise, the smart card 2730 may use the PEK to decrypt previously encrypted and stored received CWP(s) 2722.

Another example CAP for the smart card 2730 is a PK MSG 2723 containing the PK. In the illustrated example of FIGS. 1 and 27, the smart card 2730 extracts CW(s) from the received CWP(s) 2722. The smart card 2730 then uses the PK received in the PK MSG 2723 to encrypt the thus received CW(s) forming encrypted CW(s) (ECW(s)) that are sent to the security chip 524. In turn, the security chip 524 may use the US 2780 to decrypt the EPK 2726, and the decrypted EPK 2726 to obtain the CW(s) 2732 from the ECW(s) 2738.

In the illustrated example of FIG. 27, the HE 102 provides at least a RID MSG 2712 for a media server 106 or a client 114 when the media server 106 or the client 114 is registered. The HE 102 determines if the media server 106 or the client 114 is authorized to receive protected content and, if authorized, sends a RID MSG 2712 for the media server 106 or the client 114 to the media server 106. It will be readily apparent to persons of ordinary skill in the art that the example CAPs discussed above may be split or combined. Further, CAPs may be used to convey contain different and/or additional encryption information to that discussed above.

To store encryption information received in a RID MSG 2712, the example media server 106 of FIG. 27 includes a table 2725. The table 2725 may be stored in any computer readable device, for example, the HDD 425, the SRAM 506 (FIG. 5), etc. An example table 2725 contains, for the media server 106 and each registered client 114 (i.e., for each RID), an EFK and an encrypted PK (EPK) (e.g., EPK 2726 or EPK* 2728). When, for instance, the EFK* 2716 and the EPK* 2728 are required by the client 114, the media server 106 (e.g., the CPU 507 (FIG. 5) may look up, based upon the RID* 2720 of the client 114, the EFK* 2716 and the EPK* 2728 for the client 114, and send the EFK* 2716 and the EPK* 2728 to the client 114. In the examples of FIGS. 1 and 27, the HE 102 may change the values of PK and/or FK from time to time. To properly decrypt and playback recorded content, the IRD 106 requires the same PK and FK values that were used for recording. Thus, the example RID table 2725 of FIG. 27 contains new and old values of EPK 2726, EFK 2714, EPK* 2728 and EFK* 2716, allowing the media server 106 to look up the appropriate values, based upon the time when a program was recorded.

As described above, each CWP 2722 contains information that may be used by the smart card 2730 to determine a CW 2732 used by the HE 102 to broadcast encrypt a portion of the encrypted video 2705. Received CWP(s) 2722 may be stored and/or utilized by the example IRD 106 of FIGS. 1 and 27 using any of a variety of methods. In an example, received CWP(s) 2722 are encrypted by the smart card 2730 with a PEK received in a PEK MSG and then stored on the HDD 425. During playback, the encrypted CWP(s) 2722 can be obtained from the HDD 425 and then decrypted by the smart card 2730 to obtain the CWP(s) 2722, and then further processed by the smart card 2730 to determine the CW(s) 2732. The CW(s) 2732 may then be encrypted with a PK and the ECW(s) 2738 are provided to the security chip 524. The security chip 524 decrypts the ECW(s) 2738 to obtain the CW(s) 2732.

In another example, the CWP(s) 2722 may be encrypted by the IRD 106 using other encryption keys such as, for example, a CPCW 2734. Alternatively, the IRD 106 stores received CWP(s) 2722 on the HDD 425 without first encrypting them. In a further example, the smart card 2730 determines the CW(s) 2732 from the CWP(s) 2732 at recording time, uses a PK received in a PK MSG 2723 to encrypt the CW(s) 2732, and then the IRD 106 stores the resulting ECW(s) 2738 on the HDD 425. During playback, the security chip 524 (or the smart card 2730) obtains the ECW(s) 2738 from the HDD 425 and the security chip 524 decrypts them with the PK to obtain the CW(s) 2732.

In yet another example, the smart card 2730 obtains CW(s) 2732 from received CWP(s) 2722 at recording time, and then encrypts them with a PK to form ECW(s) 2738. The resultant ECW(s) 2738 and the CWP(s) 2722 are then encrypted with a PEK and stored on the HDD 425. During playback, the smart card 2730 obtains the encrypted ECW(s) 2738 from the HDD 425, decrypts them using the PEK, and provides the ECW(s) 2738 to the security chip 524. The security chip 524 then decrypts them using the PK to obtain the CW(s) 2732. Other examples abound.

In the examples of FIGS. 1 and 27, when the media server 106 plays back received and/or stored video data 2705, the security chip 524 and/or the smart card 2730 using, for instance, one of the example methods described above, obtains the CW(s) 2732 for the program being played back. The security chip 524 then provides the CW(s) 2732 to the DES/AES decrypter 523/525. The DES/AES decrypter 523/525 subsequently uses the CW(s) 2732 to decrypt the broadcast encrypted video.

To determine the CPCW 2734 that may be used to additionally encrypt (i.e., super-encrypt) the broadcast encrypted video 2705 and/or to decrypt super-encrypted video 2710, a security device (e.g., the security chip 524) obtains the EFK 2714 from the table 2725, decrypts the EFK 2714 based on the US 2780, and then scrambles (i.e., encrypts, decrypts or cryptographically hashes) a seed number 2736 with the decrypted EFK 2714 to form the CPCW 2734. An example seed number 2736 is the content identifier for the broadcast encrypted video 2705. Other example seed numbers 2736 include a random number, an encrypted key or encrypted CPCW delivered from the HE 102.

When, for instance, the client 114 requests content (e.g., the content 2705) from the media server 106 (e.g., via a content request message), the media server 106 obtains the ECW(s) 2738 for the requested content 2705 from the smart card 2730. The media server 106 provides to the client 114 the ECW(s) 2738, the EFK* 2716, the EPK* 2728, the seed number 2736 for the requested content, and the super-encrypted content 2710. In the example of FIG. 27, the file on the HDD 425 for the super-encrypted content 2710 is simply transferred to the client 114 via, for instance, the interface module 550 (FIG. 5) using any of a variety of file transfer techniques. For example, the file may be transferred to a client 114 using FTP via the network interface 435 (FIG. 5) and the home network 116 (FIG. 1). In particular, in the examples of FIGS. 1 and 27, no encryption and/or decryption are applied to the file prior to and/or during sending the file to the client 114.

Similarly to that described above for the media server 106, the client 114 determines the CPCW 2734 and CW(s) 2732 that may be used to decrypt the super-encrypted content 2710. In particular, a security device (e.g., a security chip 2740) uses the US* 2785 to decrypt both the received EFK* 2716 and the received EPK* 2728. The security chip 2740 then scrambles the received seed number 2736 with the decrypted EFK* 2716 to determine CPCW 2734 that may be used by an AES decrypter 2745 to decrypt the super-encrypted video 2710. The security chip 2740 also decrypts the received ECW(s) 2738 using decrypted EPK* 2728 to obtain the CW(s) 2732 that may be used by a DES/AES decrypter 2750 to further decrypt the output of the decrypter 2745 (i.e., broadcast encrypted video).

An example implementation of a client 114 may utilize substantially similar components, devices and/or modules to those used to implement the example IRDs 106 illustrated in FIGS. 4-6. For instance, the security chip 2740, the AES decrypter 2745 and the DES/AES decrypter 2750 may be identical to the security chip 524, AES decrypter 528, and the DES/AES decrypter 523/525 of the example IRDs 106, respectively. Further, an example client 114 may not contain all the elements of the example media servers 106 of FIGS. 4-6. For instance, an example client 114 is implemented without the front end modules 510, the splitter 570, the tuners 575, the AES encrypter 527 and the smart card reader 562.

Figure 28A:
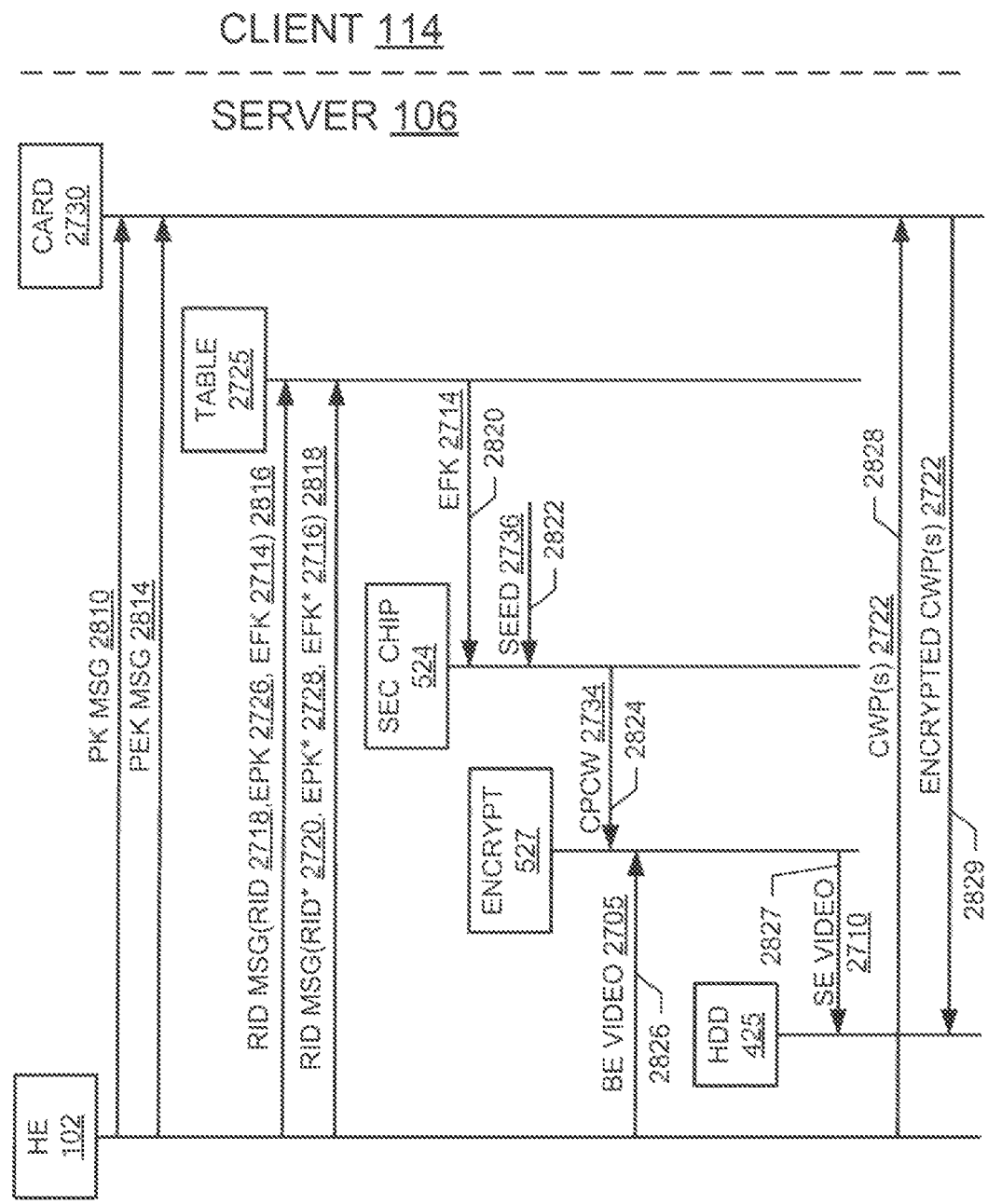
FIGS. 28A and 28B illustrate an example protected content delivery exchange for the example pay delivery network of FIG. 1.
Figure 28B:
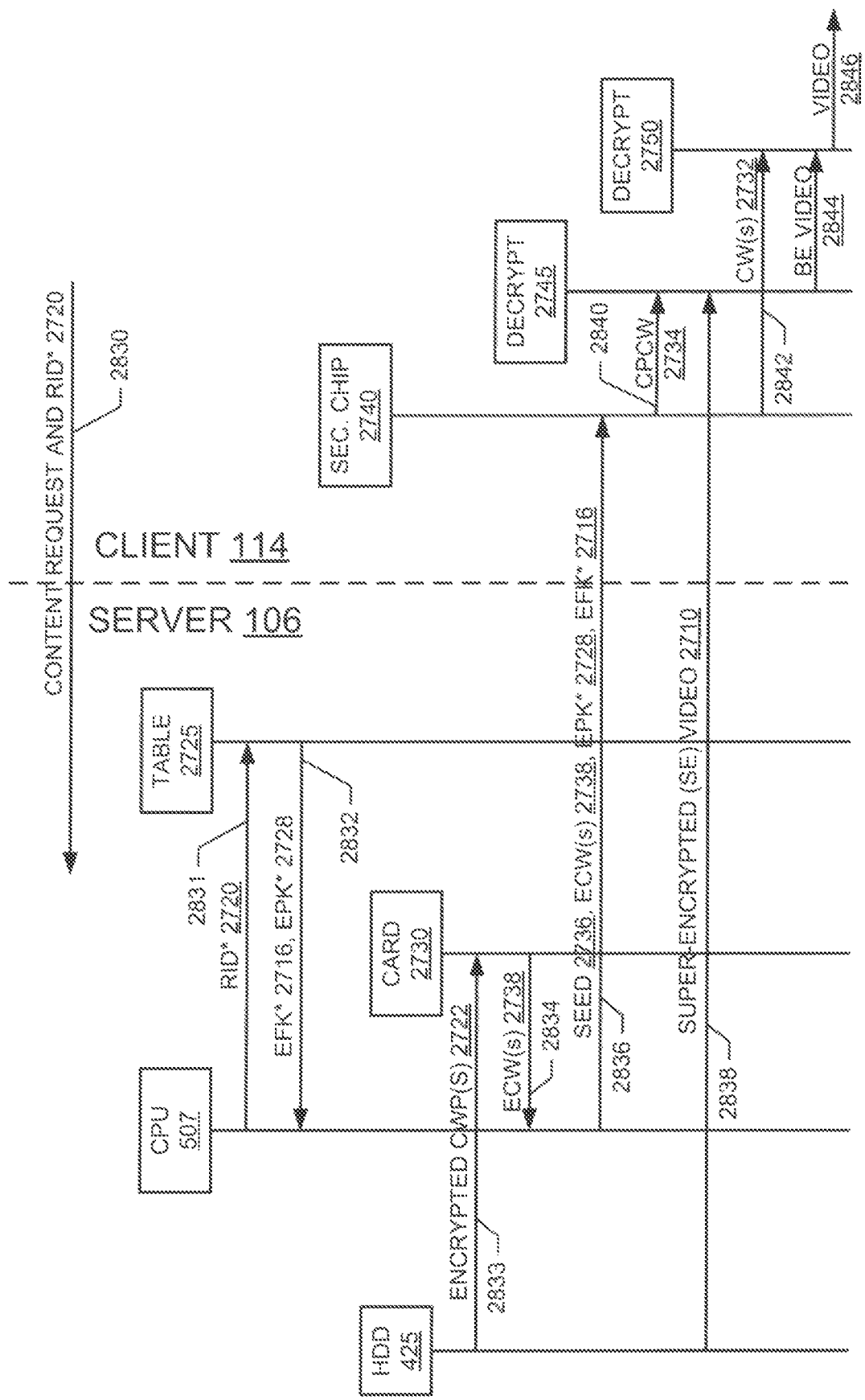

FIGS. 28A and 28B illustrate an example protected content delivery exchange for the example pay delivery network 100 of FIG. 1. The illustrated example exchange of FIGS. 28A and 28B proceeds similarly to the example implementation discussed above in connection with FIG. 27. To facilitate ease of understanding, like elements have been numbered with like reference numerals in FIGS. 27 and 28A-B.

Turning to FIG. 28A, in response to a registration request for a media server 106 (not shown), the HE 102 determines the authorization for the media server 106 and generates the FK, PK and PEK keys for the home domain. The HE 102 sends a PK MSG 2810 for the smart card 2730 that contains the PK for the media server 106 and a PEK MSG 2814 for the smart card 2730 that contains the PEK. The HE 102 also sends a RID MSG 2816 to the authorized media server 106 that includes the RID 2718, the EPK 2726, and the EFK 2714. The media server 106 updates and/or stores, based upon the RID 2718, the EPK 2726 and the EFK 2714 in the table 2725. Likewise, in response to a registration request from a client 114 (not shown), the HE 102 determines the authorization for the client 114 and sends a RID MSG 2818 to the media server 106 containing the RID* 2720, EFK* 2716 and EPK* 2728. The information received in the RID MSG 2818 is likewise stored by the media server 106 in the table 2725. From time to time the example HE 102 of FIGS. 1 and 28A may generate new values of the FK, PK and PEK and send them to the media server 106 as described above. The example media server 106 of FIGS. 1, 27 and 28A indexes the received FK, PK and PEK values according to time period and stores them in the RID table 2725.

The security chip 524 decrypts the EFK 2714 indicated with reference numeral 2820 and uses the decrypted EFK 2714 to scramble the seed number 2736 indicated with reference numeral 2822 to obtain the CPCW 2734 indicated with reference numeral 2824. The encrypter 527 uses the CPCW 2734 to encrypt the received broadcast encrypted video 2705 indicated with reference numeral 2826 and stores the super-encrypted video 2710 on the HDD 425 as indicated with reference numeral 2827. When CWP(s) 2722 are received by the media server 106 as indicated with reference numeral 2828, the media server 106 and/or the smart card 2730, using any of the methods described above, processes, handles and/or stores the received CWP(s) 2722. In the example of FIG. 28A, the smart card 2730 encrypts the CWP(s) 2722 with the PEK received in, for example, the PEK MSG 2814, and stores the encrypted CWP(s) 2722 on the HDD 425 as indicated with reference numeral 2829.

Continuing with FIG. 28B when the client 114 sends a content request and the RID* 2720 to the media server 106 as indicated with reference numeral 2830. At the media server 106, the CPU 507 (FIG. 5) uses the received RID* 2720 of the client 114 as indicated with reference numeral 2831 to lookup in the table 2725 the EFK* 2716 and the EPK* 2728 as indicated with reference numeral 2832. Using any of the methods described above, the smart card 2730 and/or the security chip 524 obtain and/or determine the ECW(s) 2738. In the illustrated example of FIG. 28A, the smart card 2730 obtains encrypted CWP(s) 2722 stored on the HDD 425 as designated with reference numeral 2833. The smart card 2730 then uses the PEK to decrypt the encrypted CWP(s) 2722 to determine the CW(s) 2732 from the CWP(s), encrypts the CW(s) 2732 with the PK, and sends the ECW(s) 2738 to the CPU 507 as indicated with reference numeral 2834. The media server 106 (e.g., the CPU 507) then sends the seed number 2736, the ECW(s) 2738, the EPK* 2728, and the EFK* 2716 to the client 114 as indicated with reference numeral 2836. As indicated by reference numeral 2838, the media server 106 also sends the super-encrypted video 2710 to the client 114.

At the client 114, the security chip 2740 decrypts the EFK* 2716 using the US* 2785 and uses the decrypted EFK* 2716 and the seed number 2736 to determine the CPCW 2734 (indicated with reference numeral 2840) that the decrypter 2745 uses to decrypt the super-encrypted video 2710. The security chip 2740 also uses the US* 2785 to decrypt the EPK* 2728 and uses the decrypted EPK* 2728 to decrypt the ECW(s) 2738 as indicated by reference numeral 2842. The decrypter 2750 uses the decrypted ECW(s) 2738 (i.e., the CW(s) 2732) to further decrypt the broadcast encrypted video 2844 output by the decrypter 2745 to obtain the requested unencrypted content 2846.

In the illustrated examples of FIGS. 1, 27 and 28A-B the PK and/or the FK and/or the PEK may be updated and/or changed. In particular, the table 2725 may store a current EPK (e.g., EPK* 2728) and a current EFK (e.g., EFK* 2716) for each media server 106 and each client 114 as well as a future EPK and future EFK. For example, when a new EFK 2714 is received via a RID MSG 2712, the RID MSG 2712 indicates when the new EFK 2714 is to become active, and, at the indicated time, the old EFK 2714 is expired and the new EFK 2714 is utilized for future content delivery between the media server 106 and the client 114. If the FK is updated, one or more old EFK 2714 and/or EFK* 2716 values may be retained by the media server 106 to allow the media server 106 and/or the client 114 to correctly decrypt the previously super-encrypted content 2710 stored on the HDD 425 that depends upon the current or previous FK for decryption. Alternatively, previous super-encrypted content 2710 may be decrypted and re-super encrypted.

In another example, the value of the PEK is updated with a new PEK MSG 2814. The PEK MSG 2814 indicates when the new PEK is to become active. If the PEK is updated, one or more old PEK values may be retained by the smart card 2730 in order to correctly decrypt the previously encrypted CWP(s) 2722 stored on the HDD 425. Alternately, one or more old PEK MSGs 2714 may be retained by the IRD 106.

In yet another example, the HE 102 updates the value of the PK by sending a new PK MSG 2810 to the smart card 2730 and sending a new EPK (e.g., EPK 2726, EPK* 2728) containing the new PK to the media server 106 and/or the client 114 via one or more RID MSGs. The smart card 2730 may determine when to begin using the new PK, or it may be instructed from the HE 102 in the PK MSG 2810 or via the CWP(s) 2722. In an example, the new PK is used to encrypt the CW(s) 2732 at playback time, so that previous PK values are not required, and the PK values can change frequently. In another example, the PK is used to encrypt the CW(s) 2732 at recording time, and the resulting ECW(s) 2738 are stored on the HDD 425. In this example, the media server 106 retains one or more old EPK 2726 and/or EPK*

2728 values to allow the media server 106 and/or the client 114 to correctly decrypt the broadcast-encrypted content 2710 stored on the HDD 425. In yet another example, all or part of the PK value is required by the smart card 2730 to obtain the CW(s) 2732 from the CWP(s) 2722, such as where the PK may have a common portion that is shared amongst all authorized subscribers during a particular period of time, so that the smart card 2730 retains the new PK and one or more old PK values to obtain the CW(s) 2732 for correct viewing of the live broadcast or the recorded content. In this example, previous values of PK, EPK 2726 and/or EPK* 2728 are required to correctly decrypt content from the HDD 425.

The media server 106 may also contain unencrypted content on the HDD 425 such as, for example, equipment demonstrations, advertisements, instructions, etc. In the example systems of FIGS. 1, 27 and 28A-B, the media server 106 may provide such unencrypted content to any client 114, even an unauthorized client 114. In particular, the unencrypted content may be sent by the media server 106 to a client 114 in the clear (i.e., without any applied encryption and/or security).

Figure 29:
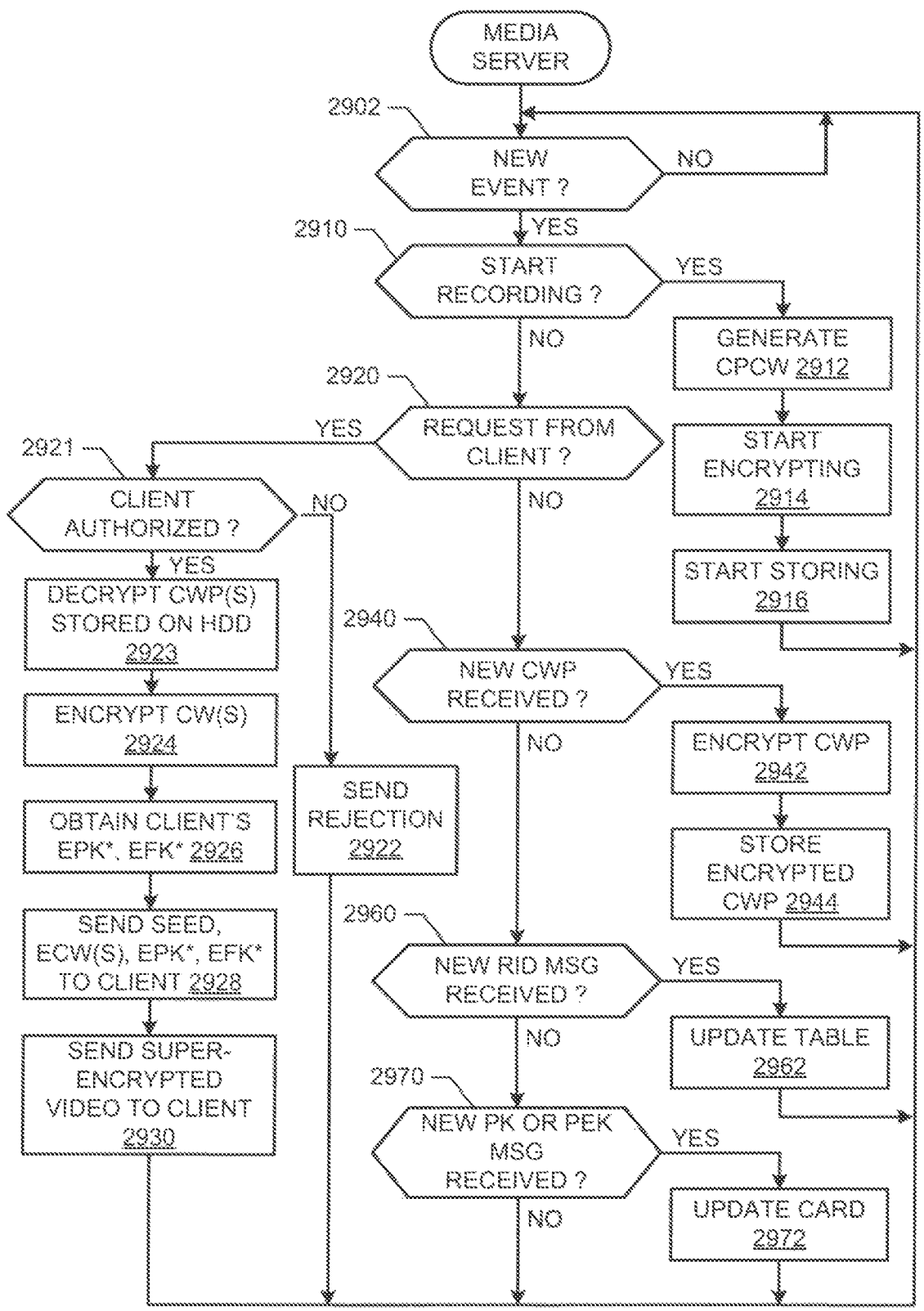
FIGS. 29, 30 and 31 are flowcharts representative of example processes that may be carried out to implement the example implementation of FIG. 27 and/or the example exchange of FIGS. 28A and 28B.
Figure 30:
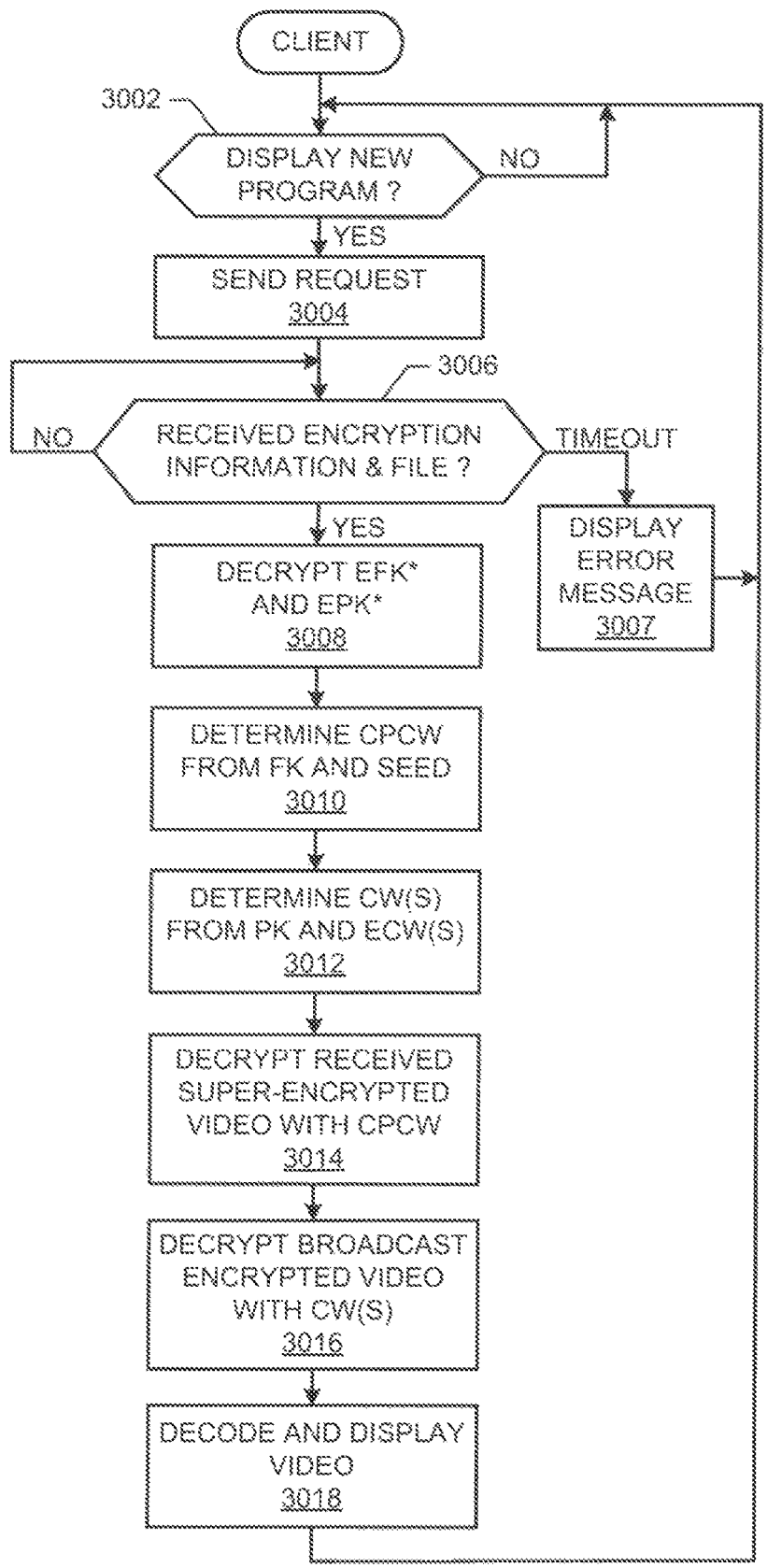
Figure 31:
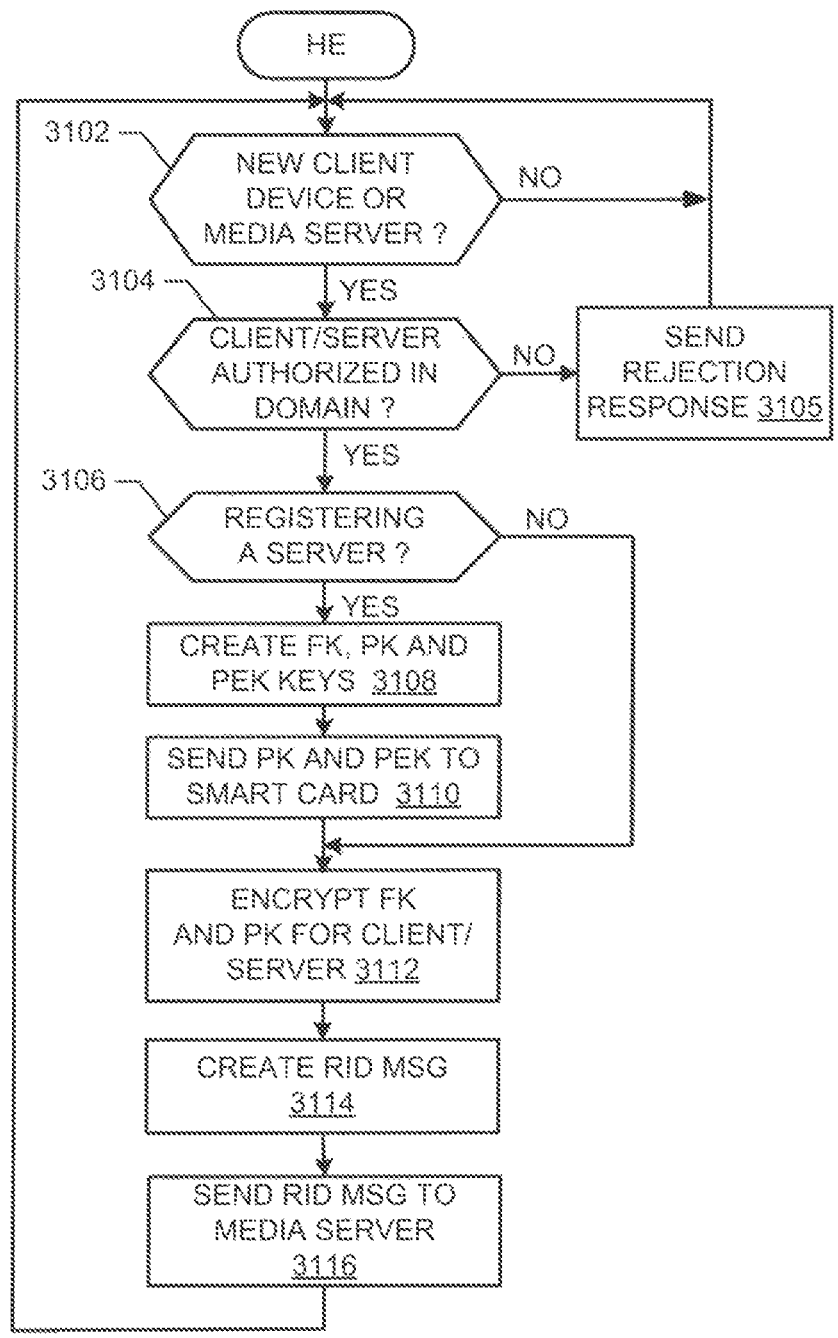

FIGS. 29, 30 and 31 illustrate flowcharts representative of example processes that may be carried out by the media server 106, the client 114 and the HE 102, respectively, to implement the example implementation of FIG. 27, the example exchange of FIGS. 28A-B and/or, more generally, the example pay content delivery network 100 of FIG. 1. The example processes of FIGS. 29-31 may be executed by a processor, a controller and/or any other suitable processing device. For example, the example processes of FIGS. 29-31 may be embodied in coded instructions stored on a tangible medium such as a flash memory, or RAM associated with a processor (e.g., the processor 8010 shown in the example processor platform 8000 and discussed below in conjunction with FIG. 35). Alternatively, some or all of the example processes of FIGS. 29-31 may be implemented using an ASIC, a PLD, a FPLD, discrete logic, hardware, firmware, etc. Also, some or all of the example processes of FIGS. 29-31 may be implemented manually or as combinations of any of the foregoing techniques, for example, a combination of firmware and/or software and hardware. Further, although the example processes of FIGS. 29-31 are described with reference to the flowcharts of FIGS. 29-31, persons of ordinary skill in the art will readily appreciate that many other methods of implementing the example implementation of FIG. 27, the example exchange of FIGS. 28A-B and/or, more generally, the illustrated example of FIG. 1 may be employed. For example, the order of execution of the blocks may be changed, and/or some of the blocks described may be changed, eliminated, sub-divided, or combined. Persons of ordinary skill in the art will appreciate that the example processes of FIGS. 29-31 may be carried out sequentially and/or carried out in parallel by, for example, separate processing threads.

The example process of FIG. 29 begins with a media server 106 waiting for a new event such as, for example, a request for content from a client 114 to occur (block 2902). When a new event occurs (block 2902), the media server 106 determines the type of the new event.

If the new event (block 2902) is a selection, for example, by a user of the media server 106, to record a selected program (block 2910), a security device (e.g., the security chip 524) generates, as described above, from the EFK 2714 and, for example, a content identifier 2736 for the selected program, a CPCW 2734 (block 2912). The AES encrypter 527 (FIG. 5 or 27) then starts additionally encrypting (i.e., super-encrypting) the received broadcast encrypted video 2705 (block 2914) and the media server 106 starts storing the super-encrypted video 2710 on, for example, the HDD 425 (block 2916). The super-encrypting (block 2914) and the storing (block 2916) continue until recording of the selected program is complete and/or recording is canceled and/or interrupted. Methods for continuing to record a selected program during interruptions and/or recording a selected program for which broadcast has already started are discussed in Section II and in connection with FIGS. 13-15. Control then returns to block 2902 to await another new event.

If the new event (block 2902) is a request for content from a client 114 (block 2920), a security device (e.g., the CPU 507 associated with the media server 106 (FIG. 5)) determines if the client 114 is authorized (block 2921). For example, the media server 106 may check to see that the client 114 has a valid EPK* 2728 and a valid EFK* 2716 in the table 2725. If the client 114 is not authorized (block 2921), the media server 106 sends a rejection response (e.g., a message) to the client 114 (block 2922) and control returns to block 2902 to wait for another new event.

If the client is authorized (block 2921), a possibly different security device (e.g., the smart card 2730) decrypts the encrypted CWP(s) 2722 stored on, for example, the HDD 425, and determines the corresponding CW(s) 2732 (block 2923). The smart card 2730 then encrypts the CW(s) 2732 with the PK to form the ECW(s) 2738 (block 2924). Any of the other methods described above for obtaining ECW(s) 2738 may additionally or alternatively be implemented. The media server 106 obtains, based on the RID* 2720 of the client 114, the EFK* 2716 and the EPK* 2728 from, for instance, the table 2725 (block 2926). The media server 106 sends the content identifier 2736 for the requested content, the ECW(s) 2738, the EPK* 2726 and the EFK* 2716 to the client 114 (block 2928) and then transfers the requested content 2710 from the HDD 425 to the client 114 (block 2930).

If the new event (block 2902) is the receipt of another CWP 2722 (block 2940), a security device (e.g., the smart card 2730) encrypts the received CWP 2722 (block 2942) and stores the encrypted CWP 2722 in, for example, the HDD 425 (block 2944) and control returns to block 2902 to await a new event. Any of the other methods described above for processing, handling and/or storing received CWP(s) 2722 may additionally or alternatively be implemented.

If the new event (block 2902) is receipt of a RID MSG 2712 (block 2960), a security device (e.g., the CPU 507 associated with the media server 106) updates the table 2725 with the information received in the RID MSG 2712 (block 2962) and control returns to block 2902 to await a new event.

If the new event (block 2902) is receipt of a PK MSG 2712 or a PEK MSG (block 2970), a security device (e.g., the smart card 2730) updates the encryption information (e.g., the PK or the PEK) stored in the smart card 2730 with the new and/or additional encryption information received in the PK MSG 2723 or PEK MSG (block 2972) and control returns to block 2902 to await a new event.

The example process of FIG. 30 begins with a client 114 waiting for a user of the client 114 to select a program for viewing (block 3002). When a selection is made (block 3002), the client 114 sends a content request (e.g., the request 2830 of FIG. 28B) to a media server 106 (block 3004) and then waits to receive encryption information and the super-encrypted video 2710 from the media server 106

(block 3006). Example encryption information includes a content identifier 2736 for the requested content, the ECW(s) 2738 for the requested content, the EPK* 2728 and the EFK* 2716. If a timeout occurs while waiting for encryption information or super-encrypted video 2710 (block 3006), then an error message is displayed (block 3007) and control returns to block 3002 to await a new event.

When the encryption information and the super-encrypted video is received (block 3006), a security device (e.g., the security chip 2740) decrypts the received EPK* 2726 and EFK* 2716 (block 3008). The security chip 2740 then determines the CPCW 2734 from the decrypted EFK* 2716 and the content identifier (i.e., the seed) (block 3010) and determines the CW(s) 2732 from the decrypted EPK* 2726 and the ECW(s) 2738 (block 3012). The decrypter 2745 decrypts the received super-encrypted video 2710 with the CPCW 2734 (block 3014) and then the decrypter 2750 further decrypts the resultant broadcast encrypted video with the CW(s) 2732 (block 3016). The client 114 then decodes and displays the selected program for the user (block 3018) and control returns to block 3002 to await another selection.

The example process of FIG. 31 begins with a HE 102 waiting for a request to register a new media server 106 or a new client 114 (block 3102). When a registration request is received (block 3102), the CAS 350 (FIG. 3) determines if the new media server 106 or client 114 is authorized to join the content delivery network 100 (block 3104). If the media server 106 or the client 114 is not authorized (block 3104), the HE 102 sends a rejection response to the requesting media server 106 or client 114 (block 3105). Control returns to block 3102 to wait for another registration request.

If the media server 106 or client 114 is authorized (block 3104), the CAS 350 determines if the registering device is a media server 106 (block 3106). If the registering device is a server (block 3106), the CAS 350 determines a PK, a FK and a PEK (block 3108) and sends the PK and PEK to the smart card 2730 (block 3110).

The CAS 350 encrypts the FK of the home domain with the US (e.g., US 2780 or US 2785) associated with the RID (e.g., the RID 2718 or the RID* 2720) of the registering device and encrypts the PK of the home domain with the US (e.g., US 2780 or US 2785) associated with the RID of the registering device (block 3112). The CAS 350 creates a RID MSG containing the encrypted FK and the encrypted PK (block 3114) and sends the RID MSG to the media server 106 or, for a registering client 114, to a media server 106 to which the client 114 is communicatively coupled (block 3116). Control then returns to block 3102 wait for another registration request.

VIII. Secure Content Transfer

As described above in connection with the example DTH system 100 of FIG. 1, a content server 106 (e.g., the example IRD 106 of FIGS. 1 and/or 4-6) may receive secure content (i.e., encrypted content) via the satellite/relay 104 and/or the CDN 110, and may securely exchange content with one or more devices 114 communicatively coupled to the content server 106. In particular, encryption information (e.g., a CWP) and/or content is received by the content server 106 and/or delivered to the content server 106 as described above in Sections I-VI and in connection with FIGS. 1-26C. In a presently disclosed example, the devices 114 (i.e., DRM clients 114) support media files protected with any variety of digital rights management (DRM) technology such as, for example, Microsoft® Windows Media® DRM technology. In the illustrated example of FIG. 1, the content server 106 may transfer content to and/or from the DRM clients 114.

Figure 32A:
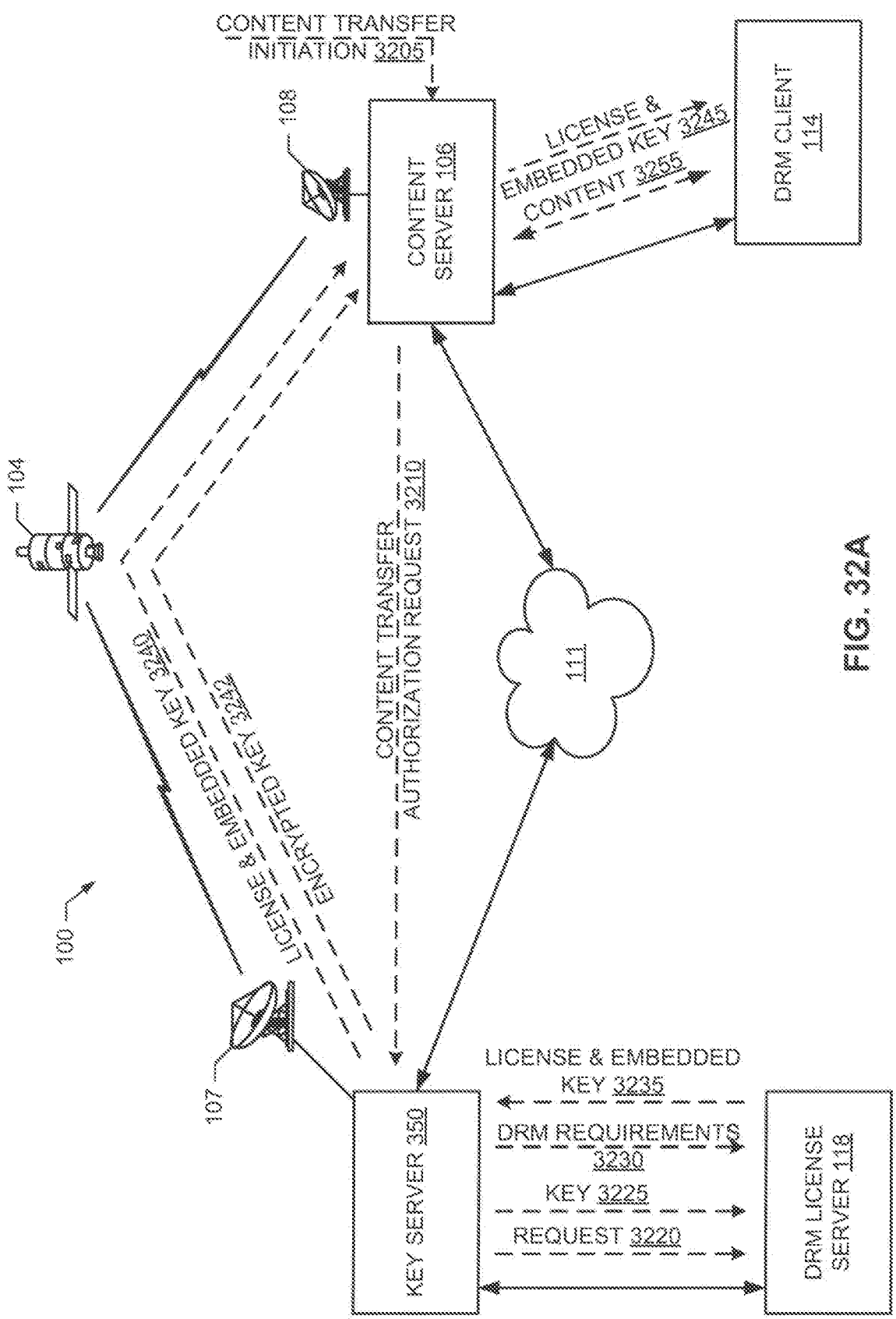
FIGS. 32A and 32B illustrate example secure content transfers for the example delivery system of FIG. 1.
Figure 32B:
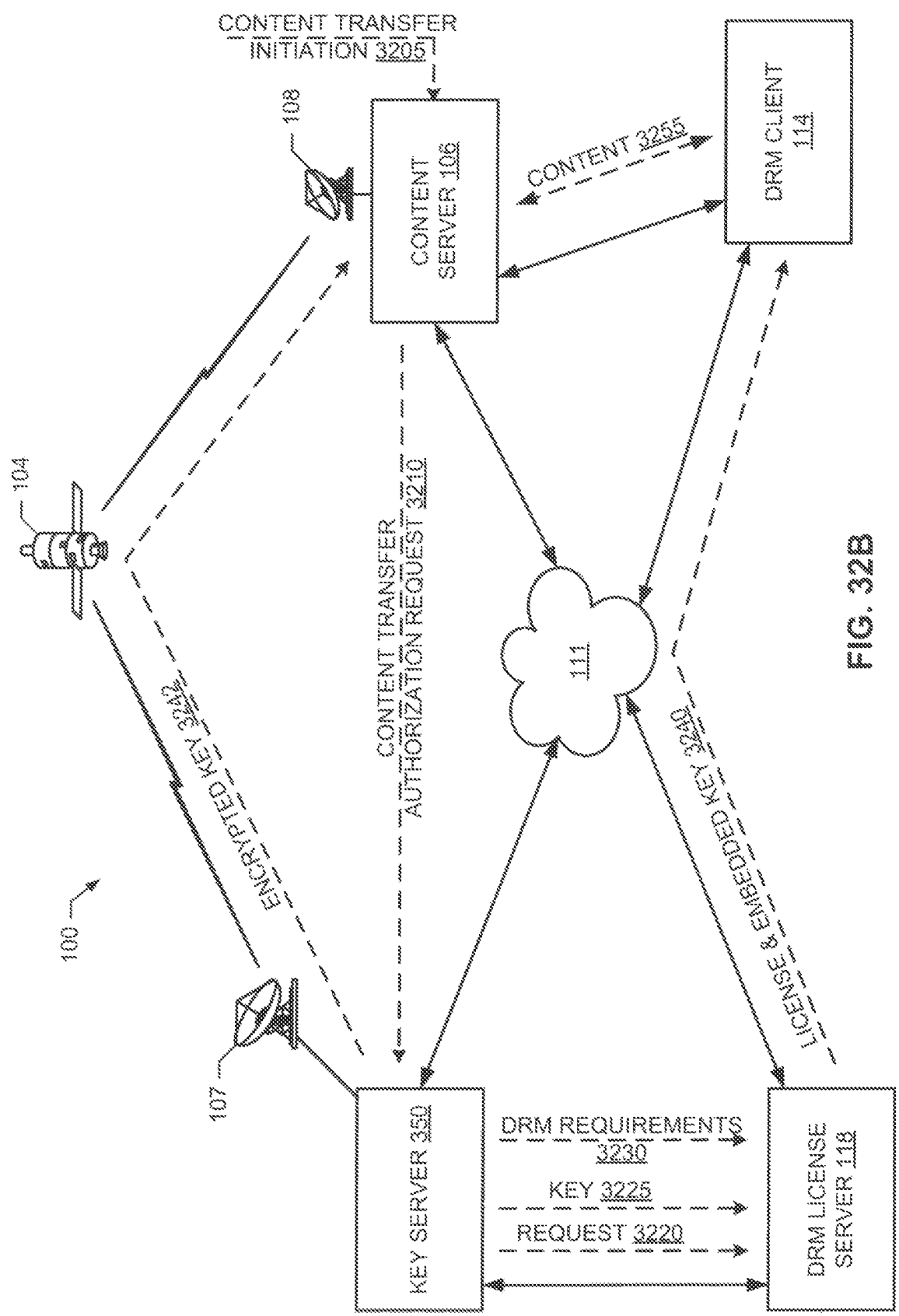

FIGS. 32A and 32B illustrate example secure content transfers that may be implemented to securely transfer protected content between a content server 106 and a DRM client 114. The illustrated example exchange of FIG. 32A is begun when any variety of content transfer initiation 3205 is detected and/or determined. Example content transfer initiations 3205 include: when a DRM client 114 is communicatively coupled to the content server 106; when a DRM client 114 sends a content request to the content server 106; when a content transfer request and/or command is received at the content server 106 from, for instance, the client 114, the HE 102, the DRM license server 118, via the Internet 111, etc.; via any variety of menu and/or interface provided by the content server 106 and/or the DRM client 114 to a user of the DRM client 114 and/or the content server 106; a content management application executing on the content server 106; etc. While the following discussion illustrates the flow of content to the DRM client 114 from the content server 106, persons of ordinary skill in the art will readily appreciate that the disclosed methods and apparatus may be used to transfer content from the DRM client 114 to the content server 106. In response to the detected and/or determined content transfer initiation 3205 and using any of a variety of communication paths and/or techniques discussed above, the content server 106 sends a content transfer authorization request to the HE 102 and, in particular, to the key server 350 (i.e., CAS 350 (FIG. 3)) as signified with reference numeral 3210.

Based on the contents of the content transfer authorization request 3210, the key server 350 identifies the content server 106, the DRM client 114 and the requested content (e.g., movie title). The key server 350 also determines an entitlement key (KE) (i.e., an encryption key or secret) for the secure content transfer.

The key server 350 sends to the DRM license server 118 a content transfer license request 3220, and the KE as indicated with reference numeral 3225. An example license request 3220 includes content identifier information (e.g., song title), DRM client 114 identification information, payment information, etc. The key server 350 also sends, as signified by reference number 3230, DRM requirements for the requested license such as, for example, expiration date, number of playbacks, etc.

If the content transfer is allowable, the example DRM license server 118 of FIG. 32A responds with a license that includes the KE and the requirements embedded within. In the example of FIG. 32A the determination of whether the content transfer is allowable is made at the DRM license server 118 to which the content server 106 is communicatively coupled directly and/or indirectly. As discussed below, the determination may, additionally or alternatively, be made at the content server 106 in an example where the DRM license server 118 is implemented by and/or within the content server 106. In the example of FIG. 32, the license with the embedded KE is provided to the key server 350 as indicated with reference numeral 3235 and is then forwarded via, for example, the satellite/relay 104 as indicated with reference numeral 3240 to the content server 106. In particular, the key server 350, using methods discussed above, securely delivers the license with the embedded KE to the content server 106. Additionally, the key server 350, using methods discussed above, encrypts the KE and securely delivers the encrypted KE to the content server 106 as indicated with reference numeral 3242. For instance, the key server 350 may encrypt the KE with the US 2780 (FIG. 27) of the content server 106. The content server 106, in turn provides the license with the embedded KE, as indicated with reference numeral 3245, to the DRM client 114. Alternatively, as discussed above in connection with FIGS. 24B and 25, instead of the key server 106 sending the encrypted KE 3242 to the content server 106, the key server 350 may send a seed that the content server 106 may use in conjunction with a decrypted EFK 2714 (FIG. 27) to determine the KE. Additionally or alternatively, as discussed above in connection with FIGS. 27 and 28A-B, the content server 106 may select a random number as a seed number to use in conjunction with a decrypted EFK 2714, for determining the value of KE for encrypting the transferred content, and which seed number the content server 106 may send to the key server 350 for determining the value of KE 3225 to send to the DRM license server 118. An example seed number that depends on the content itself is a hash of the content data and is, for example, computed by the content server 106 and sent to the key server 350. Another example seed number that depends on the content is based on a number, such as, for example, a content identifier, known at the key server 350 and/or the content server 106, so that a KE based on the seed is unique for each piece of unique content delivered by the content server 106. Additionally and alternatively, the seed number used by the content server 106 and the key server 350 may be based on the digital rights license terms, and/or a hash thereof, so that a KE based on the seed is unique for each category of licensed content delivered by the content server 106. Even though a seed number based the content itself, on a content identifier and/or license terms may be the same at different content servers 106, a resulting KE will be unique due to the different US 2780 and/or decrypted EFK 2714 at each content server 106. Furthermore, if desired, the resulting KE value may be the same for two or more content servers 106 that are part of a same home network and which share a same decrypted EFK 2714 value, i.e., the same FK distributed by the CAS 350 as described above with reference to FIGS. 27-31.

In the illustrated examples of FIGS. 1 and 32A-B, the content server 106 uses the received encrypted KE 3242 and/or a KE determined from a received seed 3242 to encrypt the content to be transferred. For example, for super-encrypted content stored on the HDD 425 (FIG. 5) the content server 106 decrypts the super-encrypted content with the CPCW and CW as discussed above in FIG. 7, and then uses the encrypter 527 and, more generally, the transport module 520 (FIG. 5) to encrypt the content with the KE prior to transferring (i.e., sending) the encrypted content to the DRM client 114. In another example, for content currently being streamed to the media server 106 via the satellite/relay 104 and/or the CDN 110, the media server 106 decrypts the received encrypted content with the CW and then encrypts the resultant unencrypted content with the KE before securely transferring (i.e., streaming or copying) the content to the DRM client 114. As discussed below, the KE is provided to the DRM client 114 such that the DRM client 114 can correctly decrypt and view the securely transferred content. Only a licensed DRM client 114 can extract the embedded KE used to encrypt the content.

In the illustrated example of FIG. 32A, once the content server 106 provides the license with the embedded KE 3245 to the DRM client 114, the content server 106 and the DRM client 114 transfer the content as shown with reference numeral 3255. For example, the content server 106 sends the content 3255 that has been encrypted with the KE to the DRM client 114 and, having received the license and the embedded KE 3245, the DRM client 114 is able to successfully decrypt the received encrypted content 3255. The DRM client 114 may further store the received license 3245 and encrypted content 3255 for later decryption and playback, if permitted by the DRM requirements in the license 3245.

A content transfer authorization request 3210 may be sent not only in response to a content transfer initiation 3205, but additionally or alternatively to, for example, register and/or obtain a content transfer authorization for a current, new and/or additional DRM client 114. Moreover, a content transfer authorization request 3210 could be used to obtain an encrypted KE 3242 applicable to the transfer of one or more type(s) of content such as, for example, all broadcast television shows, a subscription movie channel, etc. In such examples, the encrypted KE 3242 received by the content server 106 may be valid for a period of time such as, for example, a month. Such time period enabled encrypted KE 3242 may be periodically or aperiodically renewed by the HE 102 and/or at the request of the DRM client 114, the content server 106 and/or a user. For such time period enabled encrypted KEs 3242, when a content transfer initiation 3205 is detected, the content server 106 may check to see if a valid encrypted KE 3242 is available for the content and/or content type to be transferred. If a valid encrypted KE 3242 is available, the content server 106 encrypts the content to be transferred and transfers the encrypted content without first sending a content transfer authorization request 3210 to the HE 102. Further still, as discussed above, the license and embedded KE 3245 provided to the DRM client 114 may be valid for a period of time and may be periodically or aperiodically renewed by the HE 102 and/or at the request of the DRM client 114, the content server 106 and/or a user. Such renewals include the issuance of a fresh license valid for an extended period and the same KE and license terms as the expired license, so that existing encrypted content available to the DRM client 114 may continue to be viewed via the DRM client 114 for the extended period. The same KE may be derived from a stored seed value, or a seed value based on the content itself, a content identifier and/or license terms may be regenerated in order to determine the same KE for license renewal. Furthermore, if a license is shared among many current and future content programs (such as all broadcast television shows, or all movies on a subscription movie channel) then a renewed license may be delivered to the DRM client 114 on a periodic basis, allowing current and/or future programs to be delivered to that client 114 under the protection of the original and renewed license.

Additionally or alternatively, the content server 106 may provide to the key server 350 any variety of random number such as, for example, a seed that the content server 106 uses to generate the key 3225 and that the key server 350 uses to determine the key 3225 that it provides to the DRM license server 118. In this fashion, the key server 350 may skip the providing of the encrypted KE 3242 to the content server 106 illustrated in the example of FIG. 32A.

FIG. 32B illustrates an alternative example secure content transfer that may be implemented to securely transfer protected content between a content server 106 and a DRM client 114. The illustrated example exchange of FIG. 32B proceeds similarly to the example exchange illustrated in FIG. 32A. Thus, the description of identical portions of FIG. 32A will not be repeated here. Instead, the interested reader is referred back to the corresponding description of FIG. 32A. To facilitate this process, like operations have been numbered with like reference numerals in FIGS. 32A and 32B.

In the illustrated example of FIG. 32B, the DRM license server 118 is able to communicate with the DRM client 114 via the Internet 111. Thus, the license server 118 may send the license and the KE to the DRM client 114 via the Internet 111 as indicated with reference numeral 3240. Having received the encrypted KE 3242, determined the KE from a seed 3242 and/or a previously received applicable encrypted KE 3242, the content server 106 may, as discussed above, encrypt the requested content and (pre-)transfer the encrypted content to the DRM client 114 as indicated with reference numeral 3255. In the illustrated example of FIG. 32B, the DRM client 114 will be unable to correctly decrypt the encrypted content 3255 until the DRM client 114 receives a valid content transfer license with the embedded KE from the DRM license server 118.

It will be readily apparent to persons of ordinary skill in the art that alternative secure content transfer exchanges to those illustrated in FIGS. 32A and 32B may be implemented. For example, the license and key 3240 may be delivered from the DRM license server 118 and/or the key server 350 to the content server 106 via the Internet 111, the content server 106 may determine the KE and communicate via the Internet 111 with the DRM license server 118 to obtain the license, the license and the KE may be sent separately from the key server 305 to the content server 106, the content server 106 may determine the KE and the DRM requirements and generate and/or sign the license, etc. Other examples abound.

In the illustrated example of FIGS. 32A and 32B, the DRM license server 118 and the DRM client 114 may be implemented by any variety of devices capable of supporting any of a variety of DRM technologies. Example DRM clients 114 include a PC, a portable media player, a media extender, a game playing system, etc.

While in the illustrated examples of FIGS. 32A and 32B the DRM license server 118 is implemented separately from the content server 106, it will be readily apparent to persons of ordinary skill in the art that the content server 106 may implement the DRM license server 118 using any variety of methods and/or techniques. When the content server 106 implements the DRM license server 118, the content server 106 generates and/or determines the license and embedded key 3235 for the detected content transfer initiation 3205 and provides the same to the DRM client 114 as indicated with reference numeral 3245 in FIG. 32A. As described above, the license and embedded key 3235 may be determined using an applicable new and/or previous KE and/or seed determined and/or obtained by the content server 106 and/or determined and/or provided by the key server 350. As also described above, a seed may be a random number and/or be determined from the content itself, a content identifier and/or license terms using, for example, a cryptographic hash. Moreover, in such an example implementation, the content transfer authorization request 3210 may be skipped if the content server 106 is able to determine the authorization for the detected content transfer initiation 3205 based on a previously determined and/or received KE and/or seed. Furthermore, in such an example implementation where a license may be generated by a DRM license server associated with a content server, the content license may be renewed via the Internet by a remote DRM license server 118 in communication with the remote key server 350, where the license and embedded key as indicated with reference numeral 3240 in FIG. 32B, may be determined using an applicable previous KE and/or seed determined and/or obtained by and/or from the content server 106 and/or determined and/or provided by the key server 350.

Figure 33:
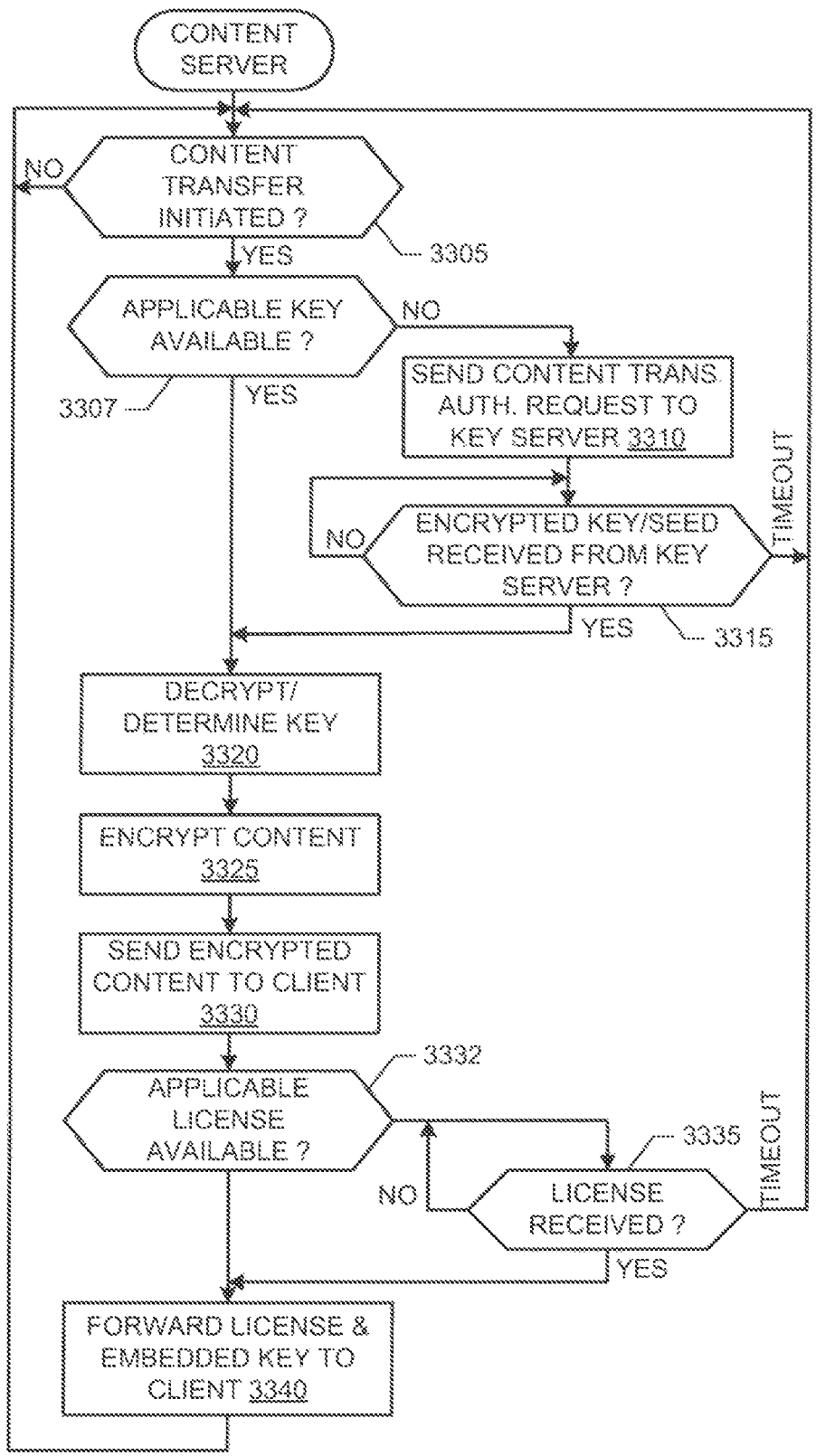
FIGS. 33 and 34 are flowcharts representative of example processes that may be carried out to implement the example secure content transfers of FIGS. 32A and 32B.
Figure 34:
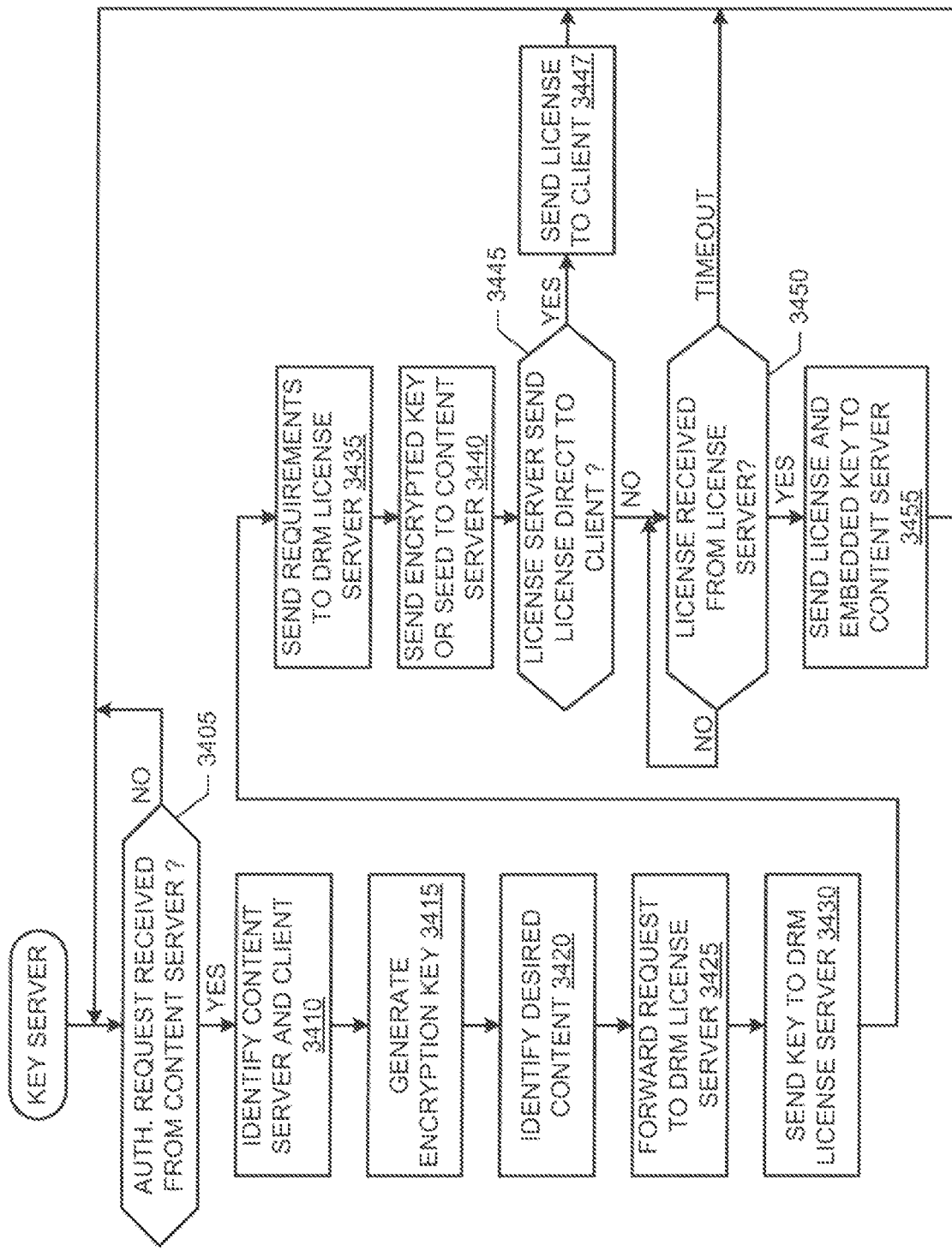

FIGS. 33 and 34 illustrate flowcharts representative of example processes that may be carried out by the content server 106 and the key server 350, respectively, to implement the example exchanges of FIGS. 32A and 32B and/or, more generally, the example system 100 of FIG. 1. The example processes of FIGS. 33 and 34 may be executed by a processor, a controller and/or any other suitable processing device. For example, the example processes of FIGS. 33 and 34 may be embodied in coded instructions stored on a tangible medium such as a flash memory, or RAM associated with a processor (e.g., the processor 8010 shown in the example processor platform 8000 and discussed below in conjunction with FIG. 35). Alternatively, some or all of the example processes of FIGS. 33 and 34 may be implemented using an ASIC, a PLD, a FPLD, discrete logic, hardware, firmware, etc. Also, some or all of the example processes of FIGS. 33 and 34 may be implemented manually or as combinations of any of the foregoing techniques, for example, a combination of firmware and/or software and hardware. Further, although the example processes of FIGS. 33 and 34 are described with reference to the flowcharts of FIGS. 33 and 34, persons of ordinary skill in the art will readily appreciate that many other methods of implementing the content server 106 and the key server 350, respectively, to implement the example exchanges of FIGS. 32A and 32B and/or, more generally, the example system 100 of FIG. 1 may be employed. For example, the order of execution of the blocks may be changed, and/or some of the blocks described may be changed, eliminated, sub-divided, or combined. Persons of ordinary skill in the art will appreciate that the example processes of FIGS. 33 and 34 may be carried out sequentially and/or carried out in parallel by, for example, separate processing threads.

The example process of FIG. 33 begins with a content server 106 waiting to detect and/or determine a content transfer initiation (block 3305). When a content transfer is initiated (block 3305), the content server 106 determines if an applicable encrypted KE is available for the content to be transferred (block 3307). If an applicable encrypted KE is not available (block 3307), the content server 106 sends a content transfer authorization request to the key server 350 (block 3310) and waits to receive an encrypted KE or a seed from which the KE can be determined (block 3315).

When the KE or the seed is received (block 3315), a security device (e.g., the security chip 524 of FIG. 5) decrypts the received encrypted KE using the US 2780 or determines the KE from the seed and the EFK 2714 and the US 2780 (FIG. 27), respectively (block 3320). For a transfer of content to the DRM client 114, the content server 106 encrypts the requested content with the KE (block 3325) and starts sending the encrypted content to the DRM client 114 (block 3330). The transfer of the encrypted content continues until the transfer is complete, is cancelled or interrupted. Returning to block 3315, if the KE or the seed has not been received, the content server 106 continues waiting. If a timeout occurs while waiting for the KE or the seed (block 3315), control returns to block 3305 to await another content transfer initiation. Additionally, the content server 106 may display any variety of content transfer error message when a timeout occurs.

Returning to block 3307, if an applicable encrypted KE is available, a security device (e.g., the security chip 524 of FIG. 5) decrypts the received encrypted KE using the US 2780 or determines the KE from the seed and the EFK 2714 and the US 2780 (FIG. 27), respectively (block 3320). For a transfer of content to the DRM client 114, the content server 106 encrypts the requested content with the KE (block 3325) and starts sending the encrypted content to the DRM client 114 (block 3330). The transfer of the encrypted content continues until the transfer is complete, is cancelled or interrupted.

Having started sending the encrypted content to the DRM client 114 (block 3330), the content server 106 determines if an applicable license for the transferred content was previously received (i.e., available) (block 3332). If an applicable license is not available (block 3332), the content server 106 waits to receive a license with the embedded KE from the key server 350 (block 3335). When a license (e.g., the license 3240 of FIG. 32A) is received (block 3335), the content server 106 forwards the license with the embedded KE to the DRM client 114 (block 3340). Control returns to block 3305 to wait for another transfer request. If the license is not received (block 3335), the content server 106 continues waiting. If a timeout occurs while waiting (block 3335), the content server 106 stops waiting for the license. Such a timeout may facilitate an exchange where the DRM license server 118 provides the license and key to the DRM client 114 via, for instance, the Internet 111 (e.g., see FIG. 32B).

Returning to block 3332, if an applicable license is available, the content server 106 forwards the license with the embedded KE to the DRM client 114 (block 3340). Control returns to block 3305 to wait for another transfer request.

The example process of FIG. 34 begins with the key server 350 waiting to receive a content transfer authorization request from a content server 106 (block 3405). When a content transfer authorization request (e.g., the content transfer authorization request 3210 of FIG. 32A or FIG. 32B) is received (block 3405), the key server 350 identifies the content server 106 and the requesting DRM client 114 from, for example, information contained in the transfer request (block 3410). The key server 350 then generates a KE for the secure content transfer (block 3415), and identifies the requested content (block 3420).

The key server 350 sends a content transfer license request to the DRM license server 118 (block 3425), sends the KE to the DRM license server 118 (block 3430) and sends the requirements for the content transfer to the DRM license server 118 (block 3435). The key server 350 encrypts and securely sends the KE to the content server 106 (block 3440). Alternatively, the key server 350 may send a seed from which the KE may be determined by the content server 106 (block 3440). The key server 350 then determines, using any of a variety of techniques, if the DRM license server 118 will provide the license with the embedded key to the DRM client 114 via, for instance, the Internet 111 (block 3445). If the DRM license server 118 will provide the license and key to the DRM client 114 (block 3445) it does so (block 3447) and control returns to block 3405 to wait for another transfer request.

If the key server 350 is to forward the license and key to the DRM client 114 (block 3445), the key server 350 waits to receive the license from the DRM license server 118 (block 3450). When a license is received from the DRM license server 118 (block 3450), the key server 350 forwards (i.e., sends) the license with the embedded key to the content server 106 (block 3455). Control returns to block 3405 to wait for another transfer request. If the license is not received (block 3450), the key server 350 continues waiting. If a timeout occurs while waiting for the license (block 3450), the key server 350 stops waiting for the license. Control then returns to block 3405 to wait for another transfer request. Additionally, the key server 350 may send an error message to the content server 106 when a timeout occurs.

While the example flowcharts of FIGS. 33 and 34 illustrate processes that may be carried out by the content server 106 and the key server 350, respectively, to implement the example exchanges of FIGS. 32A and 32B, persons of ordinary skill in the art will readily appreciate that the order of execution of the blocks may be changed, and/or some of the blocks described may be changed, eliminated, subdivided, or combined to implement all or some of the alternatives discussed above in connection with FIGS. 32A and 32B. For example: (a) instead of the key server 106 sending the encrypted KE 3242 to the content server 106, the key server 350 may send a seed that the content server 106 may use in conjunction with a decrypted EFK 2714 (FIG. 27) to determine the KE; (b) the content server 106 may receive, select and/or determine a seed number to use in conjunction with a decrypted EFK 2714, for determining the value of KE for encrypting the transferred content, and the key server 350 may receive, select and/or determine the same seed number for determining the value of KE 3225 to send to the DRM license server 118; (c) the key server 350 and DRM license server 118 may renew a license where the key server 350 determines the encryption key that was used by the content server 106 for an earlier content transfer, and the DRM license server 118 renews the license, and sends it to the client 114 via the Internet 111 or via the content server 106, where the earlier license may have been generated by a remote license server 118 and/or by the content server 106; (d) the DRM license server 118 may be implemented by and/or within the content server 106. Other examples abound as may be recognized by persons of ordinary skill in the art.

IX. Example Processor Platform

Figure 35:
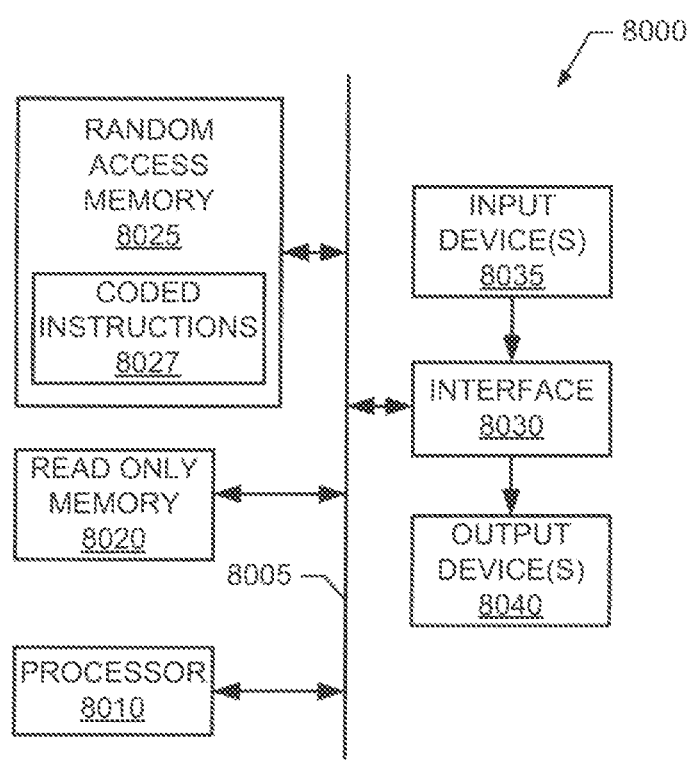
FIG. 35 is a schematic illustration of an example processor platform that may be used and/or programmed to implement the example processes of FIGS. 8-10, FIG. 15, FIGS. 17A-C, FIGS. 19A-C, FIGS. 22A-C, FIGS. 23A-C, FIGS. 26A-C, FIGS. 29-31 and/or FIGS. 33-34.

FIG. 35 is a schematic diagram of an example processor platform 8000 that may be used and/or programmed to carry out the example processes illustrated in FIGS. 8-10 to implement the example HE 102 of FIGS. 1-3, the example process illustrated in FIG. 15 to implement the example methods illustrated in FIGS. 13 and 14, the example processes illustrated in FIGS. 17A-C to implement the example exchange of FIG. 16, the example processes illustrated in FIGS. 19A-C to implement the example exchange of FIG. 18, the example processes illustrated in FIGS. 22A-C and 23A-C to implement the example exchange of FIGS. 20 and 21, respectively, the example processes illustrated in FIGS. 26A-C to implement the example exchanges of FIGS. 24A and 24B, the example processes illustrated in FIGS. 29-31 to implement the example implementation of FIG. 27 and/or the example exchange of FIGS. 28A-B, and/or the example processes illustrated in FIGS. 33-34 to implement the example secure content transfer of FIGS. 32A and 32B. For example, the processor platform 8000 can be implemented by one or more general purpose microprocessors, microcontrollers, etc.

The processor platform 8000 of the example of FIG. 35 includes a general purpose programmable processor 8010. The processor 8010 executes coded instructions 8027 present in main memory of the processor 8010 (e.g., within a random access memory (RAM) 8025). The processor 8010 may be any type of processing unit, such as a microprocessor from the Intel®, AMD®, IBM®, or SUN® families of microprocessors. The processor 8010 may carry out, among other things, the example processes illustrated in FIGS. 8-10, FIG. 15, FIGS. 17A-C, FIGS. 19A-C, FIGS. 22A-C, FIGS. 26A-C, FIGS. 29-31 and/or FIGS. 33-34.

The processor 8010 is in communication with the main memory (including a read only memory (ROM) 8020 and the RAM 8025) via a bus 8005. The RAM 8025 may be implemented by dynamic random access memory (DRAM), Synchronous DRAM (SDRAM), a hard disk drive, flash memory and/or any other type of RAM device. The ROM 8020 may be implemented by flash memory and/or any other desired type of memory device. Access to the memory 8020 and 8025 is typically controlled by a memory controller (not shown) in a conventional manner.

The processor platform 8000 also includes a conventional interface circuit 8030. The interface circuit 8030 may be implemented by any type of well-known interface standard, such as an external memory interface, serial port, general purpose input/output, etc.

One or more input devices 8035 and one or more output devices 8040 are connected to the interface circuit 8030. The input devices 8035 and output devices 8040 may be used, for example, to implement interfaces between the HE 102 and the CDN 110, the HE 102 and the IRDs 106, the CDN 110 and the IRDs 106, and/or between components, devices and/or circuits implementing the HE 102, the CDN 110 and/or the IRDs 106.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A system comprising:
   a client device for use at a first physical location and a second physical location; and
   a media server for use at the first physical location, the media server including:
   a receiver to receive encrypted content for requested content;
   a first security device, including a first processor, to determine a first encryption secret based on a first encryption key received from a headend and to determine a second encryption secret based on a second encryption key received from the headend;
   a first decrypter to decrypt received encrypted content for requested content based on the first encryption secret to determine decrypted content data for the requested content;
   an encrypter to re-encrypt the decrypted content data for the requested content based on the second encryption secret to determine re-encrypted content data; and
   an interface to send the re-encrypted content data to the client device, wherein the client device includes:
   a second security device, including a second processor, to determine the first encryption secret based on the first encryption key received from the headend and to determine the second encryption secret based on the second encryption key received from the headend; and
   a second decrypter to decrypt the re-encrypted content data based on the first encryption secret and the second encryption secret to access the requested content.

2. The system as defined in claim 1, wherein the media server and the client device are communicatively coupled via an Internet network.

3. The system as defined in claim 1, wherein the second security device is to determine the second encryption secret based on scrambling a seed number with the second encryption key.

4. The system as defined in claim 3, wherein the seed number is a content identifier for the requested content.

5. The system as defined in claim 3, wherein the scrambling includes cryptographically hashing the seed number with the second encryption key.

6. The system as defined in claim 1, wherein the media server is to receive the first encryption key, the second encryption key, and the encrypted content data via an Internet Protocol delivery mechanism.

7. The system as defined in claim 1, wherein the media server is to send the second encryption secret to the client device.

* * * * *